United States Patent [19]
Sato et al.

[11] Patent Number: 5,524,175
[45] Date of Patent: Jun. 4, 1996

[54] NEURO-COMPUTER SYSTEM FOR EXECUTING A PLURALITY OF CONTROLLING ALGORITHMS

[75] Inventors: Yuji Sato, Machida; Katsunari Shibata, Tokyo; Takahiro Sakaguchi, Akishima; Mitsuo Asai, Kokubunji; Masashi Hashimoto, Mitaka; Hiroshi Takayanagi, Kokubunji; Tatsuo Okahashi, Sayama; Keiji Moki, Tachikawa; Yoshihiro Kuwabara, Iruma; Tatsuo Ochiai, Kodaira; Masaru Ohki, Tokorozawa; Hisao Ogata, Kokubunji, all of Japan

[73] Assignees: Hitachi, Ltd.; Hitachi Micro Computer System, Ltd., both of Tokyo, Japan

[21] Appl. No.: 141,798

[22] Filed: Oct. 27, 1993

[30] Foreign Application Priority Data

Oct. 29, 1992 [JP] Japan .................. 4-291159
Oct. 29, 1992 [JP] Japan .................. 4-291160
Oct. 29, 1992 [JP] Japan .................. 4-291163
Nov. 30, 1992 [JP] Japan .................. 4-319741

[51] Int. Cl.⁶ .......................... G06F 15/16; G06F 15/18
[52] U.S. Cl. ........................ 395/11; 395/24; 395/27
[58] Field of Search ....................... 395/11, 22, 23, 395/24, 27

[56] References Cited

U.S. PATENT DOCUMENTS

| | | | |
|---|---|---|---|
| 4,796,199 | 1/1989 | Hammerstrom et al. | 395/10 |
| 4,918,617 | 4/1990 | Hammerstrom et al. | 395/21 |
| 5,109,475 | 4/1992 | Kosaka et al. | 395/22 |
| 5,131,072 | 7/1992 | Yoshizawa et al. | 395/24 |
| 5,165,010 | 11/1992 | Masuda et al. | 395/27 |
| 5,170,463 | 12/1992 | Fujimoto et al. | 395/11 |
| 5,204,938 | 4/1993 | Skapura et al. | 395/27 |
| 5,212,767 | 5/1993 | Higashino et al. | 395/27 |
| 5,214,743 | 5/1993 | Asai et al. | 395/11 |

FOREIGN PATENT DOCUMENTS

| | | | |
|---|---|---|---|
| 2-64788 | 3/1990 | Japan | G06G 7/60 |
| 4-276852 | 1/1992 | Japan | G06F 15/18 |
| 4-14192 | 1/1992 | Japan | G06G 7/60 |

OTHER PUBLICATIONS

Symople-x: A General-Purpose Neurocomputer Architecture Ramacher IEEE/18-21 Nov. 1991.
Neurocomputer Interfaces and Performance Measures Hecht-Nielsen, IEEE 8-11 May 1989.
Digital VLSI Multiprocessor Design for Neurocomputers Chang et al. IEEE/7-11 Jun. 1992.
An Integrated Neurocomputing System Nigri et al. IEEE, 8-14 Jul. 1991.
Design of Parallel Hardware Neural Network Systems from Custom Analog VLSI/Building Block Chips. Eberhardt et al. IEEE 18-22 Jun. 1989.
"Learning Internal Representations by Error Propagation", Parallel Distributed Processing, D. Rumelhart, et al., vol. 1 Foundations, Chapter 8, pp. 318-362.

(List continued on next page.)

*Primary Examiner*—Allen R. MacDonald
*Assistant Examiner*—Richemond D. Dorvil
*Attorney, Agent, or Firm*—Antonelli, Terry, Stout & Kraus

[57] ABSTRACT

A general neuro-computer and system using it is capable of executing a plurality of learning algorithms, providing an instruction execution speed comparable with a hard wired system, and practically neglecting a time required for rewriting microprograms. The neuro-computer is constituted by a neuron array having a plurality of neurons, a control storage unit for storing microinstructions, a parameter register, a control logic, and a global memory. A host computer as a user interface inputs information necessary for the learning and execution of the neuro-computer to the system, the information including learning algorithms, neural network architecture, the number of learnings, the number of input patterns, input signals, and desired signals. The information inputted from the host computer is transferred via a SCSI to the neuro-computer to perform a desired neural network operation.

30 Claims, 52 Drawing Sheets

OTHER PUBLICATIONS

"A Wafer Scale Integration Neural Network Utilizing Completely Digital Circuits", M. Yamada, et al., Central Research Lab., Hitachi, Ltd., pp. 55–60.

"High–Speed Learning Neuro–WSI", N. Asai, et al., Central Research Lab., Hitachi, Ltd., pp. 87–92.
"CNAPS", Adaptive Solutions, VSLI, pp. 144–151.
"The self–Organizing Map", T. Kohonen, IEEE 1990, Invited Paper, pp. 419–435.

FIG. 4A    OPRATION CONTROL INSTRUCTION $$\underbrace{LBL}_{11}\ \underbrace{SC(0)}_{12}\ \underbrace{INST}_{13}\ \underbrace{BCST(\#1)}_{14}\ ;$$

FIG. 4B    NEXT ADDRESS CONTROL UNIT $$\underbrace{LBL}_{11}\ \underbrace{SC(1)}_{12}\ \underbrace{JUMP(\#2)}_{15}\ \underbrace{TEST}_{16}\ ;$$

FIG. 5

$$TEST\{\underbrace{TINST}_{21}\ \underbrace{MUL(\#3,\#4)}_{22}\ \underbrace{ALU(\#5,\#6)}_{23}\ \underbrace{SFT(\#7,\#8)}_{24}\ \underbrace{OUT(\#9)}_{25}\}$$

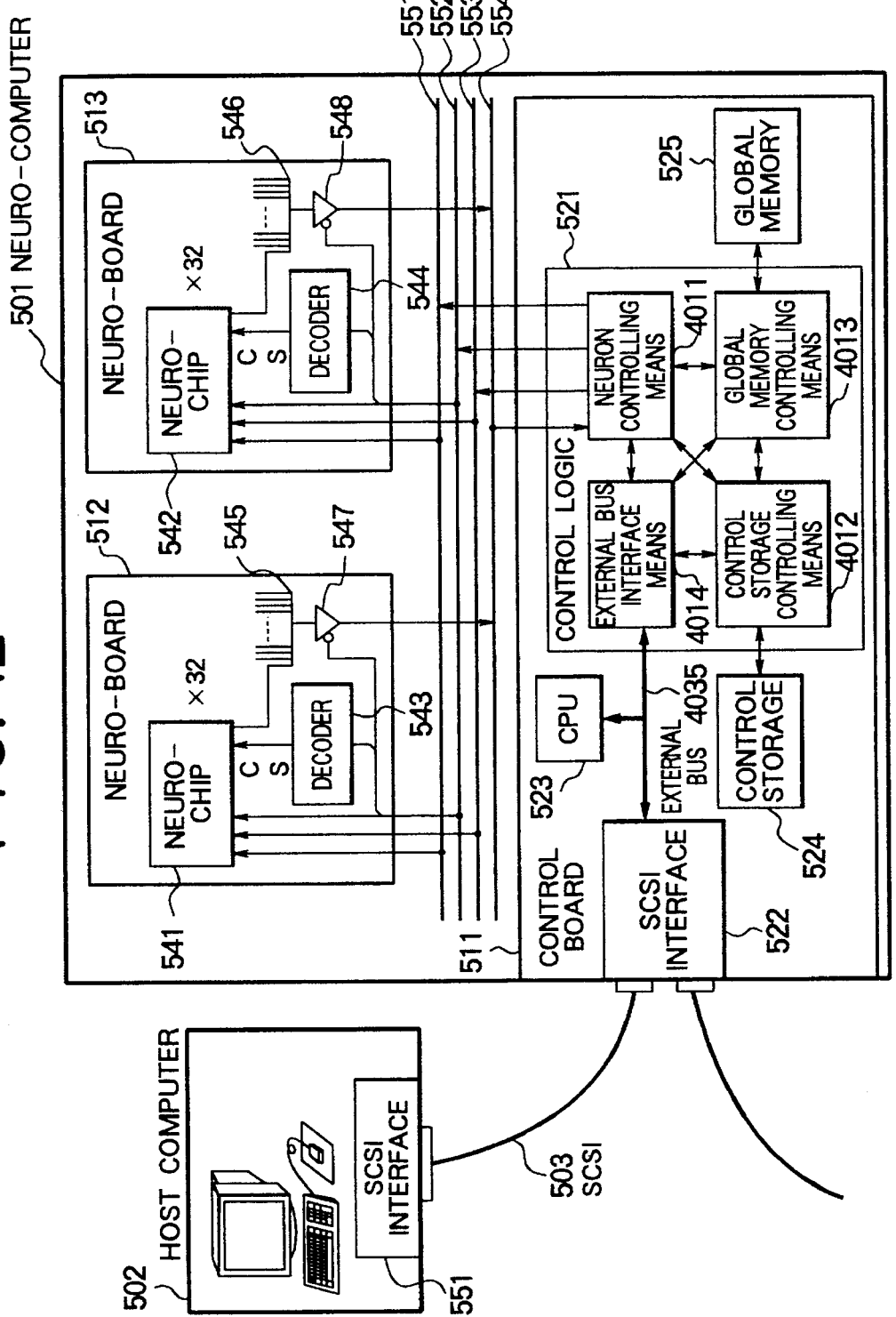

FIG. 25

| ADDRESS | CONTENTS | VALUE (EXAMPLE) |
|---|---|---|
| 0 | PATTERN 0 DESIRED SIGNAL 0 | 0x33 |
| 1 | PATTERN 0 INPUT 0 | 0x1ff |
| 2 | PATTERN 0 INPUT 1 | 0x1ff |
| 3 | PATTERN 0 INPUT 2 (BIAS) | 0x1ff |
| 4 | PATTERN 1 DESIRED SIGNAL 0 | 0x1cc |
| 5 | PATTERN 1 INPUT 0 | 0x1ff |
| 6 | PATTERN 1 INPUT 1 | 0x0 |
| 7 | PATTERN 1 INPUT 2 (BIAS) | 0x1ff |
| 8 | PATTERN 2 DESIRED SIGNAL 0 | 0x1cc |
| 9 | PATTERN 2 INPUT 0 | 0x0 |
| a | PATTERN 2 INPUT 1 | 0x1ff |
| b | PATTERN 2 INPUT 2 (BIAS) | 0x1ff |
| c | PATTERN 3 DESIRED SIGNAL 0 | 0x33 |
| d | PATTERN 3 INPUT 0 | 0x0 |
| e | PATTERN 3 INPUT 1 | 0x0 |
| f | PATTERN 3 INPUT 2 (BIAS) | 0x1ff |
| ... | ... | ... |
| 20 | CHEBYSHEV APPRPXIMATION 0-TH ORDER COEFFICIENT | 0x10 |
| 21 | CHEBYSHEV APPRPXIMATION 1-ST ORDER COEFFICIENT | 0x3a |
| 22 | CHEBYSHEV APPRPXIMATION 3-RD ORDER COEFFICIENT | 0x34b |
| 23 | CHEBYSHEV APPRPXIMATION 5-TH ORDER COEFFICIENT | 0x165 |
| 24 | CHEBYSHEV APPRPXIMATION 7-TH ORDER COEFFICIENT | 0x2ac |
| 25 | CHEBYSHEV APPRPXIMATION 9-TH ORDER COEFFICIENT | 0x7a |
| ... | ... | ... |
| 30 | DESIRED COEFFICIENT | 0x1cc |
| 31 | INERTIAL TERM COEFFICIENT | 0x40 |
| ... | ... | ... |
| 40 | HIDDEN NEWRON DESIGNATING GROUP VALUE | 0x0 |
| 41 | OUTPUT LEYER NEWRON DESIGNATING GROUP VALUE | 0x1 |
| ... | ... | ... |
| 50 | 10 BIT DATA GENERATING MASK | 0x3ff |
| ... | ... | ... |
| 60 | PATTERN 0 NEWRON OUTPUT VALUE | 0x33 |
| 61 | PATTERN 1 NEWRON OUTPUT VALUE | 0x1cc |
| 62 | PATTERN 2 NEWRON OUTPUT VALUE | 0x1cc |
| 63 | PATTERN 3 NEWRON OUTPUT VALUE | 0x33 |

FIG. 39

| PROCESS CONTENTS | CALCULATION EQUATION | NUMBER OF WEIGHT BITS |
|---|---|---|
| OUTPUT VALUE CALCULATION | $u_i = \sum_j w_{ij} \cdot o_j$ | UPPER 16 BITS |
| BACK PROPAGATION ERROR CALCULATION | $\delta_j = f'(u_j) \sum_k \delta_k w_{kj}$ | UPPER 16 BITS |
| WEIGHT MODIFICATION | $w_{ij}^{n+1} = w_{ij}^n + \Delta w_{ij}^{n+1}$ | UPPER 16 BITS \| LOWER 16 BITS |

FIG. 42

| Y/M/D | H/M/S | STOCK VALUE |
|---|---|---|
| 1/7/1993 | 9 : 00' 00" | 19590.41 YEN |
| 1/7/1993 | 9 : 00' 10" | 19600.50 YEN |
| 1/7/1993 | 9 : 00' 20" | 19630.35 YEN |
| 1/7/1993 | 9 : 00' 30" | 19625.78 YEN |
| . . . . . . | . . . . . . | . . . . . . |

FIG. 43

```
NETWORK ARCHITECTURE : 20X10X10
   TRAINING COEFFICIENT : 0.5
   INERTIAL COEFFICIENT : 0.5
LEARNING PATTERN 1
     19590. 41
     19600. 50
     19630. 35
      . . . . . .
DESIRED PATTERN 1
     19600. 50
     19630. 35
     19625. 78
      . . . . . .
LEARNING PATTERN 2
     19600. 50
     19630. 35
     19625. 78
      . . . . . .
DESIRED PATTERN 2
     19630. 35
     19625. 78
      . . . . . .

DATA SWITCHING INFORMATION

| | LEARNING PERFORMANCE | LEARNING PRECISION | ERROR | OVERHEAD TIME |
|---|---|---|---|---|
| NEURO-COMPUTER | 10Gcups | 16b | 0.001 | 1.0s |
| NEURO-SIMULATOR | 1Mcups | 64b | 0.000 | 0.0s |
| ⋮ | | | | |

NEURO-COMPUTER SYSTEM FOR EXECUTING A PLURALITY OF CONTROLLING ALGORITHMS

BACKGROUND OF THE INVENTION

FIELD OF THE INVENTION

The present invention relates generally to a neuro-computer having a plurality of neurons (processors) and a method of using the same, and particularly to a method of generalizing and speeding up a neuro-computer. The invention is applicable to a neuro-computer and an information processing system using the same, for example, for the knowledge processing fields such as recognition, prediction, inspection, analysis, and control.

Two types of conventional neuro-computers are explained in the following.

A first conventional technique will be first given. This first conventional technique has been proposed by the present applicant in which presented is a complete digital neuron using WSI (Wafer Scale Integration). This technique is described in "Technical Study Report", pp. 55–60, the Integrated Circuit Study Group (ICD 89-151, 1989, November) of the Institute of Electronics, Information and Communications Engineers. An example of a neuron of the complete digital neuro-computer is shown in FIG. 8. Referring to FIG. 8, a multiplier 3810 corresponds to a synapse which multiplies a data input signal supplied from another neuron by a synapse weight stored in a memory 3840. The address of a synapse weight in the memory 3840 is given by an address signal. The multiplied result is applied to a loop circuit made of an adder/subtracter 3820 and a latch 3860, and is cumulatively added each time a step signal is inputted. If an underflow and the like occurs, a shifter 3830 is used when necessary. When addresses designated by address signals circulate once, in response to a cycle signal the contents of the latch 3860, i.e., the cumulative addition result, is transferred to a latch 3870 and used as an output of this neuron at the next cycle. When an address signal designates this neuron, a driver 3880 is enabled by a decoder 3890 to deliver a data output signal. A sigmoid converter and the like are provided on another chip (control circuit chip) and used in common, not being shown in FIG. 8.

As shown in FIG. 10, a conventional neuro-computer is constructed of a plurality of neuron circuits such as shown in FIG. 8 (e.g., 300, 301, 302) and a control system 310. The plurality of neuron circuits and the control system 310 are interconnected by an input data bus 311, an address bus 312, a control signal bus 313, and an output data bus 314. Input data, address, and control signal generated by the control system are transferred to all neurons via the input data bus 311, address bus 312, and control signal bus 313, and subjected to necessary processes at the neuron circuits 300, 301, 302, . . . Thereafter, the designated neuron circuit outputs its values such as an internal state value and a propagation error to the output bus 314 via a tri-state buffer 315 or the like, and to the control system 310. The control system 310 includes a control storage unit for storing microprograms sent from a host computer, an input layer memory for storing input patterns, an desired signal memory for storing desired signals, and an output layer memory for storing the values of neurons at the output layer for all patterns.

The characteristic features of the neuro-computer shown in FIGS. 8 and 10 reside in that a learning algorithm is realized by a logic circuit (hard wired scheme) of fixed hardware. If a learning algorithm is realized by the hard wired scheme, learning can be executed at a high speed.

Next, the second conventional technique will be described. A neuro-computer has been introduced in the extra issue of Nikkei Intelligent System, Summer Edition, 1992, pp. 144–151, entitled "Parallel Machine "CNAPS System" with 256 Element Processors". This neuro-computer can assemble 256 element processors (hardware neurons) of the CNAPS architecture at a maximum, and can realize the maximum learning performance of 1.08 GCUPS. It is stated in this extra issue that the neuro-computer is applicable to learning algorithms such as BP (Back Propagation), LVQ (Learning Vector Quantization), SOM (Self Organization Map), SOM2D (Self Organization Map/2-Dimension), and FSCL (Frequency Sensitive Competitive Learning), and to applications other than neuro-applications.

According to the first conventional technique, a learning algorithm is realized by the hard wired scheme. Therefore, the learning (training) algorithm can be executed at a high speed on one hand, and on the other hand, it cannot deal with different learning algorithms (not realized by hardware). There arises a problem that the application field is limited (unable to apply to wide application fields), when taking into consideration of that an optimum learning algorithm differs depending on each application field.

There is another problem of a very expensive cost because hardware (neuro-computer) is required to be reconfigured for each learning algorithm in order to apply to wide application fields.

In order to solve the problems associated with the hard wired scheme, it is conceivable to use a microprogram scheme. Namely, a learning algorithm is microprogrammed to deal with a plurality of learning algorithms by rewriting each microprogram (without adding/modifying hardware).

However, use of the microprogram scheme poses the following problems.

(1) It takes a time to decode a microinstruction, greatly lowering an instruction execution time as compared to the hard wired scheme.

(2) It is necessary to transfer data (microprogram) from a host to a neuro-computer in order to rewrite a microprogram. If rewriting a microprogram occurs frequently, the transfer time of data (microprogram) from the host to the neuro-computer becomes unnegligible, elongating the total execution time (=data transfer time+instruction execution time).

The second conventional technique has a limit in the number of neurons and in the learning performance. For a sign check which is one of applications, a desired recognition performance is impossible unless about 1000 neurons are used for the input layer, hidden layer, and output layer. In such a case, it is apparent that the number of neurons becomes insufficient if the second conventional technique is applied. Furthermore, although the second conventional technique describes that it can deal with learning algorithms other than a BP algorithms, examples of particular structures are not disclosed.

SUMMARY OF THE INVENTION

It is an object of the present invention to provide a general neuro-computer and system using the same, capable of implementing a number of neurons, executing a plurality of learning algorithms, providing an instruction execution speed comparable with a hard wired system, and practically neglecting a time required for rewriting microprograms.

In order to achieve the above object, there are provided the following means for solving the above-described problems.

The microprogram scheme is adopted first in order to allow a plurality of learning algorithms to be dealt with.

Next, in order to realize an instruction execution speed comparable with the hard wired scheme, a microinstruction of a (complete) horizontal type is used. In order to reduce the number of bits (width) of a microinstruction of a (complete) horizontal type (i.e., in order to reduce a memory capacity), instructions rarely executed at a time are grouped (used as different groups of instructions).

Further, in order to make the time required for rewriting a microprogram practically negligible, parameter information frequently modified, such as the number of learnings and the number of patterns, is stored in a storage unit such as a parameter register, physically different from a control storage unit storing microprograms.

Lastly, neurons are interconnected by a common bus, and pipelining is introduced to allow a number of neurons to be assembled.

Specifically, the following countermeasures are used for solving the problems.

(1) The microprogram scheme is adopted. Namely, a microinstruction is used for the control of an operation unit group (such as a multiplier, an ALU, shifters, and registers) and for the data transfer control between neurons. Therefore, by rewriting a microprogram (made of microinstructions) for each learning algorithm, a plurality of learning algorithms can be dealt with without adding/modifying the hardware.

(2) A microinstruction of a (complete) horizontal type is used. The time required for decoding a microinstruction is therefore very short (0 in the case of the complete horizontal type), allowing an instruction to be executed at a high speed.

In order to solve the problem of a microinstruction of a (complete) horizontal type that the number of bits (width) of a microinstruction to be read from the control storage unit in one clock increases (as the number of bits (width) increases, the power consumption increases and the probability of noise generation at simultaneous switching increases), microinstructions rarely executed at one time are grouped (used as different groups of instructions). For example, microinstructions are grouped into instructions for the neuro-operation control and instructions for the next address control of the control storage unit. As a result, the number of bits (width) of a microinstruction read from the control storage unit in one clock can be reduced.

(3) Variable information such as the number of learnings and the number of patterns is stored in a storage unit such as a parameter register, physically different from the control storage unit storing microprograms. Therefore, the case which requires for rewriting the contents of the control storage unit (i.e., for transferring data (microprogram) from the host computer to the neuro-computer) is only when a learning algorithm becomes necessary to be changed or the network structure between neurons becomes necessary to be changed. This is a rare case. The variable information such as the number of learnings and the number of patterns which is required to be changed in an ordinary use can be changed by rewriting the contents of the parameter register. Therefore, the amount of data to be transferred from the host computer to the neuro-computer is very small, and the transfer time is practically negligible.

(4) Neurons are interconnected by a common bus, and pipelining is introduced. Use of the common bus connection reduces data transfer wirings between neurons, allowing a number of neurons to be assembled in one chip or one board. However, use of the common bus connection causes the data transfer time of whole neurons to be determined by the data transfer time between electrically most remoted neurons. In view of this, pipeline latches are provided on important points of the common bus to set the data transfer time to the minimum data transfer time required. Introduction of the common bus pipeline latches produces a difference of the number of stages of pipelining between a micro-instruction and data to be transferred, making a microprogram complicated. However, this complication of a microprogram can be eliminated by providing a latch dissolving the difference on the microinstruction generator circuit (decoder circuit).

The other objects, structures, and advantages of the present invention will become more apparent from the following detailed description.

BRIEF DESCRIPTION OF THE DRAWINGS

FIG. 4A shows an example of the microinstruction format of an operation control microinstruction FIG. 4B shows an example of the microinstruction format of a next address control microinstruction.

FIG. 5 illustrates an example of a test microinstruction.

FIG. 12 shows the structure of a neuro-computer system.

FIG. 25 is a diagram showing an example of allocation of data in a global memory.

FIG. 39 illustrates how weight values are used for the high precision operation.

FIG. 42 shows an example of a stock value database.

FIG. 43 illustrates an example of neuro-learning information.

FIG. 48 illustrates an example of data switching information.

DESCRIPTION OF THE PREFERRED EMBODIMENTS

Figure 1:
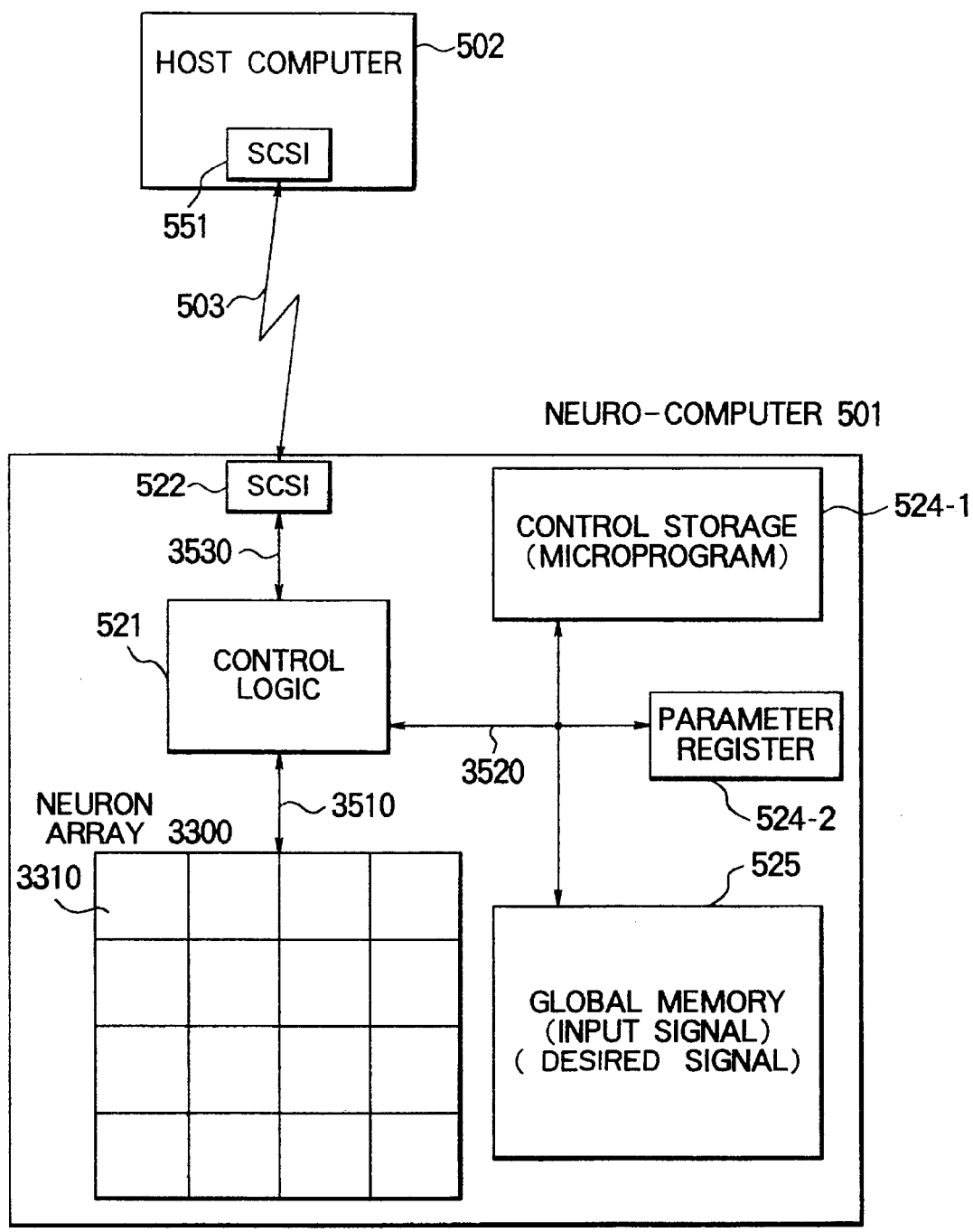
FIG. 1 is a schematic diagram showing the outline of a neuro-computer system.

FIG. 1 shows an example of the overall structure of a neuro-computer system. In FIG. 1, reference numeral 501 represents a neuro-computer, reference numeral 502 represents a host computer such as a workstation for controlling the neuro-computer 501, and reference numeral 503 represents a transmission line. The neuro-computer 501 includes a neuron array 3300 made of a plurality of neurons 3310, a control storage unit 524-1, a parameter register 524-2, a control logic 521, and a global memory 525. Reference numerals 522 and 551 each represent a SCSI (Small Computer System Interface) logical circuit for transferring data between the neuro-computer 501 and host computer 502 by using a SCSI.

The host computer 502 is used as a user interface unit from which information necessary for the learning and execution of the neuro-computer 501 is supplied. The information includes learning algorithms, neural network architectures, the number of learning operations, the number of input patterns, input signals, desired signals (expected values), and the like. The information supplied from the host computer 502 is transferred to the neuro-computer 501 via the SCSI logical circuit 551, communication line 503, and SCSI logical circuit 522. The transfer rate using SCSI is about 1 to 4 MB/sec. Obviously, other interfaces may also be used for the communications between the host computer 502 and neuro-computer 501. In the following description, SCSI is used as interfaces by way of example.

Of the information transferred to the neuro-computer 501, the information which is less modified, such as learning algorithms and neural network architectures, is stored in the control storage unit 524-1 in the form of microprograms. The parameter information which is frequently modified, such as the number of learnings and the number of input patterns, is stored in the parameter register 524-2. Input/output data of the neural network, such as input signals, desired (teaching) signals (expected values), and output signals, is stored in the global memory 525.

Figure 2:
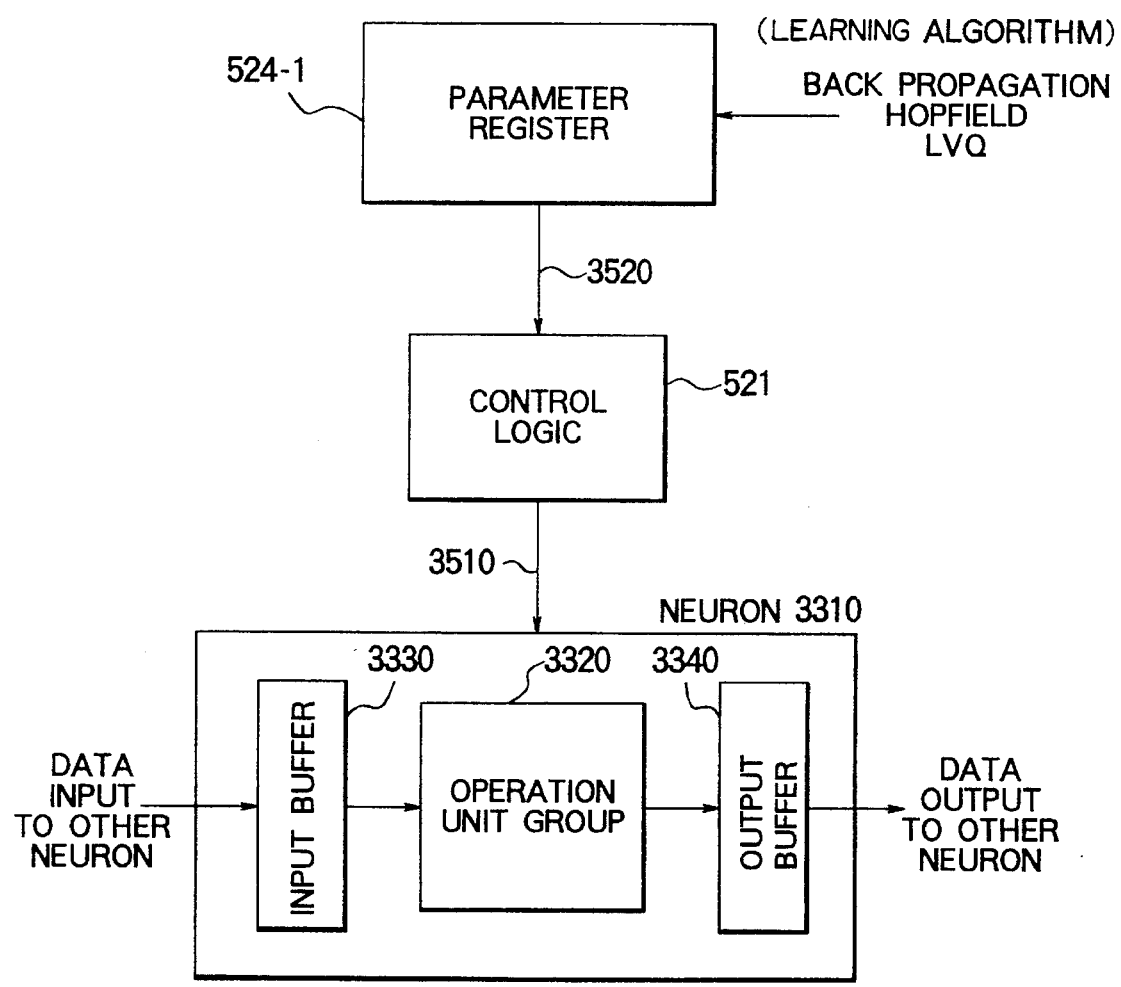
FIG. 2 illustrates a microprogramming scheme.

FIG. 2 is a diagram explaining a microprogram scheme for the nero-computer. In FIG. 2, reference numerals 3310, 524-1, and 521 represent the neuron, control storage unit, and control logic, respectively shown in FIG. 1. The neuron 3310 is basically formed by an operation unit group 3320, an input buffer 3330, and an output buffer 3340. With the microprogram scheme, microprograms describing how to use each operation unit of the operation unit group 3320 are stored in the control storage unit 524-1. The microprograms also describe how to control the data input from other neurons and the data output to other neurons. The control logic 521 is a decoder logic for decoding microprograms stored in the control storage unit 524-1 and generating control signals for the control of each operation unit of the operation unit group 3320. Therefore, a plurality of learning algorithms such as BP (Back Propagation), Hopfield, and LVQ (Learning Vector Quantization) can be processed without reconfiguring the hardware if microprograms matching such algorithms are prepared. In this embodiment, necessary microprograms are transferred from the host computer 502 and stored in the control storage unit 524-1 made of a RAM. However, the control storage unit 524-1 may be made of a ROM wherein a plurality of learning algorithms are all stored in the control storage unit 524-1 for the selection and execution of a desired learning algorithm. The control storage unit 524-1 may also be made of a rewritable memory such as an EPROM wherein a learning algorithm (microprogram) is overwritten when necessary.

Figure 3:
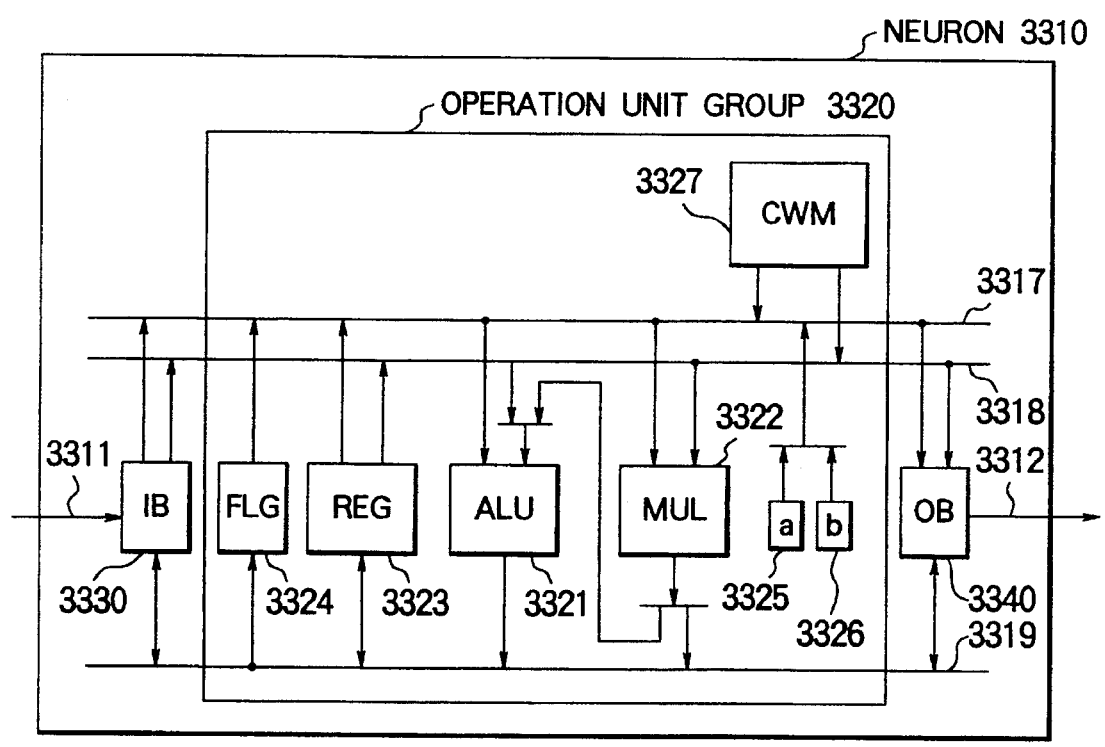
FIG. 3 is a block diagram showing an example of the operation unit group.

FIG. 3 is a block diagram showing the structure of the operation unit group 3320 of each neuron 3310. In FIG. 3, reference numeral 3310 represents the input buffer (IB) of each neuron 3310, and reference numeral 3340 represents the output buffer (OB). The input buffer 3330 has a function of temporarily storing data 3311 inputted from other neurons, and the output buffer 3340 has a function of temporarily storing data 3312 to be outputted to other neurons. Reference numeral 3321 represents an arithmetic-logic unit (ALU) with a shifter function. A shifter and an ALU may be provided discretely. Reference numeral 3323 represents a general register (REG), reference numeral 3324 represents a flag register (FLG), and reference numerals 3325 and 3326 represent weight value modifying registers (a) and (b). Reference numeral 3327 represents a rewritable memory (CWN) for storing weight information representing a coupling degree between processors. The registers 3325 and 3326 and rewritable memory 3327 may be allocated to part of the general register. Reference numerals 3317 to 3319 represent internal busses. Examples of operation functions of ALU 3321 are shown in Table 1.

TABLE 1

| No. | Operation Type | Function |
|---|---|---|
| 1 | Addition | $F = R + S$ |
| 2 | Addition with Carry | $F = R + S + Cin$ |
| 3 | Subtraction | $F = R - S$ |
| 4 | Reverse Subtraction | $F = S - R$ |
| 5 | Logical Product | $F = R \wedge S$ |
| 6 | Logical Sum | $F = R \vee S$ |
| 7 | NAND | $F = \neg (R \wedge S)$ |
| 8 | NOR | $F = \neg (R \vee S)$ |
| 9 | Exclusive Logical Product | $F = R \text{ XOR } S$ |
| 10 | Exclusive NOR | $F = R \text{ XNOR } S$ |
| 11 | Inversion (Left Input) | $F = \neg R$ |
| 12 | Inversion (Right Input) | $F = \neg S$ |
| 13 | Addition (without Overflow) | $F = R + S$ (without Overflow) |
| 14 | Addition with Carry (without Overflow) | $F = R + S + Cin$ (without Overflow) |
| 15 | Subtraction (without Overflow) | $F = R - S$ (without Overflow) |
| 14 | Reverse Subtraction (without Overflow) | $F = S - R$ (without Overflow) |

FIGS. 4A and 4B show examples of the formats of microinstructions at the mnemonic level. A microinstruction described at the mnemonic level is developed into binary digits and stored in the control storage unit 524-1. In the examples shown in FIGS. 4A and 4B, microinstructions are grouped into instructions rarely executed at one time, i.e., instructions for the operation control and instructions for the next address control, in order to reduce the number of bits (width) of a microinstruction (i.e., to reduce the memory capacity). The rules of microinstruction description will be explained briefly.

(1) General rules

One or more spaces are inserted between fields.

A space is placed at the top of a line if a label is omitted.

The end of one word is represented by a semicolon (;). One word may be described divisionally on several lines.

(2) Description rules for each field (1) Label Designating Field 11: LBL

This field is described at the top of a line.

This field may be omitted. In this case, a space is placed at the top of a line.

(2) Microinstruction Designating Field 12: SC

This field designates either the operation control instruction for the control of the neuron 3310 or the next address control instruction for the control of the next address of the control storage unit 524-1.

SC(0): representing the operation control instruction.

SC(1): representing the next address control instruction.

(3) Neuron Operation Control Field 13: INST

This field designates an operation function (e.g., multiplication, addition) of the neuron 3310, memory read/write required for the neuron operation, input/output of the internal busses, and the like.

(4) Broadcast Designating Field 14: BCST

This field manages the control of broadcasting.

1=Δ: No broadcasting.

IN: broadcasting an input signal.

TEA: broadcasting a desired signal.

NEU: broadcasting a neuron output value.

CNT: broadcasting a constant.

(5) Jump Instruction Designating Field 15: JUMP

This field manages the control of the next address of the control storage unit 524-1.

2=GO[μJAA]: Unconditional jump to the address designated by μJAA.

SUB[μJAA]: Subroutine jump to the address designated by μJAA.

SUBRTN: Indicating a subroutine return.

LOOP[LCA]: Repeat to LOOPRTN by the times designated by LCA.

LOOPRTN: Indicating a loop end.

(6) Test Function Designating Field 16: TEST

This field designates an instruction for an on-line test executed when executing the next address control instruction. For example, considered as the object of a test is a degeneration failure of the operation function in each neuron, and output lines of the internal busses and storage units (registers and memories).

FIG. 5 shows an example of the test function designating field of the next address control instruction shown in FIG. 4B.

(7) Test Instruction Field 21: TINST

This field designates an instruction for a test (e.g., an ADD instruction for ALU).

(8) Multiplier Input/output Designating Field: MUL

3=designating a right input of the multiplier

4=designating a left input of the multiplier (9) ALU Input/output Designating Field: ALU

5=designating a right input of ALU

6=designating a left input of ALU (a) Shifter Input/output Designating Field 24: SFT

7=designating a right input of the shifter

8=designating a left input of the shifter (b) Output Destination Designating Field 25: OUT

9=designating an output destination of test results (e.g., register, output buffer)

As described above, it is effective for reducing the number of bits (width) of a microinstruction (i.e., reducing the memory capacity) to group microinstructions rarely executed at one time, i.e., group into instructions for the operation control and instructions for the next address control. Furthermore, it is possible to perform an on-line test of the operation group of each neuron when the next address control instruction is executed (the neuron is essentially in a NOP (No Operation) state). Still further, if a microinstruction described at the mnemonic level is developed into binary digits of a (completely) horizontal type, the control logic 521 is not required almost at all, enabling a high speed execution of a microinstruction.

Information necessary for learning and the components for storing the information will be described, while using BP (Back Propagation) as a learning algorithm.

Figure 6:
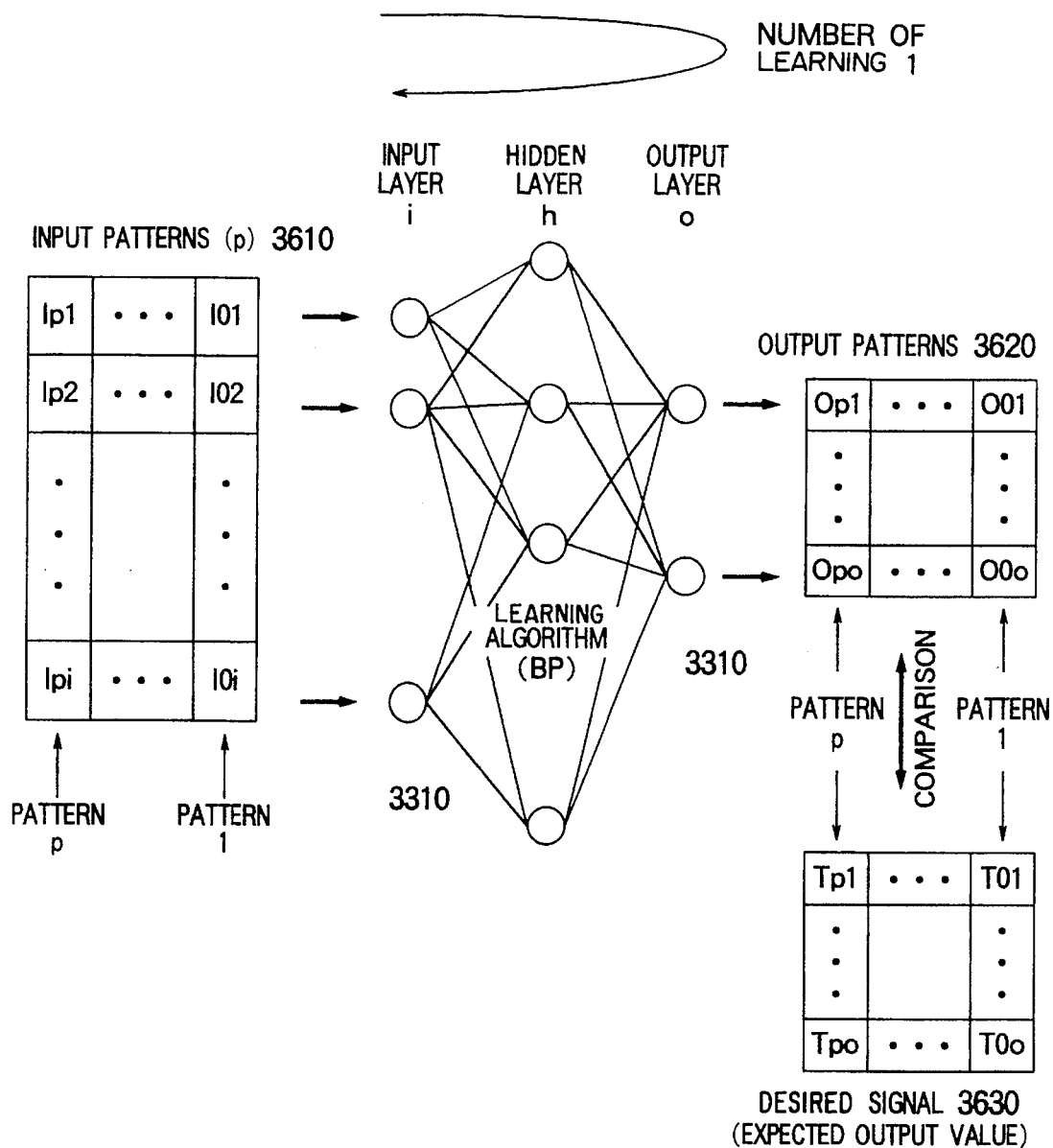
FIG. 6 illustrates an example of information necessary for the execution of learning.

FIG. 6 illustrates information necessary for the execution of BP. In FIG. 6, it is assumed that the learning algorithm and the interconnection (network structure) of neurons 3310 are fixed and that learning is repeated by learning times l while changing the input pattern 3610 by input pattern number p times. As the input pattern 3610 changes, the output pattern 3620 and desired signal (expected output .values) change essentially. The comparison result between the output pattern 3620 and desired signal 3630 is reflected on the renewal of weights between neurons 3310.

Figure 7:
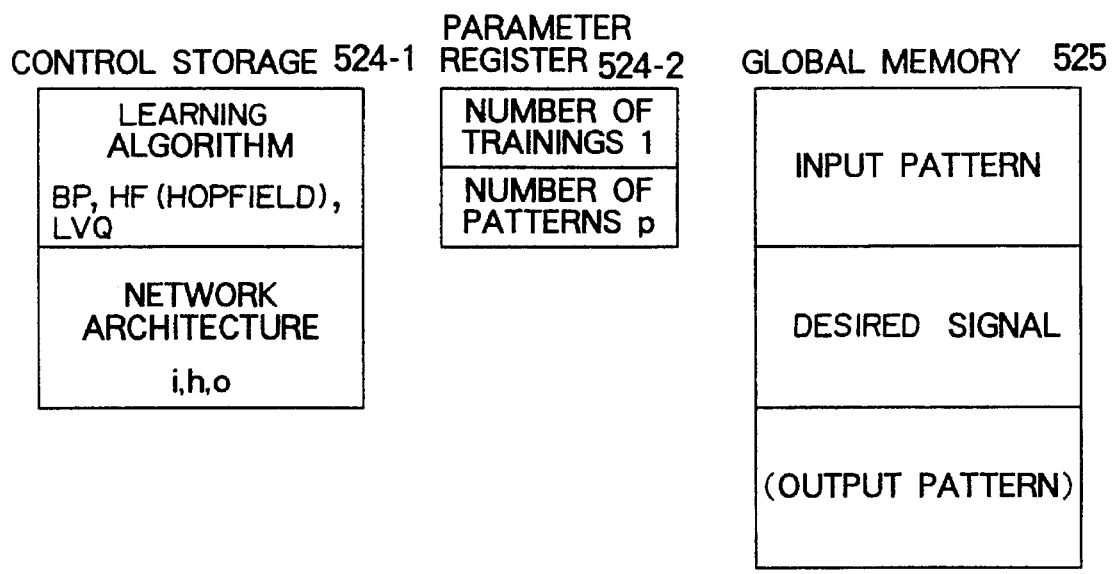
FIG. 7 illustrates information necessary for the learning execution and corresponding storage locations.
Figure 8:
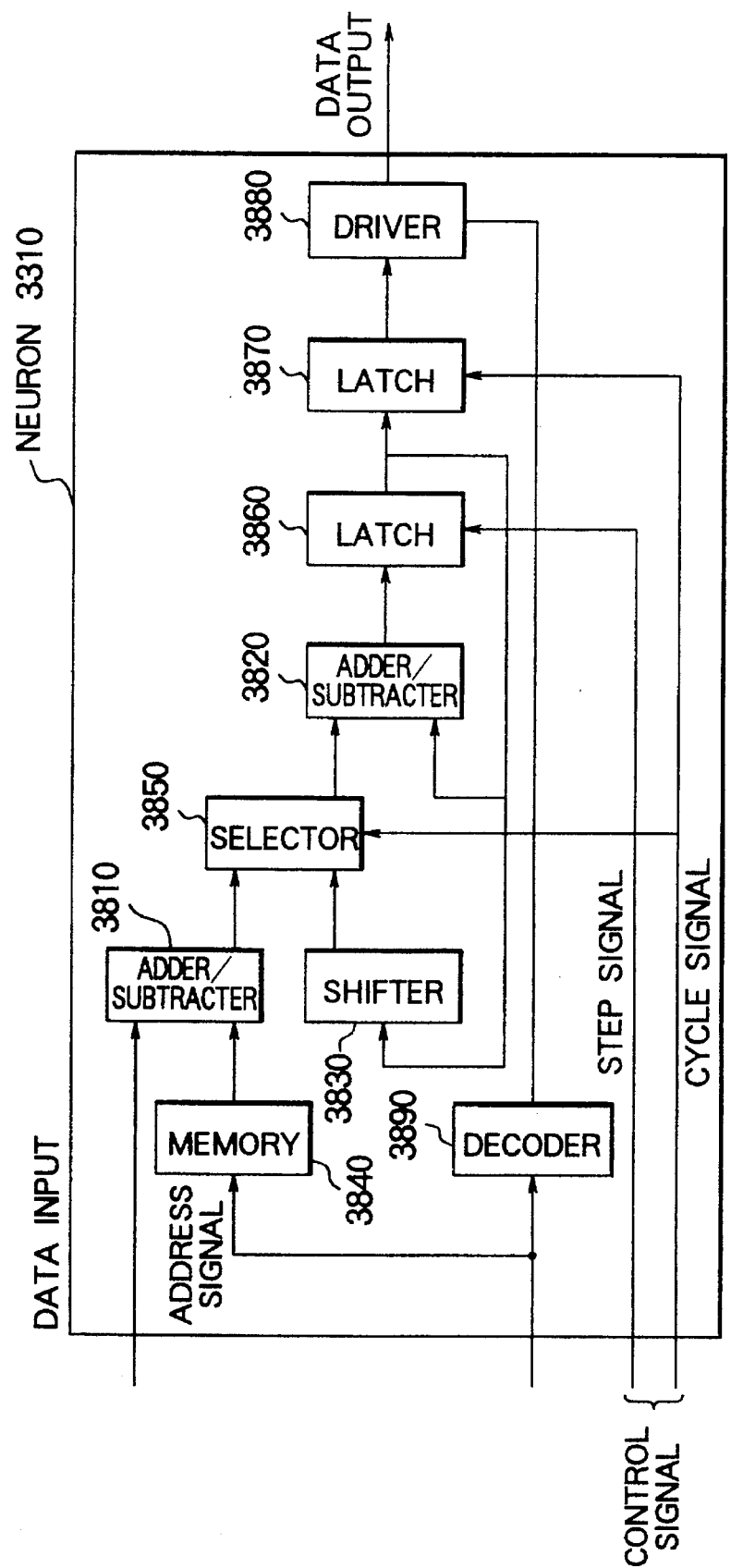
FIG. 8 illustrates an example of a conventional learning algorithm of a hard wired scheme.

FIG. 7 illustrates the components for storing information necessary for the execution of BP illustrated in FIG. 6. Of the information illustrated in FIG. 6, the information which is fixedly used (i.e., less modified) such as the learning algorithm (BP) and neural network structure (interconnection between an input layer i, a hidden layer h, and an output layer o), is stored in the control storage unit 524-1d. Variable information not relevant to the neural network structure, such as the number l of learnings and the number p of input patterns, is stored in the parameter register 524-2. Input/output data of the neural network such as the input pattern 3610, output pattern 3620, and desired signal 3630, is stored in the global memory 525. Assuming the ordinary operation where learning is repeated while changing the variable information not relevant to the neural network structure, such as the number l of learnings and the number p of input patterns, the learning number l or input pattern number p is transferred from the host computer 502 to the neuro-computer 501 (refer to FIG. 1) to change the contents of the parameter register 524-2. It takes a very short time to perform the above operation, posing no trouble in practical operation.

The fundamental views of the invention have been presented with reference to FIGS. 1 to 7. Embodiments of the invention will be described with reference to FIGS. 9 to 36.

Figure 9:
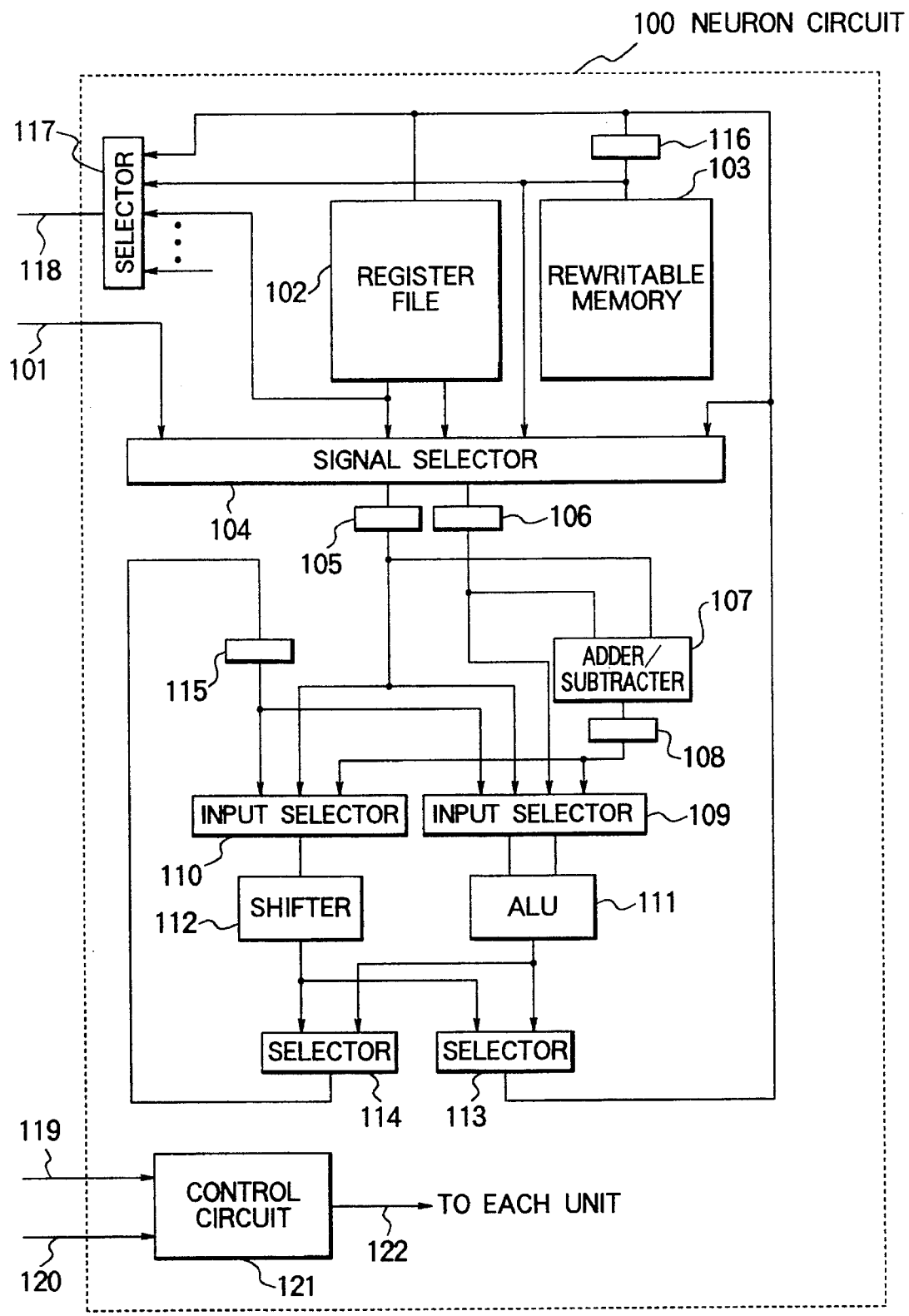
FIG. 9 shows the fundamental circuit structure of a neuron.

A second neuron shown in FIG. 9 has a structure slightly different from that of the first neuron shown in FIG. 3. However, the basic concept is generally the same. The fundamental structure of the second neuron circuit of the invention is shown in FIG. 9. One operation group (shifter, ALU, and etc.) is provided for each neuron as shown in FIG. 9. One operation unit may be provided for a plurality of neurons, or conversely a plurality of operation units may be provided for one neuron.

The neuron circuit 100 shown in FIG. 9 receives input data 101, an external control signal 119, and a neuron select signal 120 from the external circuit, and outputs data 118.

The neuron circuit 100 has a register file 102 and a rewritable memory 103. Pointers to the register file 102 and rewritable memory 103 are generated by a controller 121. Two pointers are prepared for the register file 102, allowing the file 102 to output two values indicated by the pointers at the same time. In accordance with an internal control signal 122 supplied from a control circuit 121, a signal selecting means 104 selects two signals from the two output signals of the register file 102, an output of the rewritable memory 103, the input data 101 to the neuron circuit 100 from the external circuit, and an output of a first operation result selecting means 113. It is preferable that data of the rewritable memory 103 is configured flexibly. For example, it may be set that the weight value w is 16 bits, a weight change amount Δw is 8 bits, or the weight value is 8 bits. To use both the units of 16 bits and 8 bits, the signal selecting means 104 is configured such that it receives data of 16 bits, and selects one of the upper 8 bits, lower 8 bits, and full 16 bits in accordance with the internal control signal 122. The two signals selected by the signal selecting means 104 are held by two selected signal holding means 105 and 106 in response to an internal control signal 122, to thereby constitute pipelining in the neuron circuit 100. These and other holding means may be realized by edge-trigger type flip-flops. The two signals held are multiplied by a multiplier 107, the result being held by a multiplied result holding means 108 in response to an internal control signal 122. It takes a long time for a digital multiplier to perform a multiplication. Therefore, the holding means such as flip-flops are placed before and after the multiplier as described above. It is therefore possible to eliminate a memory access time and signal select time in the pitch of pipelining, lessening the pitch of pipelining. In accordance with an internal control signal 122, an ALU input selecting means 109 selects two signals from the multiplied result holding means 108, two selected signal holding means 105 and 106, and operation result holding means 115, the selected two signals being inputted to an ALU 111. In accordance with another internal control signal 122, a shifter input selecting means 110 selects one signal and inputs it to a shifter 112. In accordance with an internal control signal 122, ALU 111 selects and executes one operation such as addition and logical operation. In accordance with an internal control signal 122, the shifter 112 shifts the input signal either through arithmetic shift or logical shift. In accordance with an internal control signal 122, two operation result selecting means 113 and 114 select the outputs of ALU 111 and the shifter 112. In this example, the two operation result selecting means 113 and 114 use the same control signal so that when the first operation result selecting means 113 selects an output of ALU 111, the second operation result selecting means 114 selects an output of the shifter 112, and when the first operation result selecting means 113 selects an output of the shifter 112, the second operation result selecting means 114 selects an output of ALU 111, thereby reducing the number of control signals while allowing a parallel operation of ALU 111 and the shifter 112. In accordance with an internal control signal, an output of the second operation result selecting means 114 is held by the operation result holding means 115. Data selected by the first operation result selecting means 113 is inputted to the signal selecting means 104, memory write value holding means 116, register file 102, and output selecting means 117. The memory write value holding means 116 executes a write control in accordance with an internal control signal 122 different from the internal control signal 122 for the data write into the rewritable memory 103, so that data is held until it can be written in the memory 103 at the timing when data write will not overlap the data read. Data write into the register file 102 is also executed in accordance with an internal control signal 122. At this time, a read pointer is used. In accordance with an internal control signal 122, the output selecting means 117 selects data to be outputted to the external circuit from an output of the rewritable memory 103, an output of the register file, and outputs of other holding means. If the signal inputted to the output selecting means 117 has bits greater than an output signal 118, the output selecting means 117 divides the original signal and selects the bits to be outputted in accordance with an internal control signal 122. The internal control signals 122 used for controlling the internal circuits of the neuron circuit 100 are generated by the control circuit 121 from an external control signal 119, neuron select signal 120, and ALU 111. An instruction is basically of a horizontal type, and most of the internal control signals 122 are the external control signal 119 itself.

Figure 10:
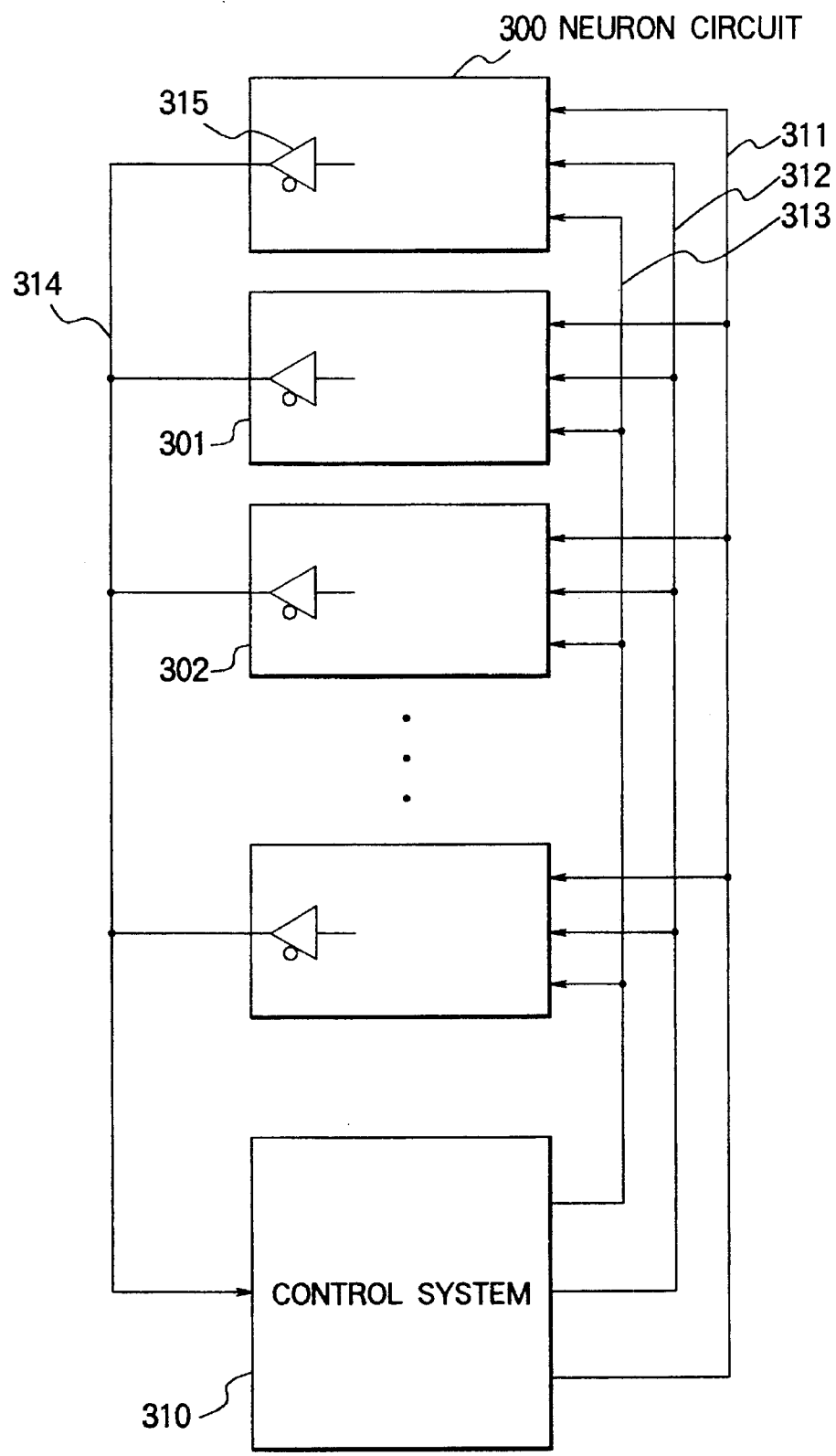
FIG. 10 illustrates the interconnection between a plurality of neurons by busses.
Figure 11:
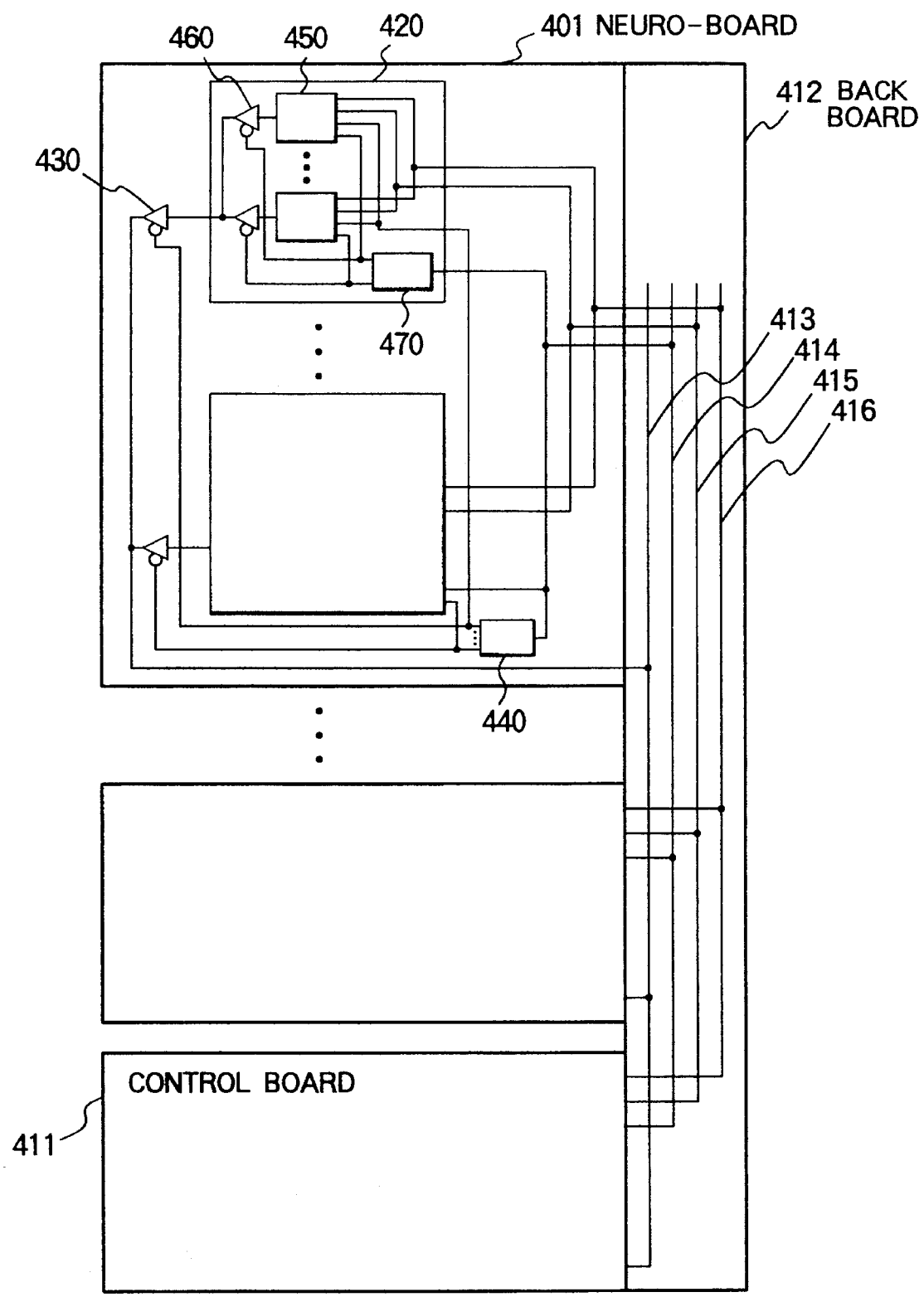
FIG. 11 shows a hierarchical interconnection of neurons.

FIG. 10 shows the structure of neuron circuits interconnected by time-shared busses as described with conventional techniques. This structure reduces the wiring area, but is very inefficient because all neurons are wired continuously by a single wiring, complicating the wiring pattern. In view of this, neuron circuits are interconnected hierarchically in practice as shown in FIG. 11. Each neuro-chip 420 has a plurality of neuron circuits 450, and each neuron board 401 has a plurality of neuro-chips 420. Each neuro-computer has a plurality of neuron boards 401, a control board 411, and a back board 412 interconnecting these neuron boards and control board. An address bus 414, input data bus 415, and control signal bus 416 extend from the control board 411 and are connected to each neuron board 401. In each neuron board 401, a decoder 440 checks whether its board has a neuron designated by an address signal, detects which chip of its board has the designated neuron, and generates a chip select signal. The chip select signal is sent to each neuro-chip 420. At the same time, part of the contents of the address bus 414 supplied from the back board 412, and the contents of the input data bus 415 and control signal bus 416, are distributedly supplied to each neuro-chip 420. Similar to the process in each neuro-board, in each neuro-chip, a decoder 470 decodes an inter-chip address of the address signal, and generates a neuron select signal. The contents of the input data bus and control signal bus supplied from the neuro-board 401 are distributedly supplied to each neuro-circuit 450 of the neuro-chip 420. For the output data, in each neuro-chip 420, a tri-state buffer 460 is controlled to turn on and off by using a neuron select signal generated by the decoder 470, to select one neuro-circuit from the neuro-chip 420 and output its value. In each neuro-board 401, an output of one neuro-chip 420 is selected and outputted by controlling a tri-state buffer 430 by a chip select signal generated by the decoder 440. In each neuro-board 401, the decoder 440 decodes the address signal to check whether the neuro-board has the designated neuron, and controls the tri-state buffer for the switching between the neuro-board 401 and back board 412. In this manner, in the back board 412, the output value of the neuron designated by the address signal is delivered to an output data bus 413. The output data on the output data bus 413 is received by the control board 411, and written in a memory of the control board 411 or outputted to the input data bus 415, in accordance with a microprogram. FIG. 12 shows an example of the structure of a neuro-computer, which is the detailed structure of the neuro-computer shown in FIG. 1. The neuro-computer system is divided mainly into a host computer 502 and a neuro-computer 501. The neuro-computer 501 has a control board 511 and neuro-boards 512 and 513. A back board 514 with wirings and tri-state buffers is omitted in FIG. 12. A user prepares microprograms and learning data and performs other necessary processes such as assembly. The microprograms and learning data are inputted to the host computer 502, and transferred via a SCSI interface logic circuit 551 and a SCSI bus 503 to a SCSI interface logic circuit 522 of the neuro-computer 501. The trained results and other data can be read from the neuro-computer 501 to the host computer 502 via the SCSI bus 503. SCSI can connect serially a plurality of machines. Therefore, a plurality of neuro-computers 501 may be used in parallel by a single host computer 502, or a single neuro-computer 501 may be used time-shared by a plurality of host computers 502. If the host computer 502 has a LAN interface, another computer can access the neuro-computer 501 via LAN and the host computer 502. The transferred microprograms and data are written in, and read from, a control storage 524 and global memory 525, respectively, via a control logic 521 under the control of a CPU 523 of the control board 511. When a start instruction is sent from the host computer 502, the neuro-computer starts operating in accordance with the microprograms loaded in the control storage 524.

Receiving the start instruction supplied via an external bus 4035, the control logic 521 reads a microprogram from the control storage 524. If the microinstruction of the read microprogram is an instruction to each neuron, the microinstruction is outputted via a neuron controlling means 4011 to the control signal bus 551 to be executed at each neuron. If the microinstruction of the read microprogram is an instruction to the control logic 521, it is decoded and executed. In executing this instruction, there are performed an access to the global memory 525, a generation of a neuron address and output of it to the neuron address bus 552, a fetch of the output value of the neuron via the output bus 553, and an update of the address in the control storage 524.

Figure 28:
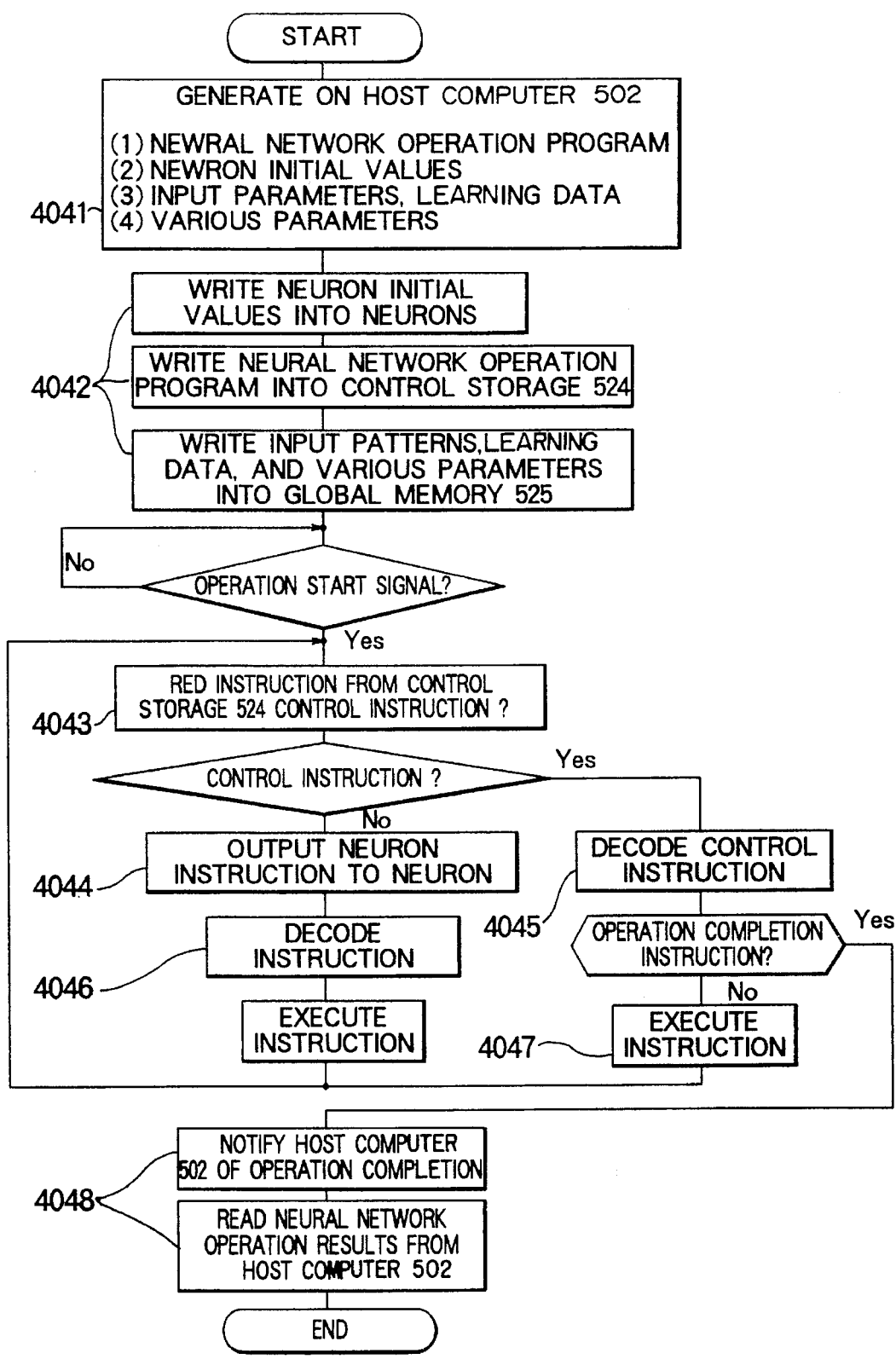
FIG. 28 is a flow chart explaining the outline of the operation of a neuro-computer system.

The detailed operation of the neuro-computer 501 having the overall structure shown in FIG. 12 will be described with reference to the flow chart of FIG. 28 illustrating the operation outline. Generated first on the host computer 502 are a neural network operation program, initial values of neurons, input patterns, desired signal if necessary, and learning parameters (flow 4041). Next, via the SCSI interface logic circuit 551 and SCSI bus 503 on the host computer 502 side and via the SCSI interface logic circuit 522 and external bus 4035 on the neuro-computer 501 side, initial values of neurons are supplied to neuro-chips 541 and 542, the neural network operation program is stored in the control storage 524, and input patterns, desired signal if necessary, and learning parameters are written in the global memory 525 (flow 4042). Upon reception of a neural network operation start signal from the host computer 502, an instruction of the program is read from the control storage at an address generated by a control storage controlling means 524 of the control logic 521 (flow 4043). Each neuron receives the instruction on the control signal bus 661, and decodes and executes it (flow 4046). If there is an instruction to a global memory controlling means 4013, the global memory control means 4013 reads data from the global memory 525 and outputs it to the input bus, or writes data on the output bus 554 into the global memory 525. If the read instruction is to the control logic 521, it is decoded (flow 4045). If the decoded control instruction is not an operation completion instruction, the control operation is executed (flow 4047). Until the decoded instruction becomes an operation completion instruction, the flows 4043, 4044, 4045, 4046, and 4047 are repeated. When the decoded instruction becomes the operation completion instruction, the operation completion is informed to the host computer 502, and if necessary, the host computer 502 reads the operation results of the neural network (flow 4048).

Figure 29:
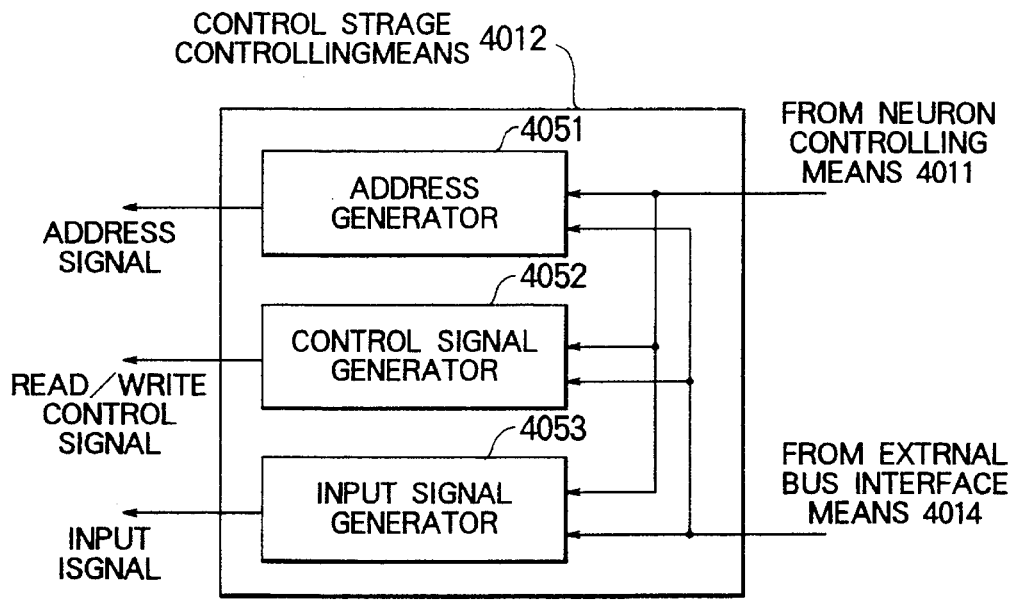
FIG. 29 is a detailed block diagram of the control storage controlling means.

FIG. 29 is a detailed block diagram of the control storage controlling means 4012 of the control logic 521 shown in FIG. 12. The control storage controlling means 4012 has an address generator circuit 4051 for generating an address for the control storage, a control signal generator circuit 4052 for generating a read/write signal for the control storage, and an input signal generator circuit 4053 for generating an input signal to the control storage. These circuits operate upon reception of a control instruction by the neuron controlling means 4011, or may be operated directly by an external bus interface means 4014.

Figure 30:
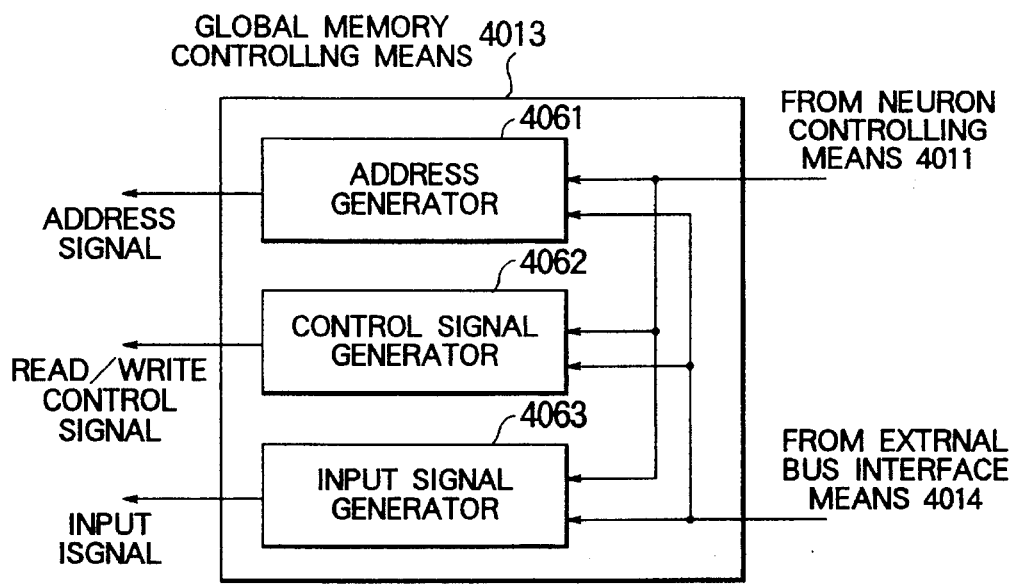
FIG. 30 is a detailed block diagram of the global memory controlling means.

FIG. 30 is a detailed block diagram of the global memory controlling means 4013 of the control logic 521 shown in FIG. 12. The global memory controlling means 4013 has a global memory address generator circuit 4013 for generating a global memory address, a global memory control signal generator circuit 4062 for generating a read/write signal for the global memory, and a global memory input signal generator circuit 4063 for generating an input signal to the global memory. These circuits operate upon reception of a neuron instruction and a control instruction generated by the neuron controlling means 4011, or may be operated directly by an external bus interface means 4014.

Figure 31:
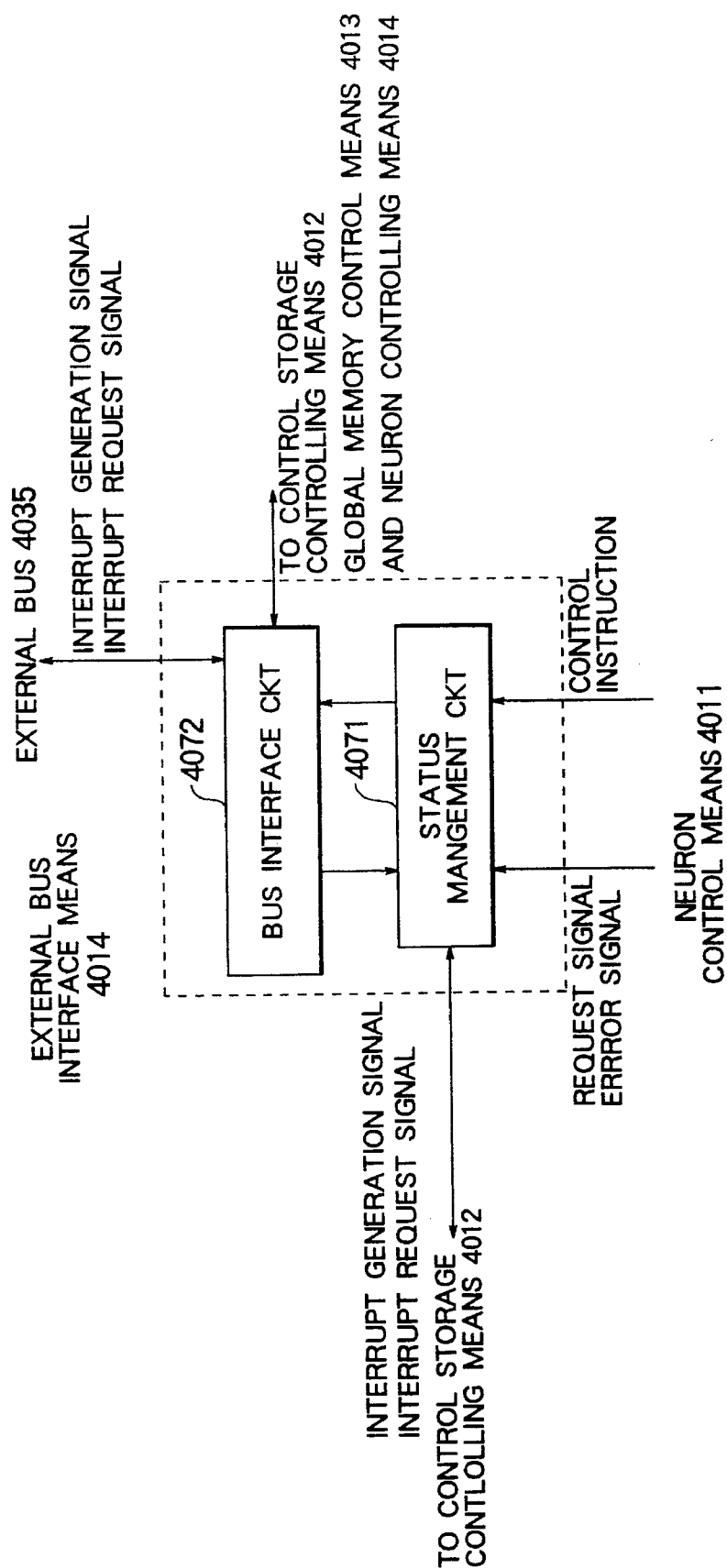
FIG. 31 is a detailed block diagram of the external bus interface means.

FIG. 31 is a detailed block diagram of the external interface means 4014 of the control logic 521 shown in FIG. 12. The external interface means 4014 has a status management circuit 4071 and a bus interface circuit 4072. Via the bus interface circuit 4072 and prior to the start of the network operation, the network operation program on the external bus 4035 is written in the control storage 524 and the data necessary for the network operation is written in the global memory 525. After the completion of the network operation, the data is outputted to the external bus 4035 via the bus interface circuit 4072. During the network operation, in accordance with the control instruction generated by the neuron controlling means 4011, the status management circuit 4071 receives a request signal or an error signal from each neuron, and sends an interrupt request signal to the control storage controlling means 4012 or sends an interrupt generation signal to the bus interface circuit 4072. Conversely, it sends an interrupt generation signal from the control storage controlling means 4012 to the external bus 4035. The status management circuit 4071 also receives an interrupt request signal from the bus interface circuit 4072 and sends an interrupt request signal to the control storage controlling means 4012.

Figure 32:
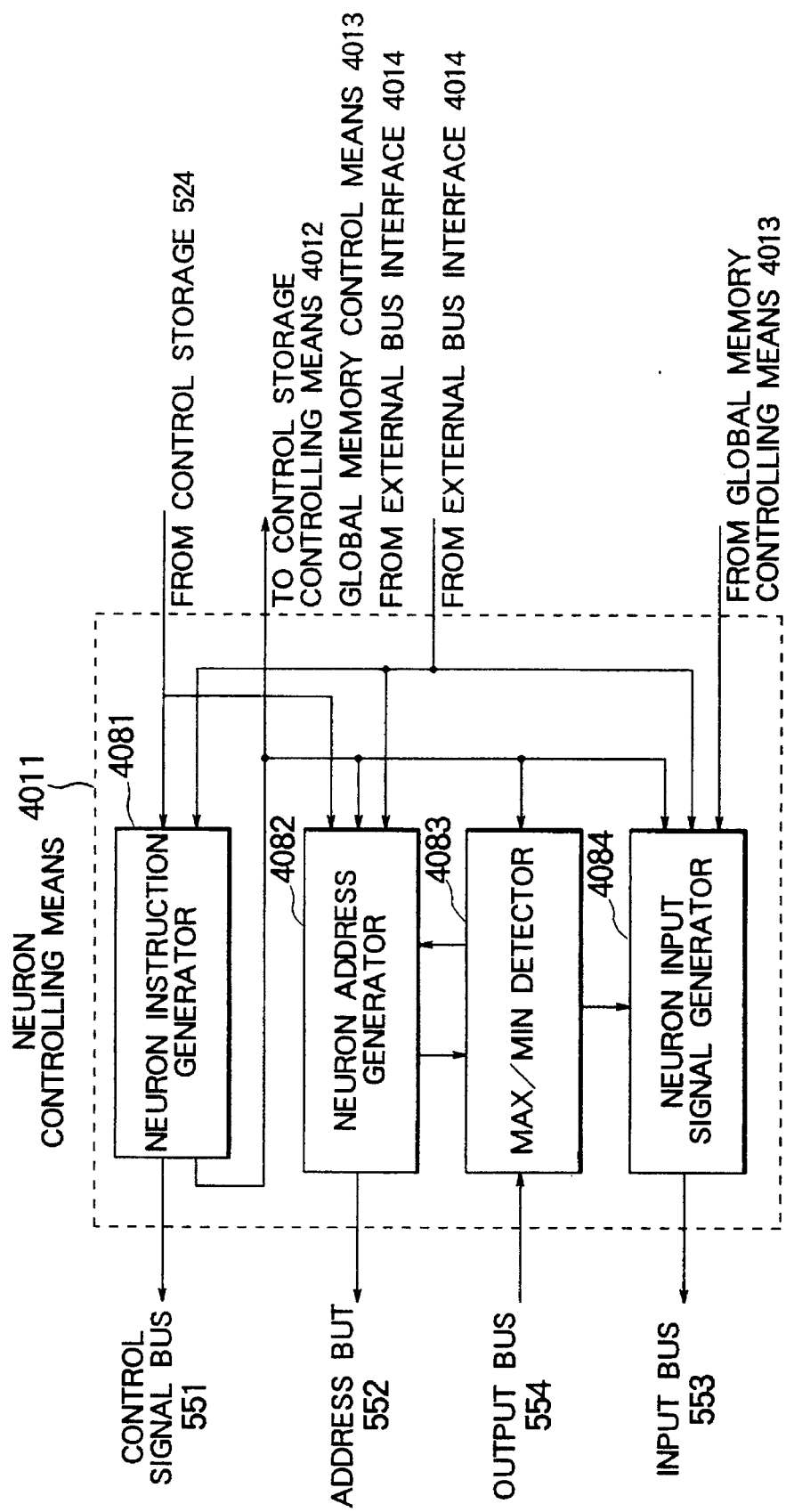
FIG. 32 is a detailed block diagram of the neuron controlling means.

FIG. 32 is a detailed block diagram of the neuron controlling means 4011 of the control logic 521 shown in FIG. 12. The neuron controlling means 4011 has a neuron instruction generator circuit 4081, a neuron address generator circuit 4082, a max/min detector circuit 4083, and a neuron input signal generator circuit 4084. The neuron instruction generator circuit 4081, if the instruction read from the control storage 524 is an instruction to each neuron, outputs it to the control signal bus, and if it is an instruction to the control logic 521, decodes and executes it. The neuron address generator circuit 4082 translates a logical address sent from the neuron instruction generator circuit 4081 into a real address and sends it to the address bus 552. The max/min detector circuit 4083 responds to a control instruction and detects the addresses of neurons having maximum and minimum output values among neurons belonging to an optional group. The neuron input signal generator circuit 4084 selects either the data sent from the global memory controlling means 4013 or the neuron outputs sent from the max/min detector circuit 4083. These circuits operate upon reception of a control instruction generated by the neuron instruction generator circuit 4081, or may be operated directly by the external bus interface means 4014.

Figure 33:
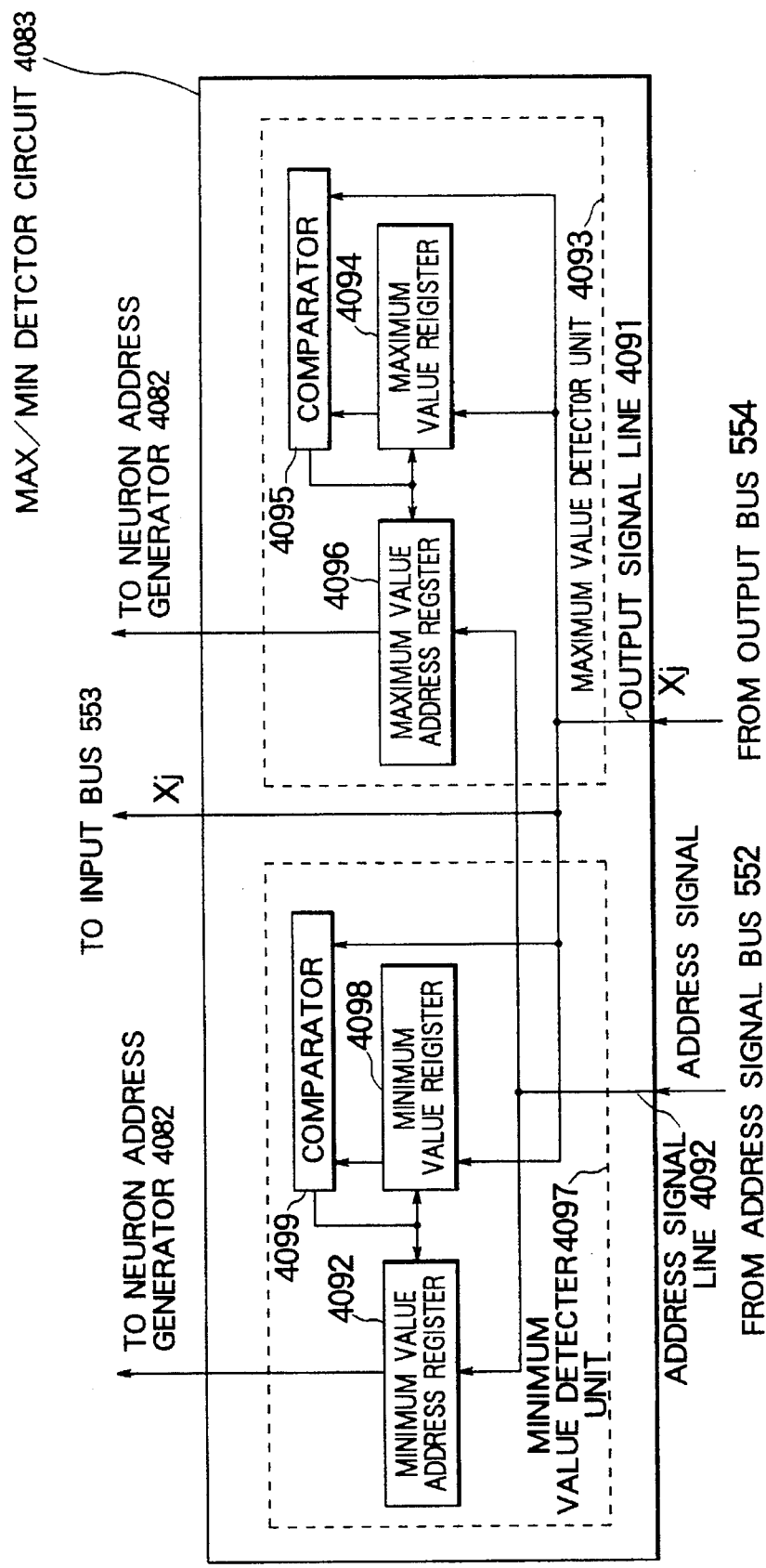
FIG. 33 is a detailed block diagram of the max/min detector circuit.

The structure and operation of the max/min detector circuit 4083 will be described in detail with reference to FIG. 33. A broadcast neuron output value $X_j$ is inputted from an output signal line 4091 connected to the output bus 554, and the address of the presently broadcast neuron is inputted from an address signal line 4092 connected to the address bus 552. The max/min detector circuit 4083 has a maximum value detector 4093 and a minimum value detector 4097. In the maximum value detector 4093, a comparator 4095 compares the past maximum value stored in a maximum value register 4094 with the broadcast value $X_j$. If the present value is larger than the past maximum value, the maximum value register 4094 and maximum value address register 4096 are renewed. In the minimum value detector 4097, a comparator 4099 compares the past minimum value of past values stored in a minimum value register 4098 with the broadcast value $X_j$. If the present value is smaller than the past minimum value, the minimum value register 4098 and minimum value address register 409a are renewed. After all the output values of neurons belonging to a group to be detected have been broadcast, the max/min detection operation is completed. At this time, the address of a neuron having a maximum output value is stored in the maximum value address register 4096, and the address of a neuron having a minimum output value is stored in the minimum value address register 409a.

Figure 34:
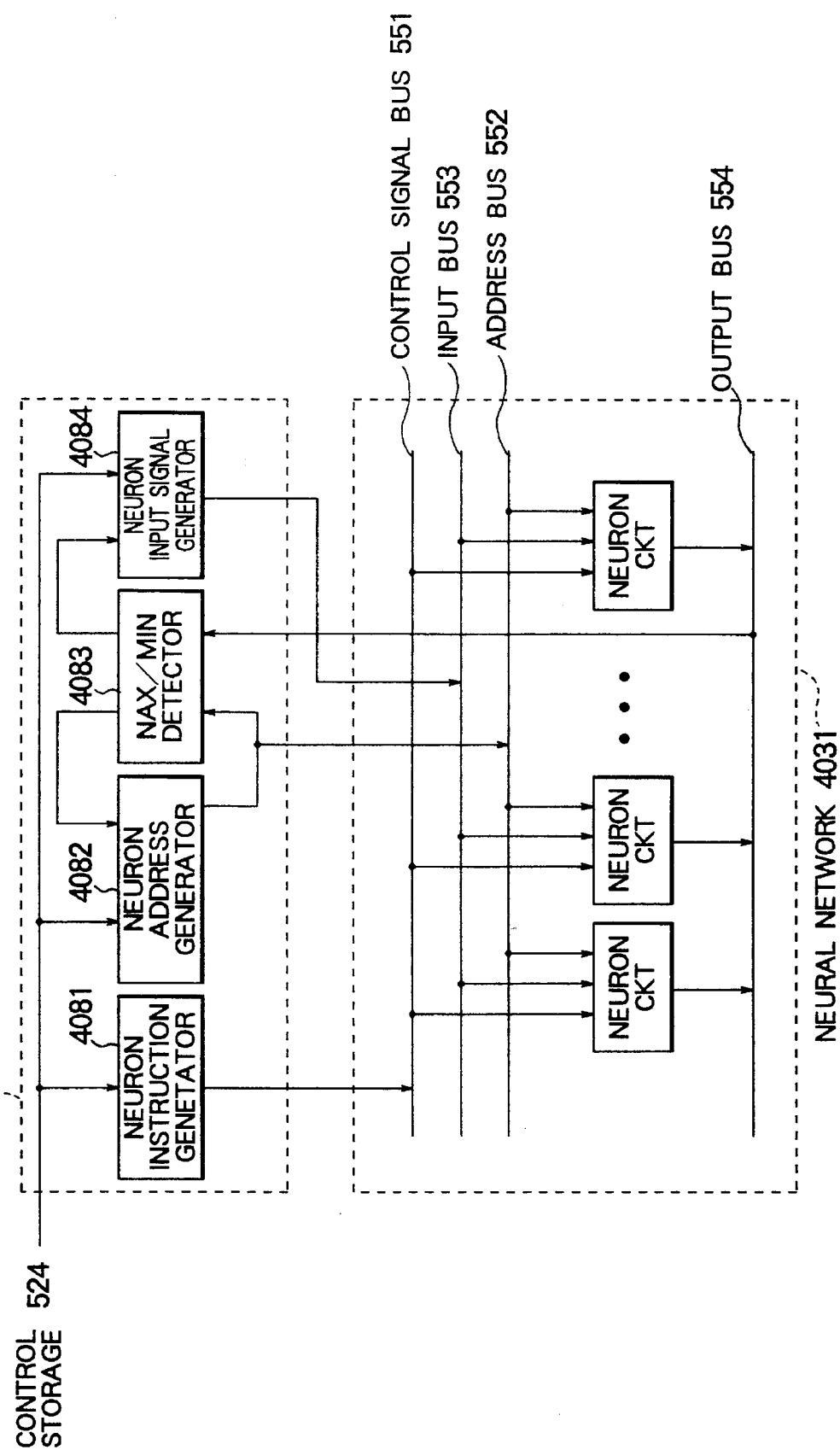
FIG. 34 is a diagram explaining the max/min detection operation.
Figure 35:
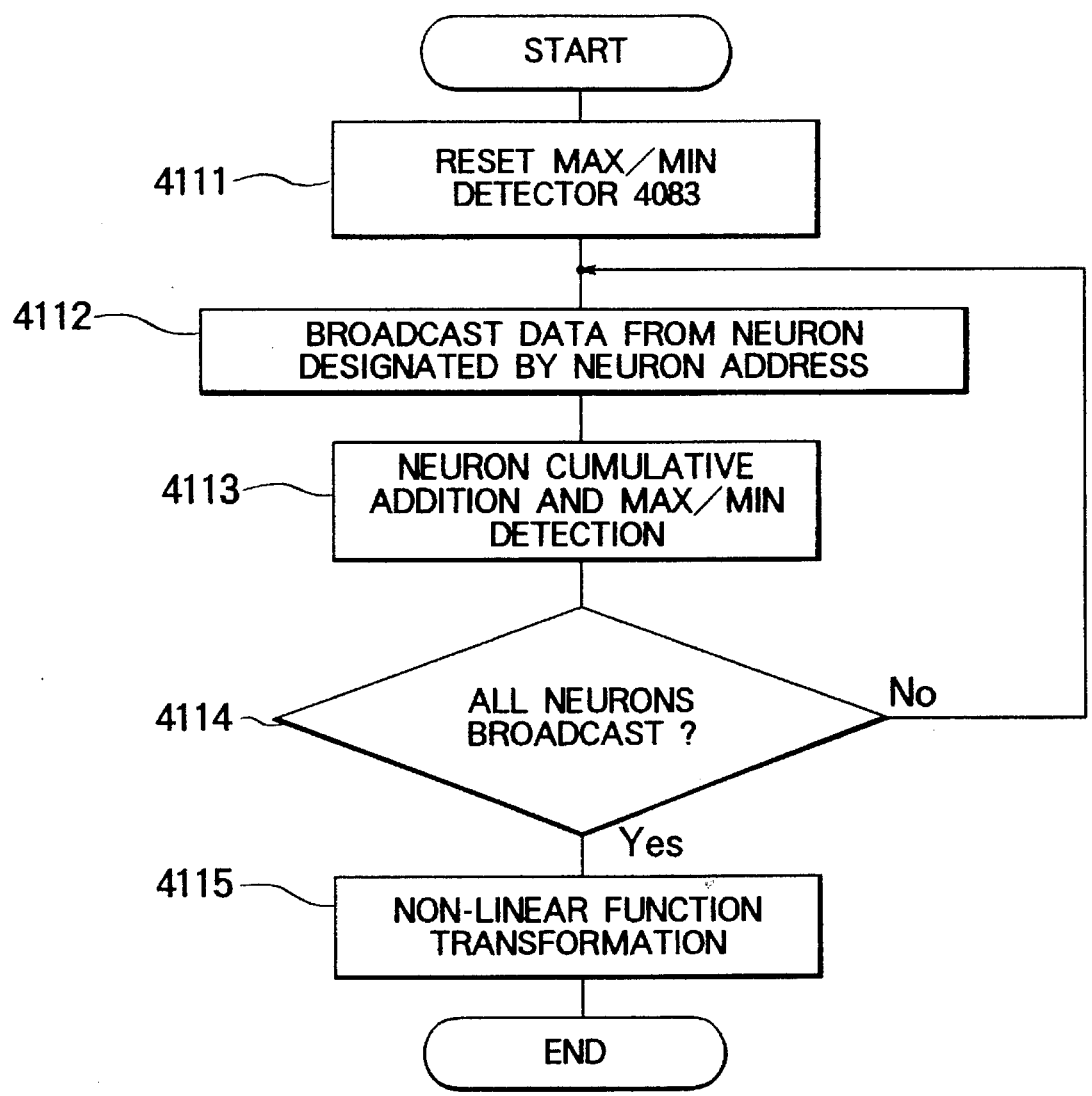
FIG. 35 is a flow chart explaining the outline of the max/min detection operation.

Next, the neural network operation including the max/min detection operation illustrated in the block diagram of FIG. 34 will be described with reference to the flow chart of FIG. 35 illustrating the outline of the operation. The block diagram shown in FIG. 34 is constituted by a neural network 4031 having a plurality of neuron circuits connected to the input bus 553, address bus 552, control signal bus 551, and output bus 554, and the neuron controlling means 4011 including the max/min detector circuit 4083 explained with FIG. 33. First, the max/min detector circuit 4083 is reset (flow 4111). This reset operation includes an operation of setting theoretical minimum and maximum values of neuron circuit output values to the minimum and maximum value registers 4094 and 4098 shown in FIG. 33 and an operation of clearing the maximum and minimum value address registers 4096 and 409a. Next, the neuron address generator circuit 4082 generates a real address of a neuron circuit from which its output value is to be broadcast, the real address being outputted to the address bus 552 and inputted to the neuron circuit and max/min detector circuit 4083. The output value of only the neuron circuit selected by the real address is broadcast to the output bus 554 (flow 4112). The broadcast output value is outputted via the max/min detector circuit 4083 and neuron input signal generator circuit 4084 to the input bus 553 to be inputted to other neuron circuits. At this time, the max/min detector circuit 4083 detects the maximum and minimum values. At the same time, the input signal to a neuron is weighted by a weight and cumulatively added (flow 4113). The flows 4112 and 4113 are repeated by a necessary number of times until the conditions are met (flow 4114). If the conditions are met, a non-linear conversion is performed (flow 4115) to complete the neural network operation. Stored at this time in the max/min detector circuit 4083 are the maximum and minimum values of neurons belonging to an optional group and the logical addresses of the neurons having the maximum and minimum values. If necessary, the logical addresses of the neurons having the maximum and minimum values can be entered to the neuron address generator circuit 4082 to be used by the circuit 4082. By inserting the max/min detector circuit 4083 between the output bus 554 and neuron input signal generator circuit 4084, the maximum and minimum values can be automatically detected without using a particular program. Furthermore, the detection operation is performed in parallel with the broadcasting of each neuron circuit, and it is not necessary to prepare an additional detection time.

Figure 36:
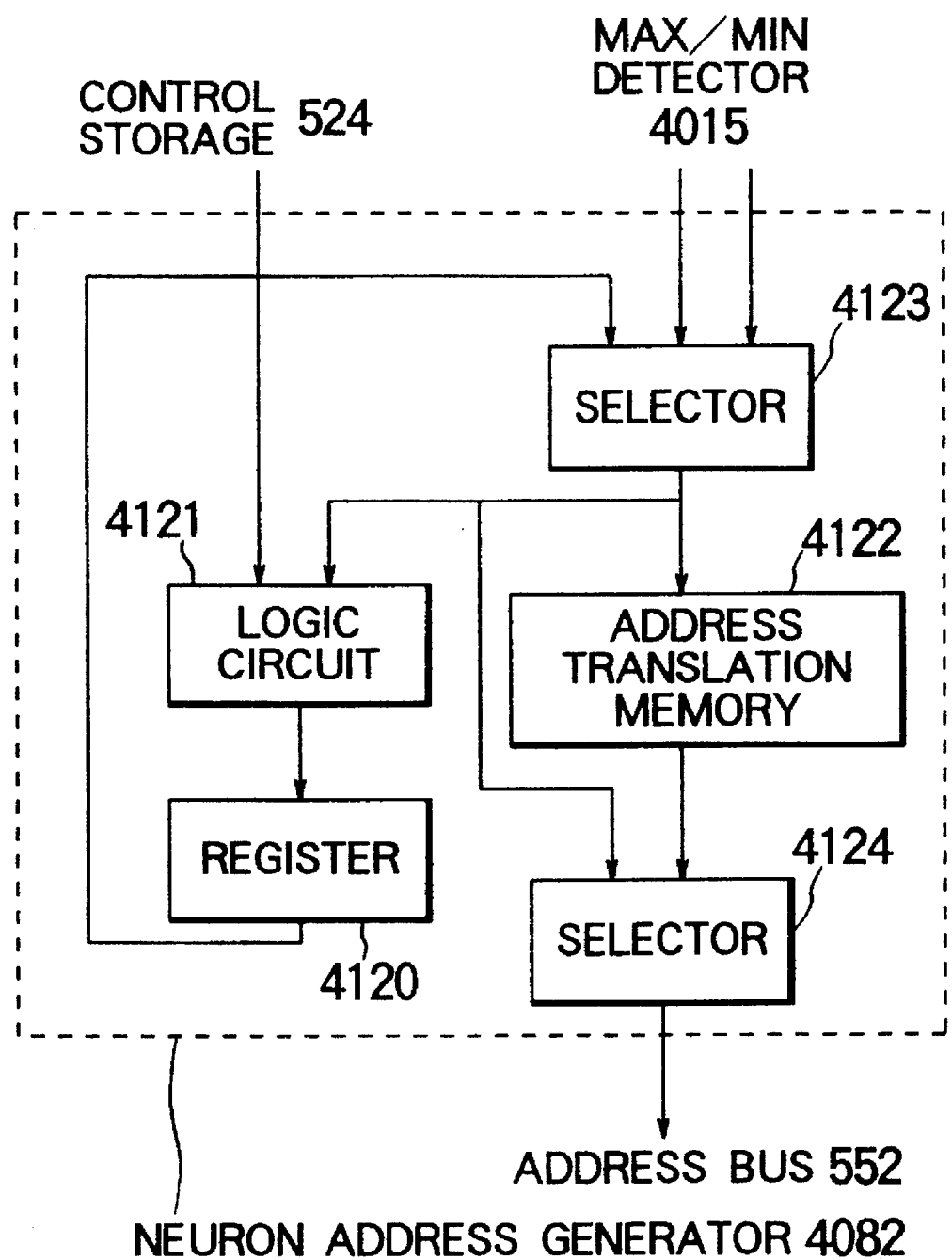
FIG. 36 is a block diagram showing the outline of the neuron address generator circuit.

FIG. 36 is a detailed circuit diagram of the neuron address generator circuit 4082. The neuron address generator circuit 4082 is constituted by a register 4120 for loading a logical neuron address, a logic circuit 4121 for incrementing a logical neuron address by "1" or adding a constant value to the present logical neuron address, an address translation memory 4122 for translating a logical address into a real address, and selectors 4123 and 4124. The operation of the neuron address generator circuit 4082 will be described below. First, real addresses are written in the address translation memory 4122 in the order of accessing neurons. If there is a defective neuron, it is removed by not writing its real address. It is possible to write real addresses in the order of areas less susceptible to noises on a chip or board. Next, a desired logical address initial value is written in the register 4120, and supplied to the address translation memory 4122 by switching the selector 4123 to the register 4120 side. Then, the selector 4124 is switched to the address translation memory 4122 side to output the real neuron address to the address bus 552. To advance the real neuron address, the value of the register 4120 is incremented by using the logic circuit 4121. Only by incrementing the value of the register 4120, neurons can be accessed in the predetermined order because the real addresses have been written in the order of accessing neurons. A constant value may be added to the value of the register 4120 storing the logical neuron address designated by the program, by using the logic circuit 4121. The selector 4123 may be switched to the logical addresses of the neurons having the maximum and minimum values detected by the max/min detector circuit 4083, to use them for the operation of the neural network. The logical neuron address may be directly outputted to the address bus 552 without passing it to the address translation memory 4122 by using the selector 4124.

Figure 13A:
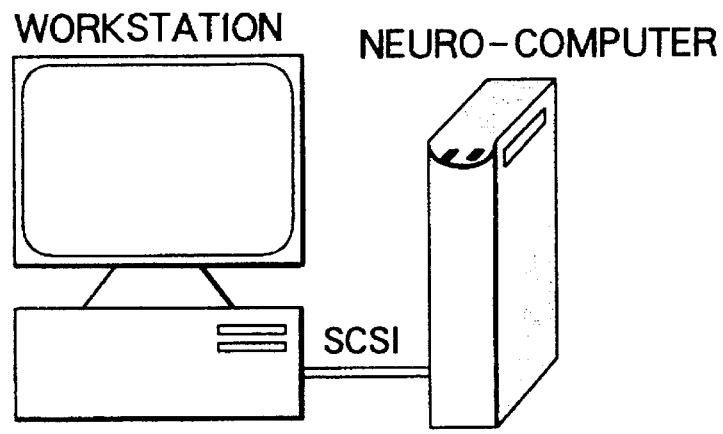
FIG. 13A is a diagram explaining the use of a stand-alone type neuro-computer.
Figure 13B:
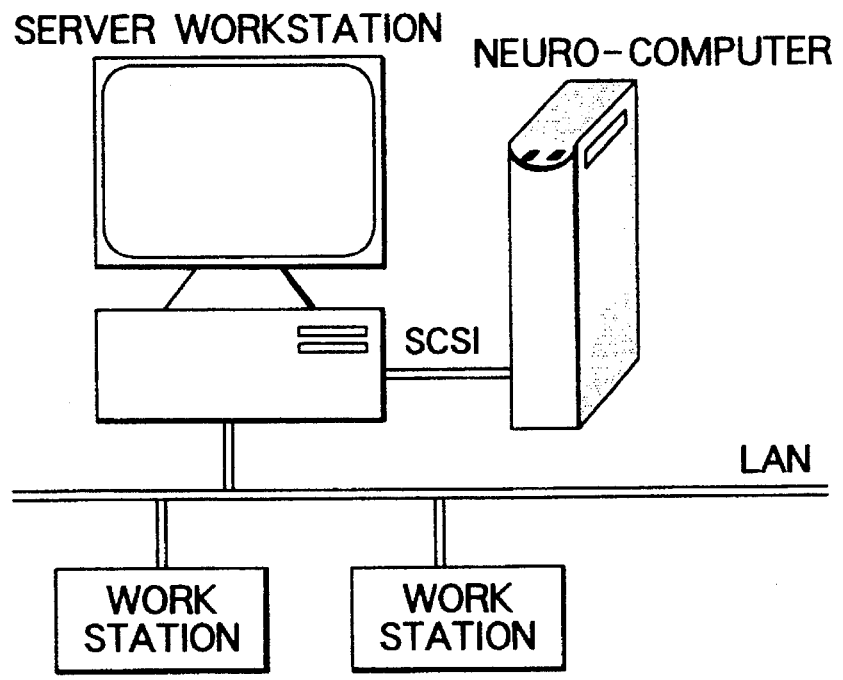
FIG. 13B is a diagram explaining the use of a server type neuro-computer.

FIGS. 13A and 13B illustrate examples of the configuration of neuro computer systems. In FIG. 13A, a single stand-alone workstation is used as a host computer. In FIG. 13B, a server workstation in a client/server environment is used as a host computer, and connected to a LAN to allow other workstations to use the neuro-computer. In this case, the server workstation is required to have software which manages the processes of the neuro-computer.

Figure 14:
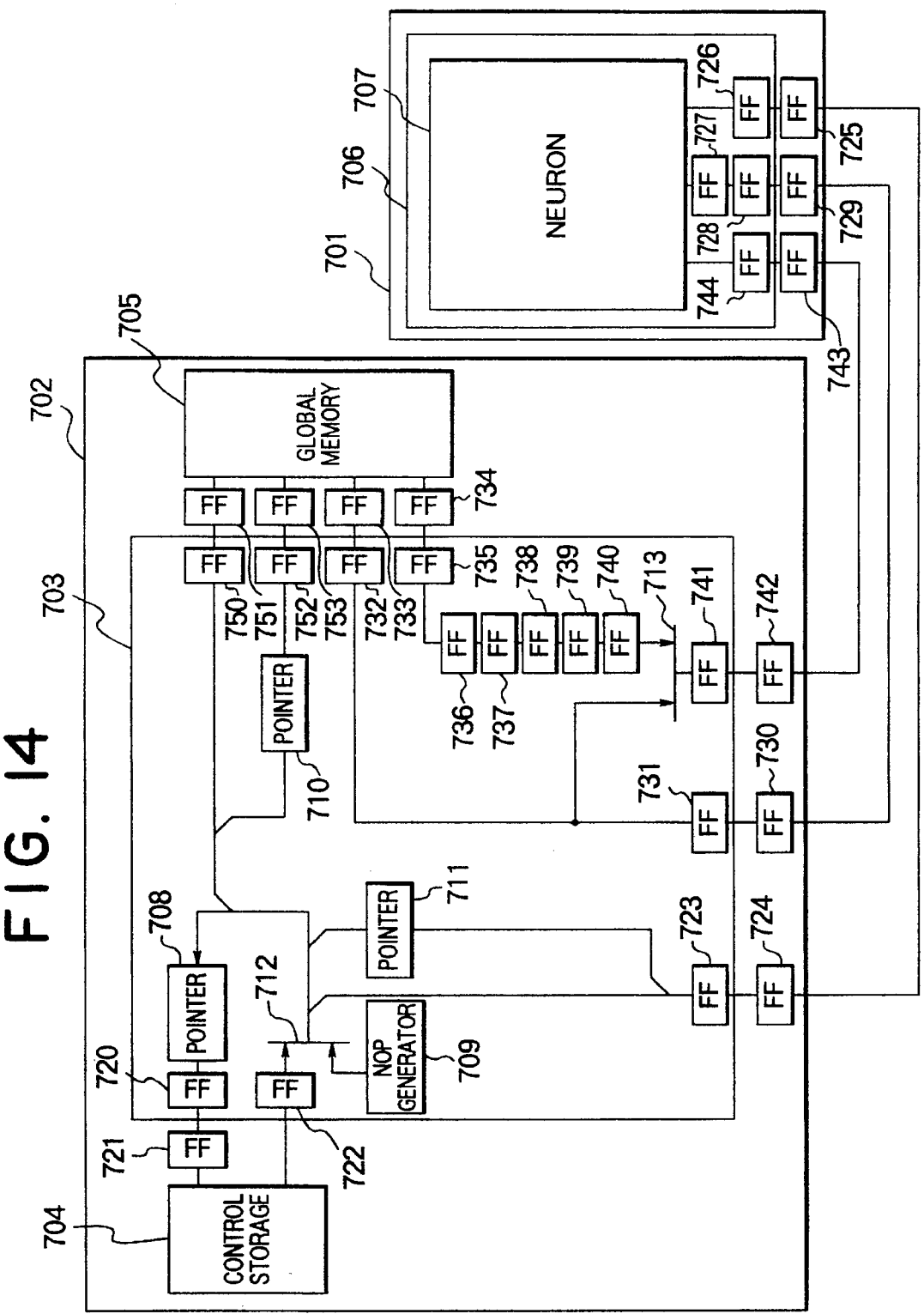
FIG. 14 illustrates an example of pipelining in the system.

FIG. 14 shows an example of pipelining in the neuro-computer for providing a high speed operation. In realizing pipelining, either an edge trigger type flip-flop or a two-phase clock is used. In the following, an edge trigger type flip-flop is used by way of example. As also shown in FIG. 12, a control board 702 is mainly constituted by a control chip 703, a control storage 704, and a global memory 705. The control storage 704 is realized by an SRAM chip. Presently, it takes at least 15 nsec to access this memory. In view of this, the value of a micropointer 708 is used as an address signal for the SRAM control storage 704 by using a flip-flop 720 of the control chip 703 and a flip-flop 721 near the control storage 704, and output data is loaded in a flip-flop 722 of the control chip 703. In this manner, the operation time other than the memory access time is removed from the pitch of pipelining as much as possible. A selector 712 selects either the content of the flip-flop 722 holding a microinstruction described previously or a NOP instruction generated by a NOP generator 709. This selection will be detailed later. In accordance with an instruction outputted from the selector 712, the micropointer 708 is controlled. Also in accordance with the output of the selector 712, neuron pointer and weight value memory pointer 11 are renewed. These two values are used with the control signal one clock before the present control signal, and supplied to the neuron 707 via a flip-flop 723 in the control chip, a flip-flop 724 near the output port of the control board 702, a flip-flop 701 near the input port of the neuron board 701, and a flip-flop 726 in the neuro-chip 706. The address signal is decoded before it reaches the neuron 707 as described previously. However, if the output data is to be controlled in accordance with the decoded result, the address signal is held in a FIFO until the control signal reaches the neuron 707 and the value corresponding to the control signal is outputted, and thereafter decoded and used as the control signal. Upon reception of the instruction from the flip-flop 726, the neuron 707 outputs its value which is picked up by a flip-flop 727 in the neuro-chip 706 at the next clock. Since output data from a plurality of neuro-chips is required to be processed at suitable timings, the output data is inputted to a flip-flop 730 of the control board 702 via two flip-flops 728 and 729 provided near the neuro-chip 706 and near toward the output port of the back board 713 respectively on the neuro board 701. The output data is further inputted to a flip-flop 731 in the control chip 703, and a selector 713 selects either the output data or the value supplied from the global memory 705. The selected data is transferred, like the instruction, to the neuron 707 via a flip-flop 741 in the control chip 703, a flip-flop 742 on the control board 702, a flip-flop 743 on the neuro board 701 in the control board, and a flip-flop 744 on the neuro-chip 706. The global memory 705 is made of an SRAM similar to the control storage 704. A write signal to the global memory in the instruction selected by the selector 712 is supplied to the global memory 705 via flip-flops 750 and 751. In accordance with a control signal for the global memory pointer 710 in the instruction, the global memory pointer 710 is controlled and inputted to an address terminal of the global memory 705 via flip-flops 752 and 753 one clock after the global memory write signal. The data stored in the flip-flop 731 outputted from the neuron is written into the global memory 705 via flip-flops 732 and 733 in accordance with the instruction. In reading data from the global memory 705, the output from the global memory 705 is entered to the control chip 703 via flip-flops 734 and 735. Five flip-flops 736 to 740 are inserted in order to make the timing when the output value of the neuron reaches the selector 713 after the instruction of outputting the value from the neuron was issued, same as the timing when the output value of the global memory 705 reaches the selector 713 after the instruction of outputting the value from the global memory 705 was issued. In this manner, if the instruction of supplying the value in the neuron 707 or global memory 705 to the input bus is contained in the microprogram, the corresponding data is outputted from an input data flip-flop 741 in the control chip 703 after nine clocks after the instruction was outputted from the instruction flip-flop 723 in the control chip 703. Accordingly, in writing a microprogram, after nine steps after an instruction (broadcast instruction) of outputting a value from the neuron 707 or global memory 705, an instruction of using the value at the neuron 707 is written. Similarly, in writing an output value of the neuron 707 into the global memory 705, the time when an instruction reaches the flip-flop 750 and the time when the data reaches the flip-flop 732 are both after nine clocks. As a result, after nine steps after the broadcast instruction for the neuron 707, an instruction of wiring the value into the global memory is written in the microprogram.

Figure 15:
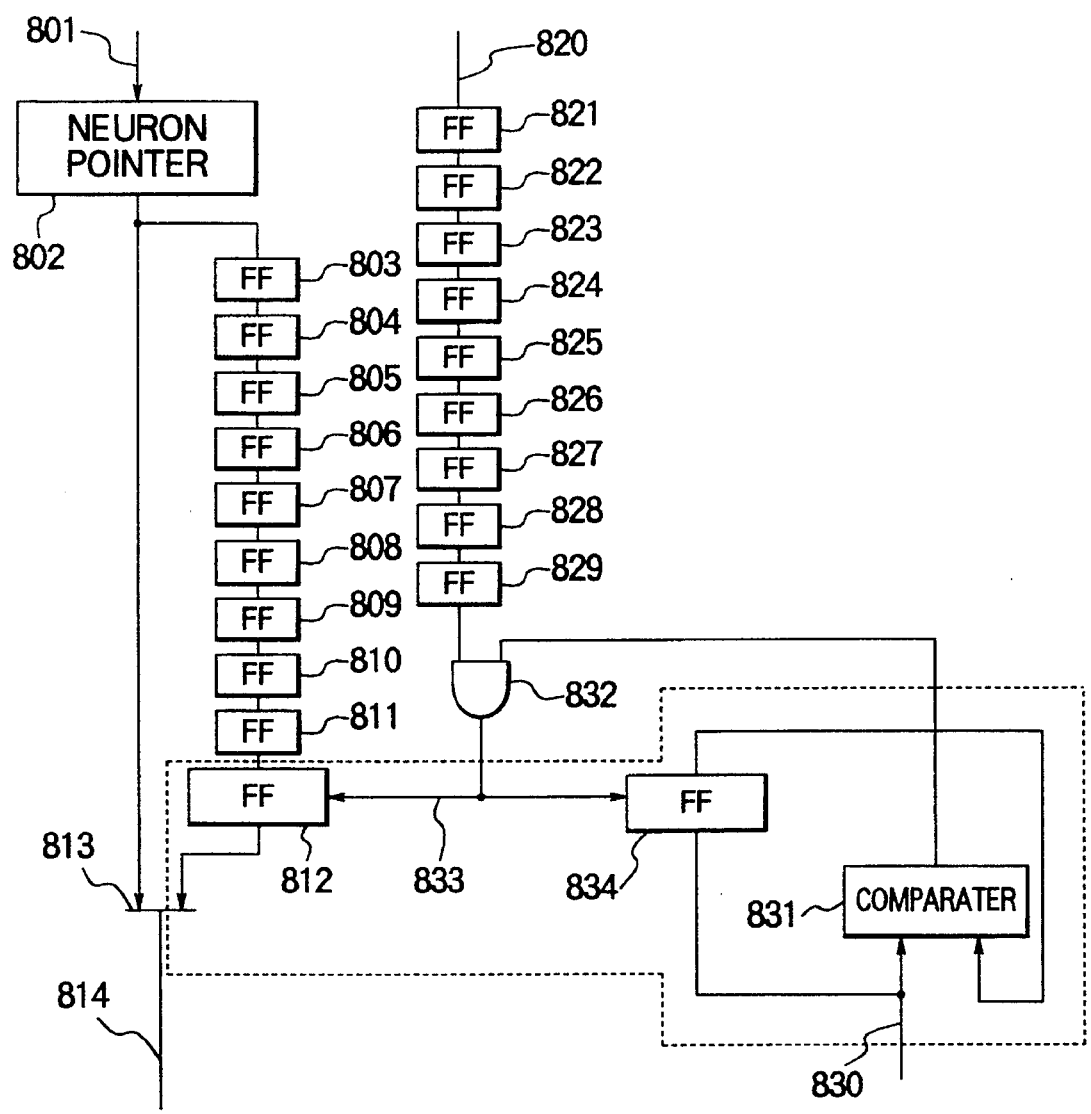
FIG. 15 illustrates an example of pipelining for the max/min detection.

FIG. 15 shows an example of the structure of pipelining in a control chip necessary for realizing a function of detecting the maximum or minimum value of data of neurons and the address of the neuron having the maximum or minimum value. An instruction 801 is inputted to a neuron pointer 802 to renew its value. The value is held, for the period of nine clocks which is a time difference between the instruction and data, in a FIFO made of flip-flops 803 to 811. Similarly, a signal 820 whether the maximum or minimum value is to be entered is held in a FIFO made of flip-flops 821 to 829. Data 830 outputted from the neuron is compared with the value 834 from a flip-flop 834. In the case of detecting the maximum value, the comparator 831 outputs "1" if the output data 830 is larger than the value from the flip-flop 834, and output "0" if not. In response to a signal passed through an AND gate 832, the maximum value is picked up by the flip-flop 834. In this manner, if the output data from the neuron is larger than the already held value and if the signal indicating to pick up the maximum value is entered, a flip-flop 812 holds the address of the neuron having the maximum value and the flip-flop 834 holds the maximum value. Whether the maximum or minimum value is detected can be determined by whether the comparator outputs "1" if the data 830 is larger than the value 834 or it outputs "1" if the data 830 is smaller than the value 834. If both the maximum and minimum values are to be detected, an additional circuit portion same as that enclosed by a broken line is prepared so that the two comparators operate differently for the maximum and minimum values.

Figure 16:
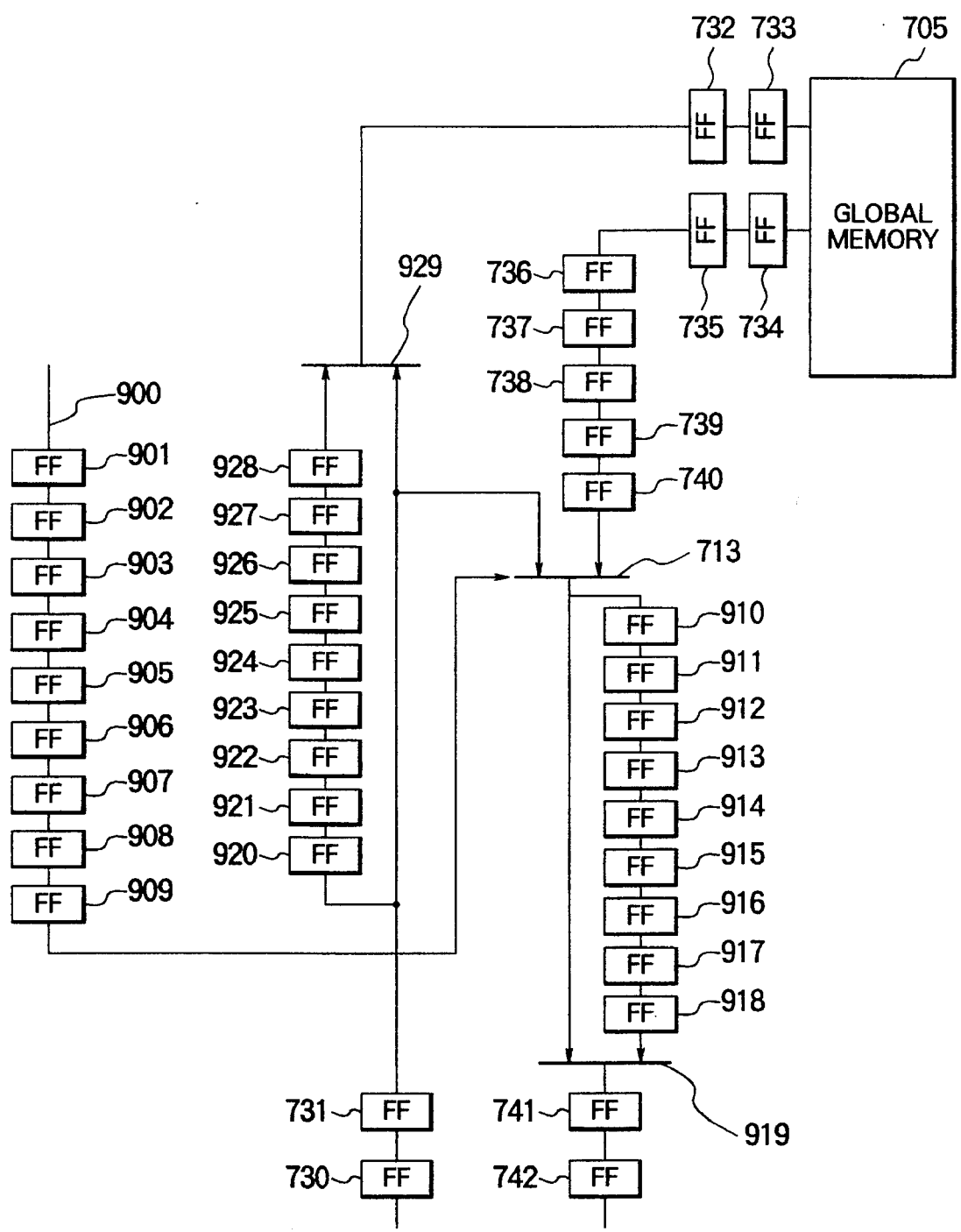
FIG. 16 illustrates an example of pipelining for the data select and data save.

FIG. 16 shows an example of the structure of pipelining for data selecting and data saving. As also explained with FIG. 14, data from the global memory 705 or data from the neuron 707 is selected by a selector 713 using input data as a select signal. This select signal is a signal 900 given as part of the instruction. This select signal is delayed by nine clocks by a FIFO made of flip-flops 901 to 909 to control the selector 713 to operate when the corresponding data reaches. If the operation of the neuro-computer is to be broken in response to an instruction from a host computer or microprogram, it is necessary to save the data in a pipeline circuit. In such a case, it is not efficient to save an instruction itself having a large number of bits, and is unable to save it only at the pipeline circuit. In view of this, all instructions issued before occurrence of a break are sent to the neuron and global memory 705 and the resultant output data is collectively held in the control chip. This operation is achieved by flip-flops 910 to 918, and 920 to 928. The first flip-flip group 910 to 918 is used for input data and saves the data selected by the selector 713. The second flip-flop group 920 to 928 is used for saving the output data from the neuron which is to be written to the global memory 705. Selectors 919 and 929 select usually the line without the flip-flops, and select the data saved in the flip-flops when resuming the operation after the break and send the selected data to flip-flops 732 and 741.

Figure 17:
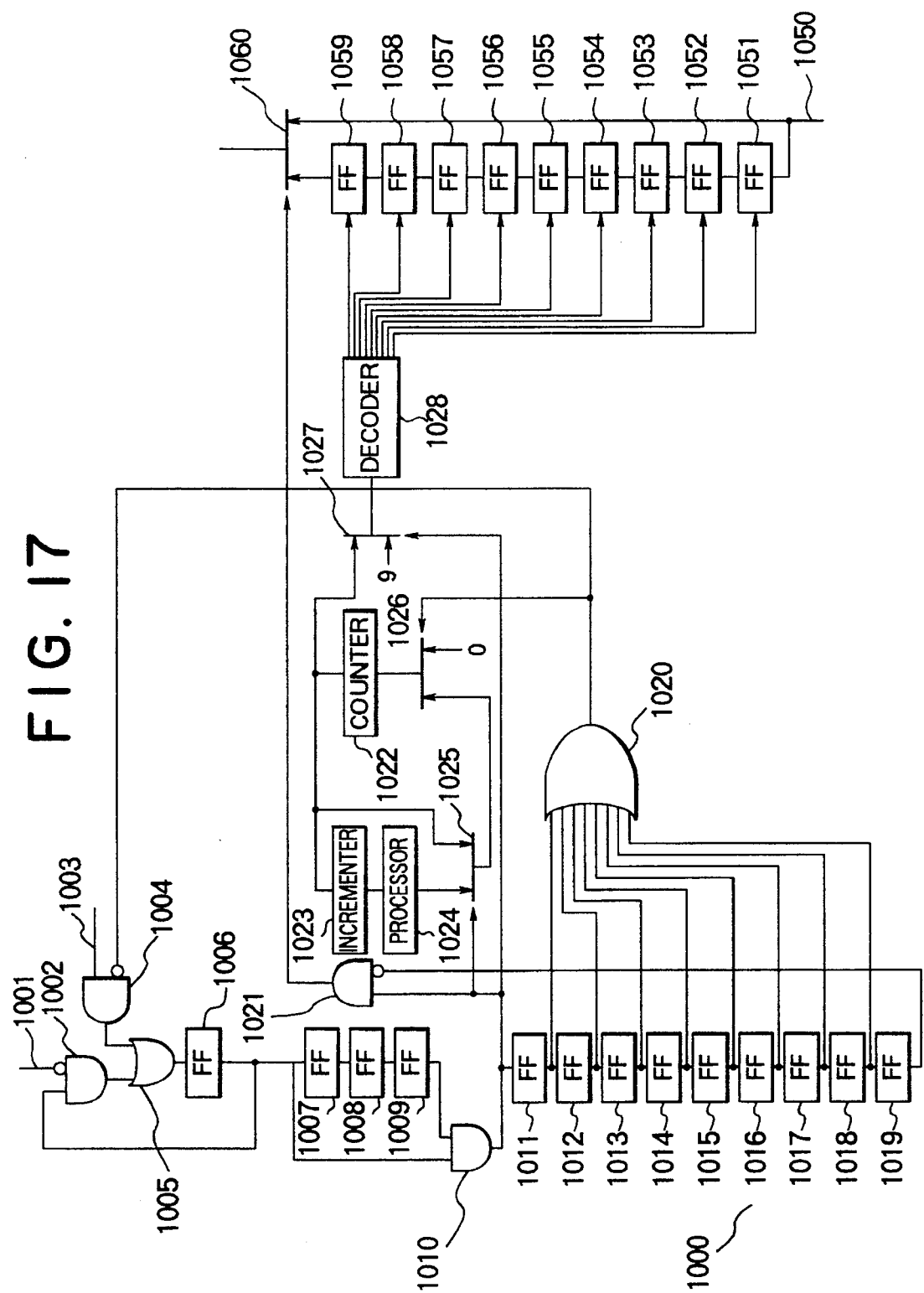
FIG. 17 shows a control circuit for data save pipelining.

FIG. 17 shows an example of a control circuit for data save pipelining. Reference numeral 1000 represents the control circuit. The value in the flip-flop 1006 indicates whether the neuro-computer is under operation. This value is an output from an OR gate 1005 to which two outputs from two AND gates 1002 and 1004 are inputted. The AND gate 1002 is inputted with an inverted signal of a break instruction signal 1001 and the value of the flip-flop 1006. The AND gate 1004 is inputted with a start signal 1003 and an inverted signal of an output of an OR gate 1020. As a result, if the break signal 1001 is entered once and it becomes not busy (flip-flop 1006 takes "0"), the control circuit will not start until the start signal 1003 is entered. The start signal 1003 will not pass through the AND gate 1004 until the OR gate 1020 of the control circuit 1000 outputs "0". The signal 1006 indicating whether the operation state is busy is inputted to the control circuit 1000 and held by flip-flops 1007 to 1009. An output of an AND gate 1010 is held by flip-flops 1011 to 1019. Specifically, the flip-flops 1007 and 1011 take "0" at the same time when the operation is broken, and when the operation again starts, the flip-flop 1011 takes "1" after the flip-flops 1007 to 1009 take "1". Therefore, the timings of changes in the values of the flip-flops 1011 to 1019 are three clocks earlier than the operation starts. The OR gate 1020 performs an OR operation of outputs of the flip-flops 1011 to 1018 to judge whether data has been saved completely after the break operation. In this manner, the start signal 1003 is masked by the AND gate 1004 not to allow the operation to be started while the data is being saved. When the operation is broken, data 1050 is held in flip-flops 1051 to 1059. A selector 1060 selects either normal data or saved data. Used as the select signal for the selector 1060 is an output of an AND gate 1021 to which an output of the AND gate 1010 and an inverted signal of an output of the flip-flop 1019 are inputted. Accordingly, the AND gate 1021 outputs "1" during the time period corresponding to the number of saved data after the Flip-flop 1009 takes "1" when resuming the operation after the break. During this time period, the saved data is outputted, and in the other case, the data 1050 is outputted. For the operation of a saved data output number counter 1022, an incrementer 1023 increments the count by "1" and an overflow processor 1024 checks the output of the incrementer 1023 and outputs "9" if the output of the incrementer 1023 is "10" or larger. A selector 1025 selects an output of the overflow processor 1024 if an output of the AND gate 1010 takes "1" and selects an output of the counter 1022 if an output of the AND gate 1010 takes "0". A selector 1026 selects an output of the selector 1025 if an output of the OR gate 1020 takes "1" and selects "1" if an output of the OR gate 1020 takes "0", the selected value being written in the counter 1022. In this manner, the counter 1022 is reset to "0" when the data has been saved completely after the break. During three clocks after the operation start, the count of the counter 1022 is retained, and thereafter the count is incremented by "1" until it takes "9". A selector 1027 selects "9" during the operation, and selects the value of the counter 1022 during three clocks after the operation start after the break. A decoder 1028 generates signals shown in Table 1 and writes them in the flip-flops 1051 to 1059.

TABLE 2

| Input value | 1051 | 1052 | 1053 | 1054 | 1055 |
|---|---|---|---|---|---|
| 0 | L | L | L | L | L |
| 1 | H | L | L | L | L |
| 2 | H | H | L | L | L |
| 3 | H | H | H | L | L |
| 4 | H | H | H | H | L |
| 5 | H | H | H | H | H |
| 6 | H | H | H | H | H |

TABLE 2-continued

| | | | | | |
|---|---|---|---|---|---|
| 7 | H | H | H | H | H |
| 8 | H | H | H | H | H |
| 9 | H | H | H | H | H |
| Input value | 1056 | 1057 | 1058 | 1059 | |
| 0 | L | L | L | L | |
| 1 | L | L | L | L | |
| 2 | L | L | L | L | |
| 3 | L | L | L | L | |
| 4 | L | L | L | L | |
| 5 | L | L | L | L | |
| 6 | H | L | L | L | |
| 7 | H | H | L | L | |
| 8 | H | H | H | L | |
| 9 | H | H | H | H | |

In this manner, at the operation start, all flip-flops operate as the pipeline circuit to output all the saved data to the data bus. Thereafter, a selector 1060 is switched to select the data 1050 and perform the ordinary operation. When the operation is broken, a write signal is generated for the flip-flops excepting those having the saved data among the nine flip-flops until the saved data has been completely outputted. After outputting the saved data, the write signals are made all "0". In this manner, even if a break is issued at any time, the operation can be restarted. If the operation is started immediately after the break, the saved data cannot be outputted in time. Therefore, as described previously, the start signal 1003 is masked by using an output of the OR gate 1020.

Figure 18:
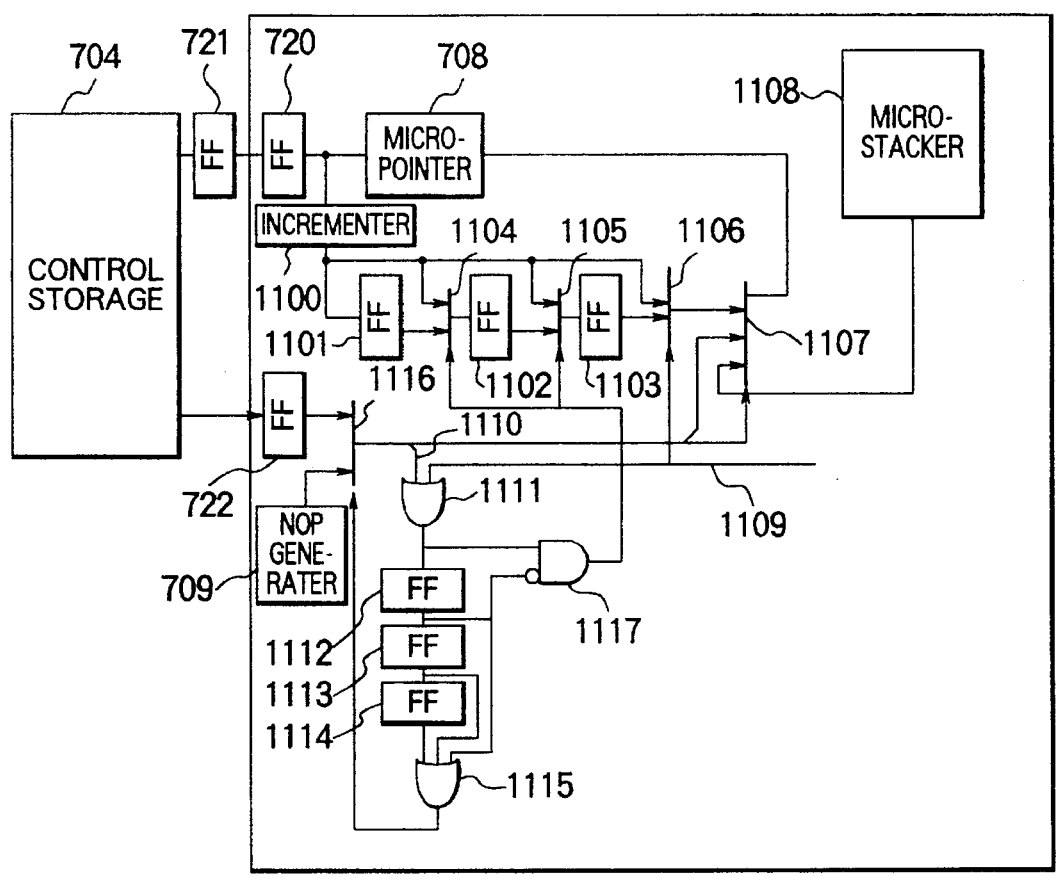
FIG. 18 shows a control circuit for a selector for selecting a micropointer and an instruction NOP.

FIG. 18 shows an example of a control circuit for a selector circuit for selecting a micropointer and an instruction NOP at the time of a branch or break in response to an instruction or an external command. Also as explained with FIG. 14, the micropointer 708 supplies a value to the control storage 704 via the flip-flops 720 and 721, and the control chip receives an instruction via the flip-flop 722. The selector 712 selects either the value of the flip-flop 722 or an instruction NOP outputted from the NOP generator 709. An OR operation is performed between a signal 1110 of the instruction selected by the selector 712 indicating whether a micropointer jumps and a signal 1109 (output of the OR gate 1005 shown in FIG. 17) indicating whether a break was issued or indicating whether the operation is being interrupted after the break. After the break was issued, the succeeding instructions are not executed. During the ordinary operation, the micropointer 708 is incremented by "1". Therefore, if the micropointer jumps, it means that the succeeding three instructions were issued before the micropointer jumped, and that they are meaningless information. This information is held by a FIFO made of flip-flops 1112 to 1114. An OR operation is performed by an OR gate 1115 among the outputs of the flip-flops 1112 to 1114 to check whether the succeeding instructions are meaningful. If not, the NOP signal from the NOP generator 709 is selected by the selector 712 to mask the instruction outputted from the control storage 704. In the ordinary operation, the value incremented by an incrementer 1100 is written in the micropointer 708 at the next clock. However, at the start operation after the break, it is necessary to execute the instruction next to the instruction last executed. Accordingly, while the instruction at an address x is executed, the value of the micropointer is already x+3 so that the value of the micropointer is required to be returned to to x+1 when the break is issued. To this end, flip-flops 1101 to 1103 are provided to hold the previous values of the micropointer. However, the previous values of the micropointer when it jumps or the break is issued, become invalid. Therefore, only when a break or jump is issued, the output of the incrementer 1100 is written in the flip-flops 1101 to 1103 by means of selectors 1104 and 1105. To this end, an AND operation is performed by an AND gate between an output of the OR gate 1111 and the inverted signal of an output of the flip-flop 1112, the result being used as the control signal for the selectors 1104 and 1105. Since the value held in the micropointer is required to be newly set when a break is issued, the signal 1109 indicating an occurrence of the break is used for the control of the selector 1106. In accordance with the instruction, a selector 1107 selects one of an output of the selector 1106, a jump destination address in the instruction selected by the selector 1116, and a micropointer value held in a microstack 1108, the selected value being written in the micropointer 708. The micropointer value is not renewed during the operation stop after the break.

Figure 19:
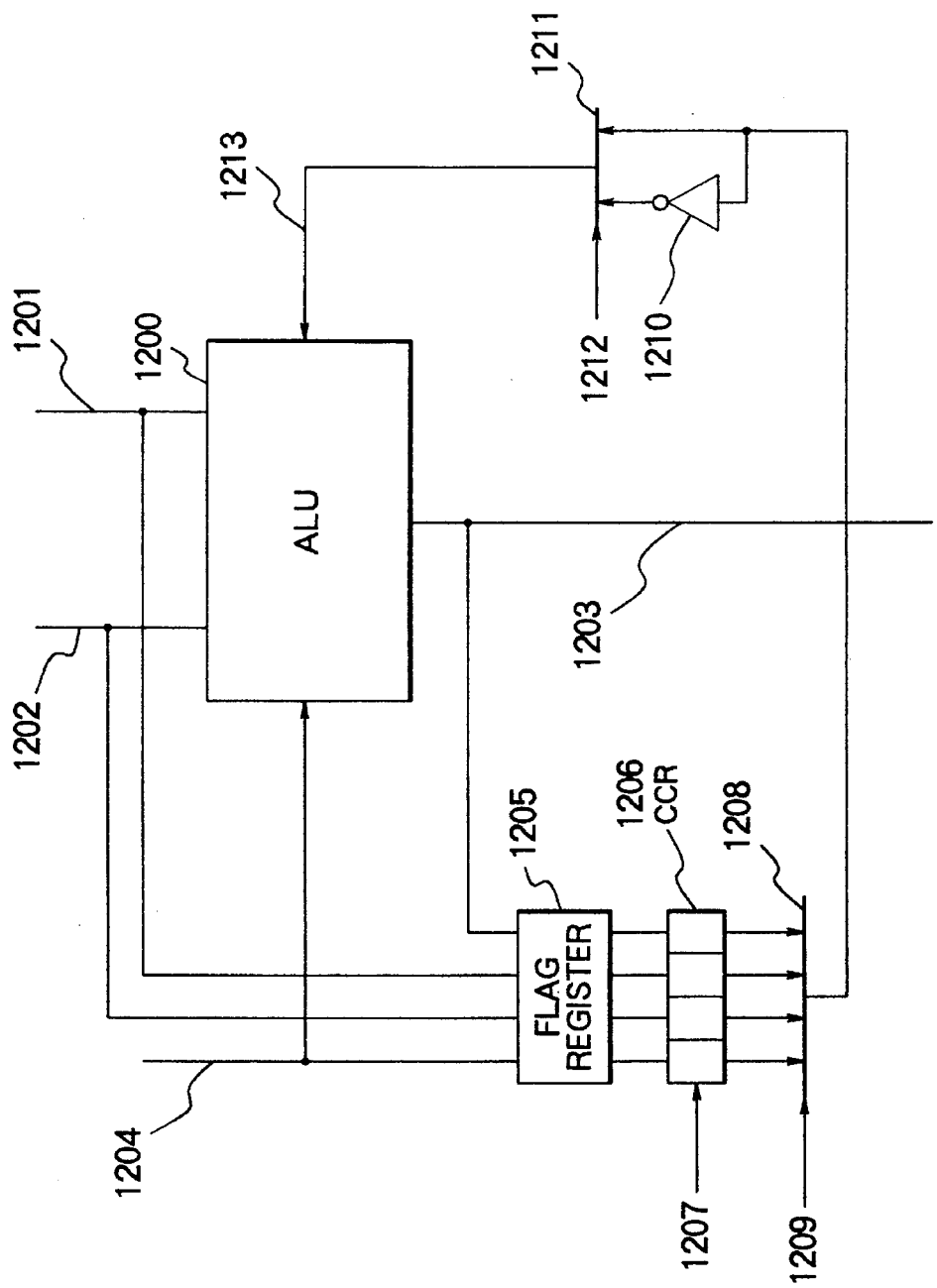
FIG. 19 shows a peripheral circuit of a CCR circuit.

FIG. 19 shows a peripheral circuit of a CCR (Condition Code Register) in the neuron circuit. An ALU 1200 receives two inputs 1201 and 1202, selects its function in accordance with a control signal 1204, and performs an arithmetic-logic operation to generate an output 1203. In accordance with the inputs to, and an output from, ALU 1200, and the control signal, a flag generator circuit 1205 generates four flags including (1) a flag indicating whether the output is "0", (2) a flag indicating whether the sign of the output is positive or negative, (3) a flag indicating whether there is an overflow, and (4) a flag indicating whether there is a carry. The four flags generated by the flag generator circuit 1205 are loaded in a CCR 1206 when a CCR write signal 1207 takes "1". In accordance with a select signal 1209, a selector 1208 selects one of the flags loaded in CCR 1206. The select signal or its inverted signal inverted by an inverter 1210 is selected by a selector 1211 in accordance with a select signal 1212, the selected one being supplied as a Cin signal 1213 to ALU 1200. Whether this Cin signal 1213 is used or not is determined by the control signal 1204. The control signal 1204, CCR write signal 1207, and select signals 1212 are determined by the instruction sent from the neuron.

Figure 20:
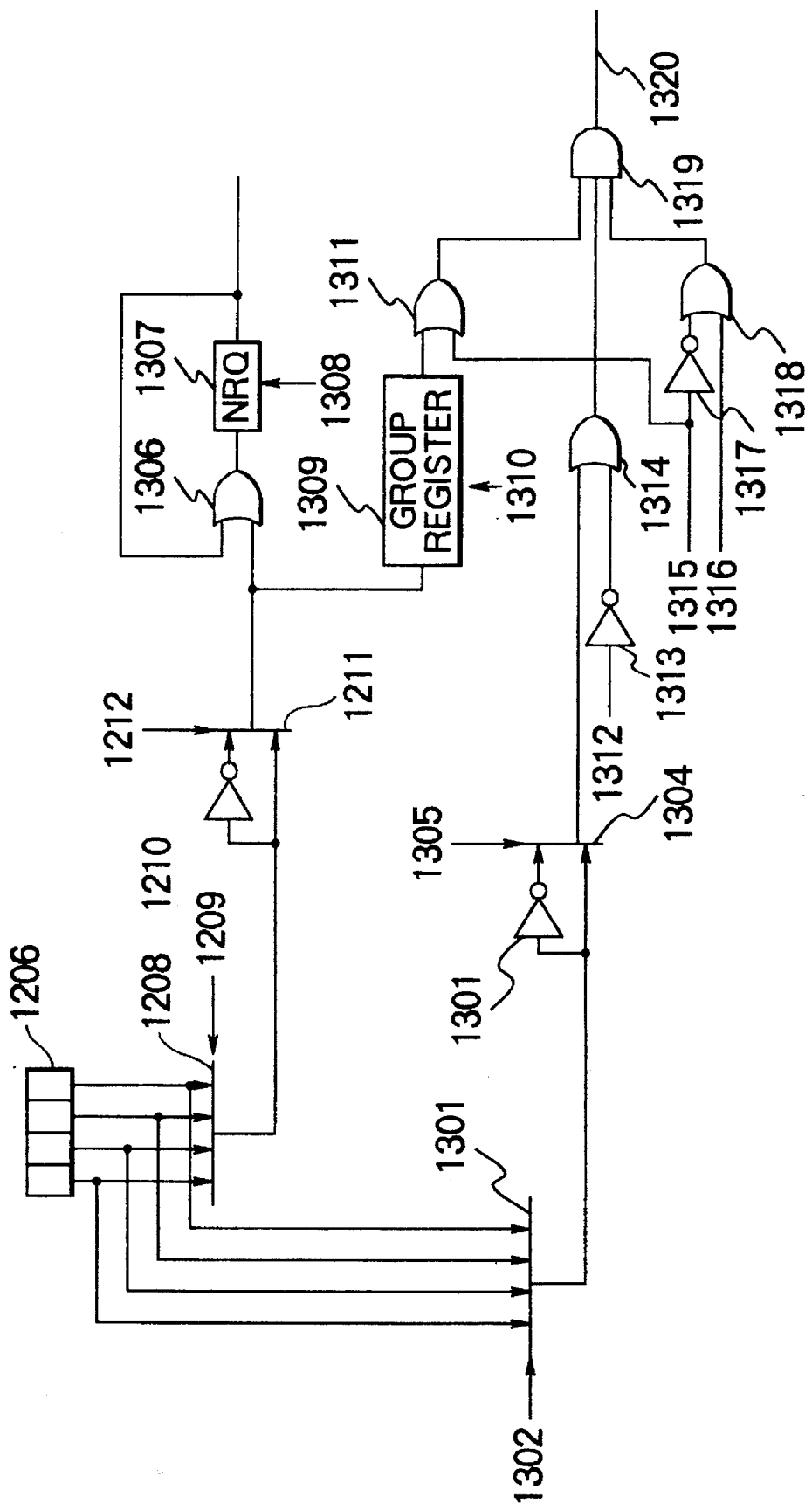
FIG. 20 shows a write control circuit using CCR and a neuron request signal generator circuit.
Figure 21:
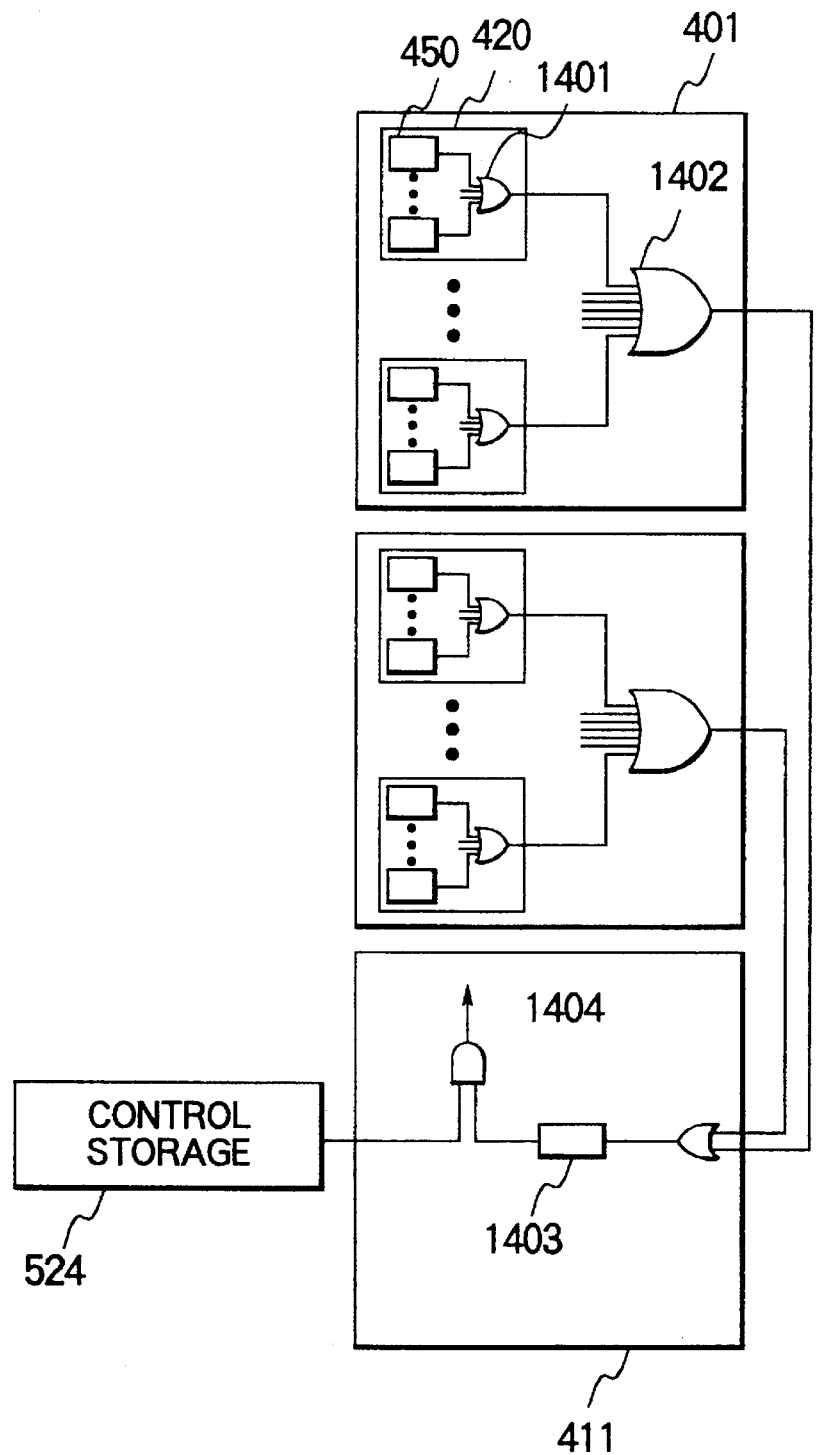
FIG. 21 is a wiring diagram of a neuron request signal.

FIG. 20 shows an example of a write control circuit using a CCR and a neuron request NRQ (Neuron ReQuest) signal generator circuit. The signal selected from the outputs of CCR 1206 by the selectors 1208 and 1211 as described with FIG. 19 is ORed with an output of an NRQ register 1307 by an OR gate 1306, and the output of the OR gate 1306 is loaded in the NRQ register 1307 if a control signal 1308 is a set instruction. If the control signal 1308 is a reset instruction, the value of NRQ 1307 is reset to "0". The NRQ signal indicates an accumulation of operation conditions. As shown in FIG. 21, an OR operation is performed for all neuron signals by OR gates 1401 and 1402, the result being held by an accumulated NRQ signal holding unit 1403 in the control chip to generate an interrupt signal in response to the instruction signal from the control storage 524. In the learning operation of the neural network, whether an error for each pattern is smaller than a predetermined value is accumulated, and when the error for all patterns and all neurons become the predetermined value, an interrupt is issued to jump the microprogram and issue a break at the jump destination to thereby interrupt the learning. Returning back to FIG. 20, an output of the selector 1211 is set to a group register 1309 in response to a control signal 1310 to use it for the write control into the storage of the neuron. One of the outputs of CCR 1206 is selected by a selector 1301 in accordance with a select signal 1302 different from the selector signal 1209. The selected signal or its inverted signal obtained by an inverter 1303, i.e., a positive or negative signal, is selected by a selector 1304 in response to a select signal 1305, the result being used for the write control. An output of the group register 1309 may be used for the long term conditioning, and an output of the selector 1304 may be used for the short term conditioning. The former conditioning is called a group, and the latter conditioning is called a sub-group. If a combination of a plurality of conditionings is desired, it may be realized by the conditionings of both the group and sub-group. Whether an individual write is to be performed is determined by a control signal 1315. In the case of the individual write, the control signal 1315 is inverted by an inverter 1317. The inverted signal and a signal 1316 indicating whether the object neuron has been selected are inputted to an OR gate 1318 whose output is supplied to an AND gate 1319. An OR gate 1311 masks an output of the group register 1309 in accordance with the control signal 1315. In the case other than the individual write, the value of the group register 1309 is inputted to the OR gate 1311 whose output is supplied to the AND gate 1319, while masking the neuron select signal 1316 by the OR gate 1318. In other words, in the case of the individual write mode, only a selected neuron is allowed to be written, and in the case other than the individual write mode, the write is controlled always by the group register 1309. A control signal 1312 determining whether the sub-group is made valid is inverted by an inverter 1313 so that if the sub-group is made valid, the value selected by the selector 1304 is passed to the AND gate 1319, and if not, the signal for making the sub-group valid is masked by the OR gate 1314. An AND operation is performed among these signals by the AND gate 1319, the output being used for the write control of part of storages of neurons. In this example, the write control is performed for the register file 102, rewritable memory 103, operation result holding means 115 shown in FIG. 9, and NRQ 1307 shown in FIG. 20.

Figure 22:
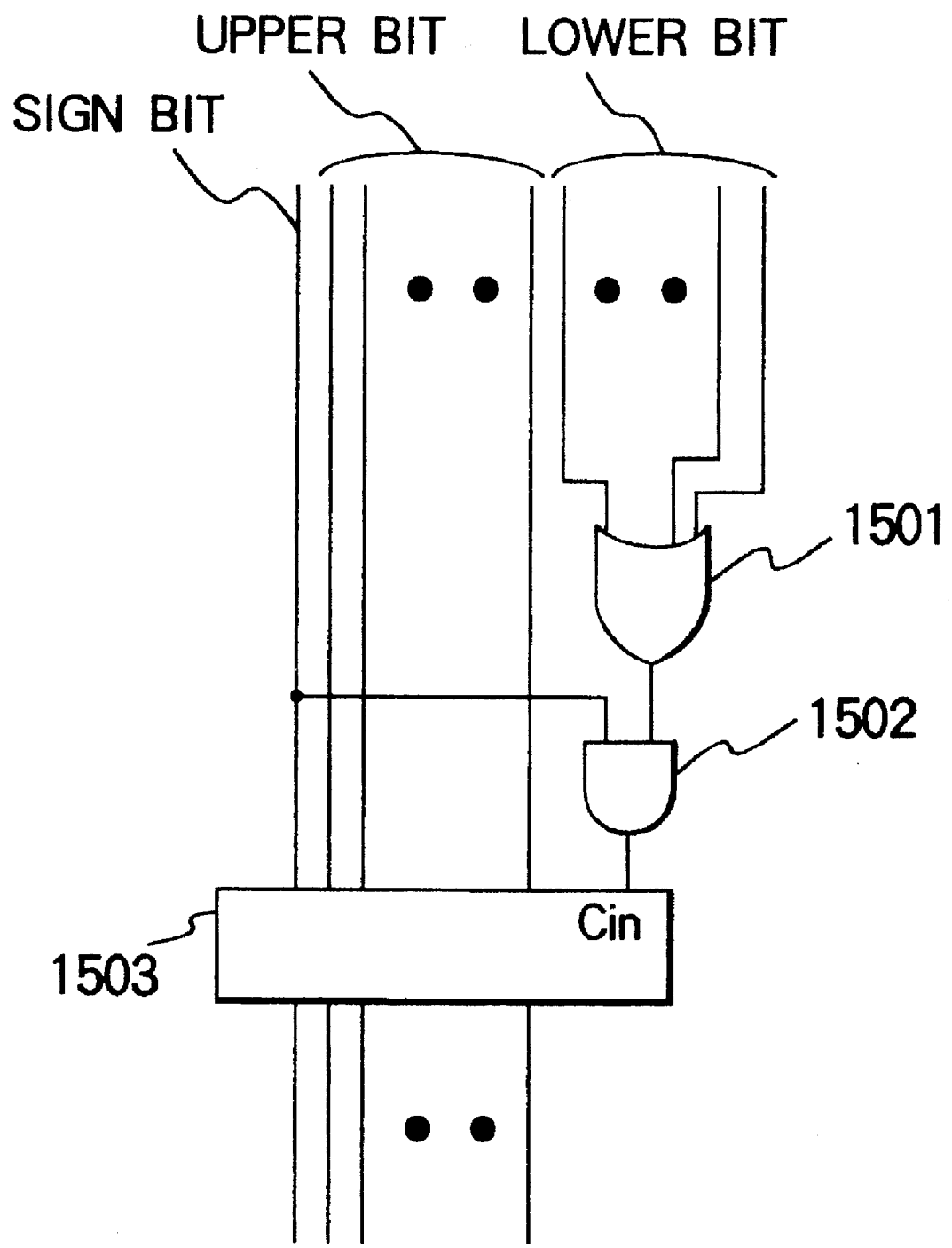
FIG. 22 shows a functional circuit for a run-to-0 operation of a negative number used when cutting off lower bits.

FIG. 22 shows an example of a circuit realizing a run-to-zero function for a negative number when lower bits are to be cut off. If lower bits of a negative number expressed by a 2's compliment representation are to be cut off (including a right shift operation), the number changes in the direction departing from "0". For example, a number of 16 bits "1111111111111111" will not become "0" how many times it is shifted to the right (how may times it is divided by "2"). Also, if it is shifted by 8 bits to the right and thereafter it is shifted by 8 bits to the left, it becomes a number "1111111100000000". Namely, if a negative number is cut off, it changes in the direction departing from "0". Conversely, if a positive number is cut off, it changes in the direction coming near "0". If for example an inertia term is used for the renewal of a weight value in the learning, a number smaller than "1" multiplied by the previous inertia term value is used as the new weight value in the practical operation, so that when there is no error, the weight value gradually becomes "0". However, in the case of a negative value, it does not become "0", and the weight value changes continuously even if there is no error. In order to solve such a problem, it is desirable that even if a negative number is cut off, it comes near "0". To this end, in this example, lower bits to be cut off are subjected to an OR operation by an OR gate 1501. An output of the OR gate and a sign bit are supplied to an AND gate 1502 to perform an AND operation to check whether there is any "1" in the lower bits of the negative number to be cut off. If there is "1", an output of the AND gate 1502 is supplied as a Cin input to an incrementer 1503 to increment the upper bits. In this manner, the negative number goes near "0" even if it is cut off.

Figure 23:
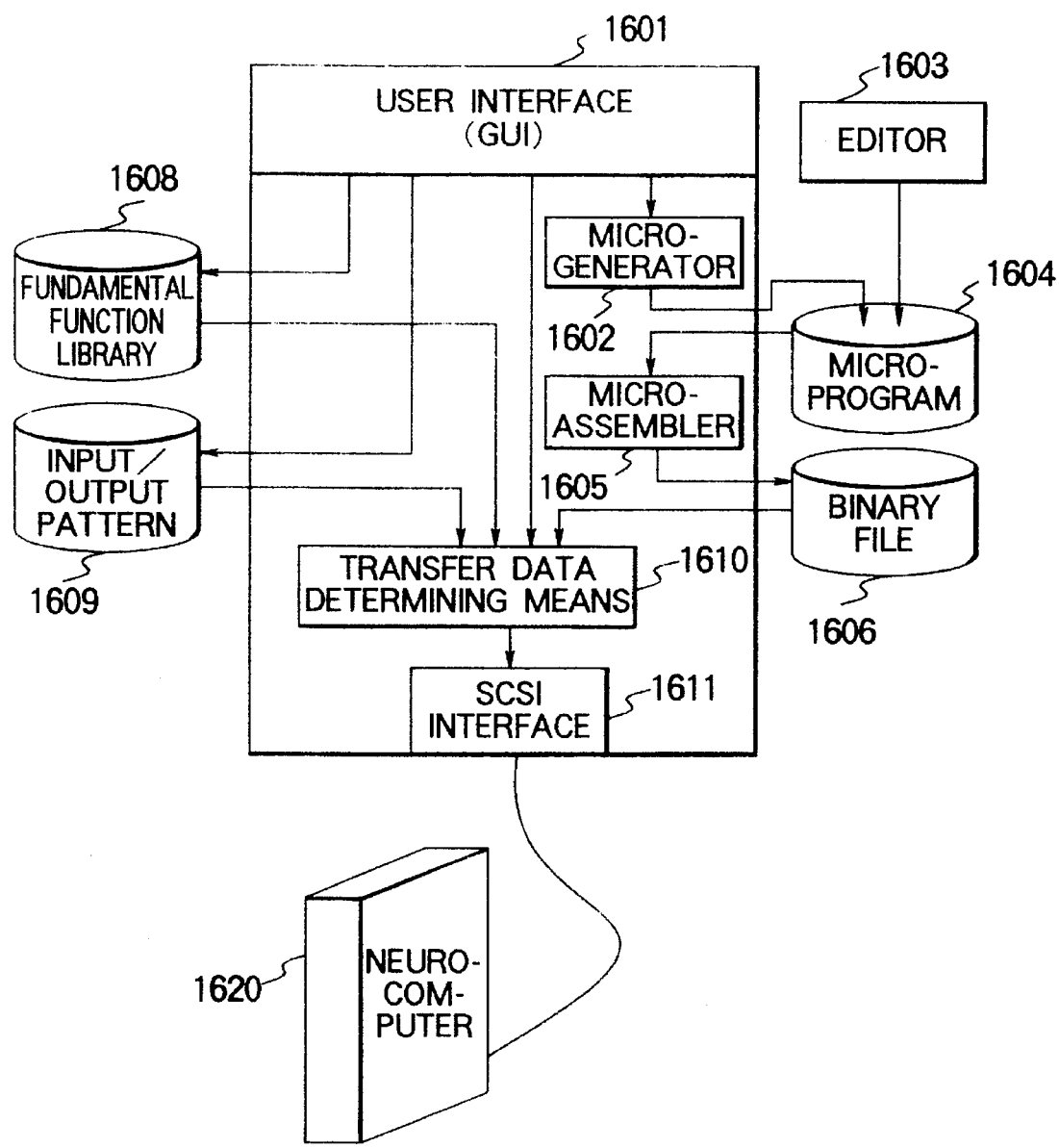
FIG. 23 is a system block diagram of software.

FIG. 23 shows an example of the software structure of a host computer for operating the neuro-computer system of the embodiment. In the first case, a user selects a network structure and learning rules by using a user interface 1601. In accordance with the selected information, a micro-generator 1602 automatically generates a microprogram for the execution of a designated learning operation. In the case of developing a new algorithm, a user itself writes a microprogram by using an editor 1603. The microprogram 1604 is passed to a microassembler 1605 to generate a binary file 1606. In accordance with the information from the user interface 1601, a data transfer determining means 1610 selects values in a library 1608 for realizing the fundamental function such as reading the status of a neuron and reading the binary file 1606, or selects input/output patterns used for the learning, and sends them to a SCSI interface logic circuit 1611 to write them into predetermined locations of a neuro-computer 1620. Thereafter, a signal for the operation execution is sent to make the neuro-computer operate. The operation results are sent via the SCSI interface logic circuit 1611 to the user interface to display them on a display unit or load them in a file. The function and structure of the micro-generator 1602 will be described later in detail.

The method of using the neuro-computer of the embodiment will be described by taking a back propagation algorithm as an example. For the details of a back propagation algorithm, refer to a document "Parallel Distributed Processing", D. E. Rumelhart, et al, MIT Press, Cambridge.

Figure 24:
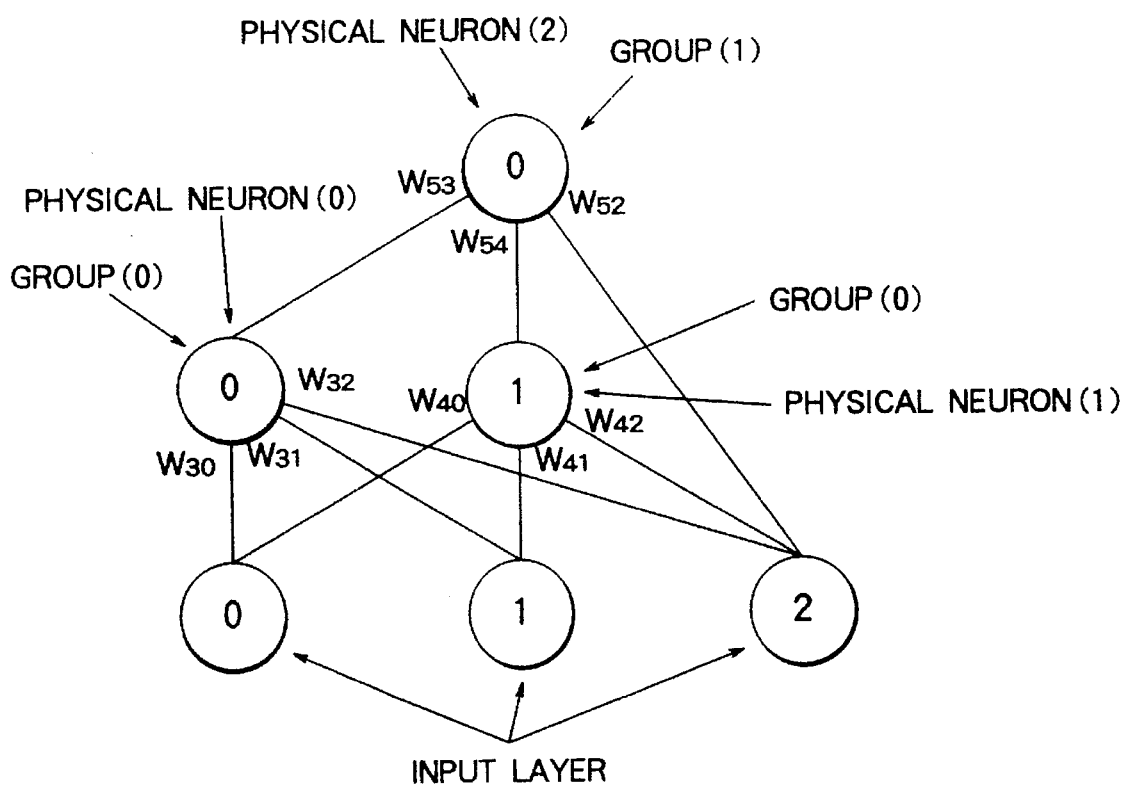
FIG. 24 shows an example of the structure of a neural network.

FIG. 24 shows an example of a neural network and its grouping. An input layer has three neurons, an intermediate layer has two neurons, and an output layer has one neuron. The neuron 2 of the input layer is a bias neuron and always outputs "1". The other neurons are all interconnected between adjacent layers. The neurons of the intermediate and output layers are assigned physical neurons and grouped into intermediate and output layer neuron groups so that the operation can be performed discriminately between the intermediate and output layers.

FIG. 25 shows an example of a data map of the global memory used for the learning of the neural network shown in FIG. 24. At addresses 0 to f, desired signals, input values are stored in the order of patterns 0, 1, . . . At addresses 20 to 25, coefficients for non-linear transformation approximation are stored. At addresses 30, 31, 50, parameters for the learning and logical operation are stored which are broadcast when necessary. At addresses 60 to 63, outputs of the output layer neurons for each pattern are stored which can be fetched during the learning by using a microprogram so that the output values for all patterns can be accessed by the host computer when the learning was completed. The global memory can be accessed at a high speed by making a microprogram select and use one of a plurality of prepared global memory pointers indicating addresses of the global memory, such as an input/output pattern pointer, a grouping pointer, a constant access pointer, and a global memory write pointer.

Figure 26:
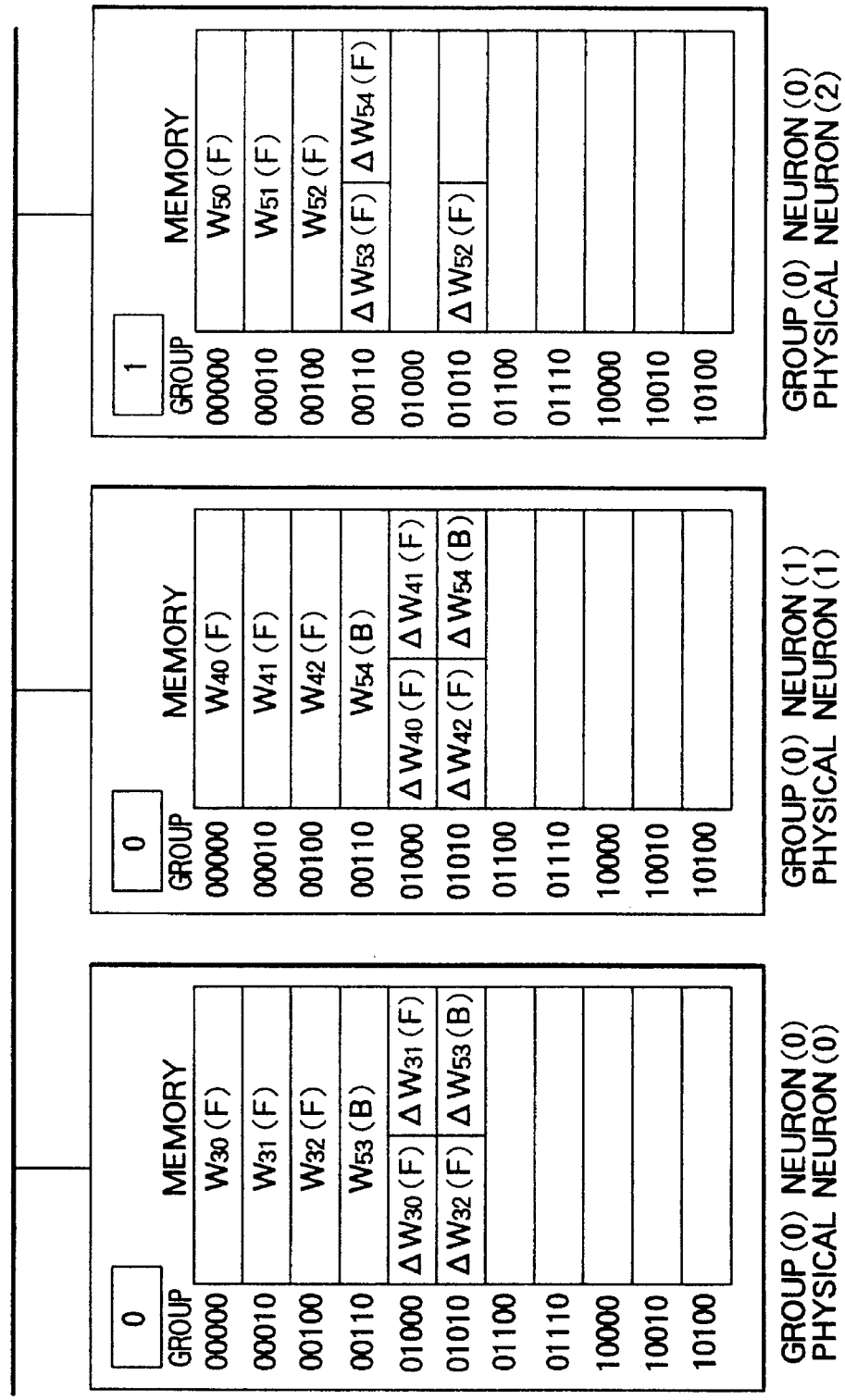
FIG. 26 is a diagram showing an example of allocation of weigh data in a memory of each neuron, FIG. 27 illustrate an example of operating virtual neurons.

FIG. 26 shows an example of a weight map of a rewritable memory for three neurons, two for the intermediate layer and one for the output layer. A back propagation algorithm uses a data propagation in the direction opposite to the normal direction. There is known a method of assigning a weight to a lower layer neuron, i.e., a destination neuron, in order to speed up the back propagation calculation for bus-type neurons. For the details of this method, refer to a document "High Speed Learning Type Neuro-WSI", the Institute of Electronics, Information and Communication Engineers, NC90-12. It is therefore necessary for the neurons interconnected between the higher and lower layers to have the same weight. Since the control chip has a pointer to the weight memory, all neurons are assigned the same memory address. It is therefore desired that the weights for the neurons connected to the same originating neuron are stored at the same address. In this example, three forward weights and one backward weight are assigned to the neuron (0) in this order. For the neuron (1), the weights are stored at the same addresses as those of the weights of the neuron (0) having the same originating neurons. For the neuron (2), the weight $W_{52}$ is stored at the same address as that of the weights of the neurons (0, 1) having the same originating neuron, and the other weights of the neuron (2) are stored at duplicated addresses although the corresponding originating neurons have the different originating neurons. Although all neurons have the same address when weights are renewed for the learning, only the necessary weights can be renewed by the grouping control, thereby reducing the memory space. The weight memory is of a 16 bit configuration. Since the inertia term $\Delta w$ has a number of bits smaller than the weight w, 16 bits are divided into two 8-bits at the same address.

Figure 27:
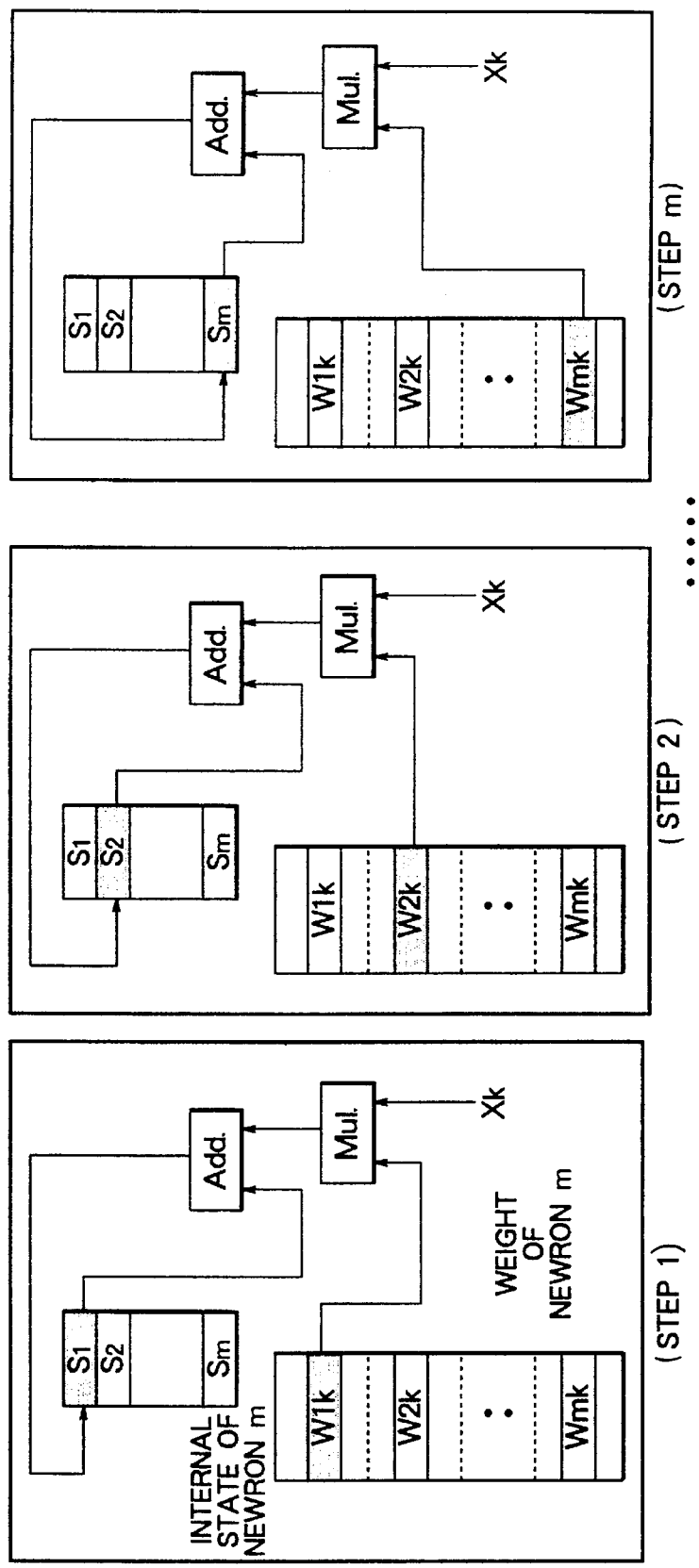

FIG. 27 illustrates a virtual neuron operation method for the simulation of a plurality of neurons using one neuron circuit. Generally, a register file stores the internal states of neurons and a memory stores weights between neurons to be interconnected. The register and memory are partitioned for each neuron to be simulated. In simulating the first neuron, the pointer of the register file and the pointer of the memory are set so as to point the areas indicated by shading areas in the leftmost drawing in FIG. 27. In simulating the second neuron, the pointers are set so as to point the shading areas in the central drawing in FIG. 27. In simulating the third neuron, the pointers are set so as to point the oblique line areas in the rightmost drawing in FIG. 27. By generating such pointers using a microprogram, the arithmetic-logic unit and the like can be used in common.

Figure 37:
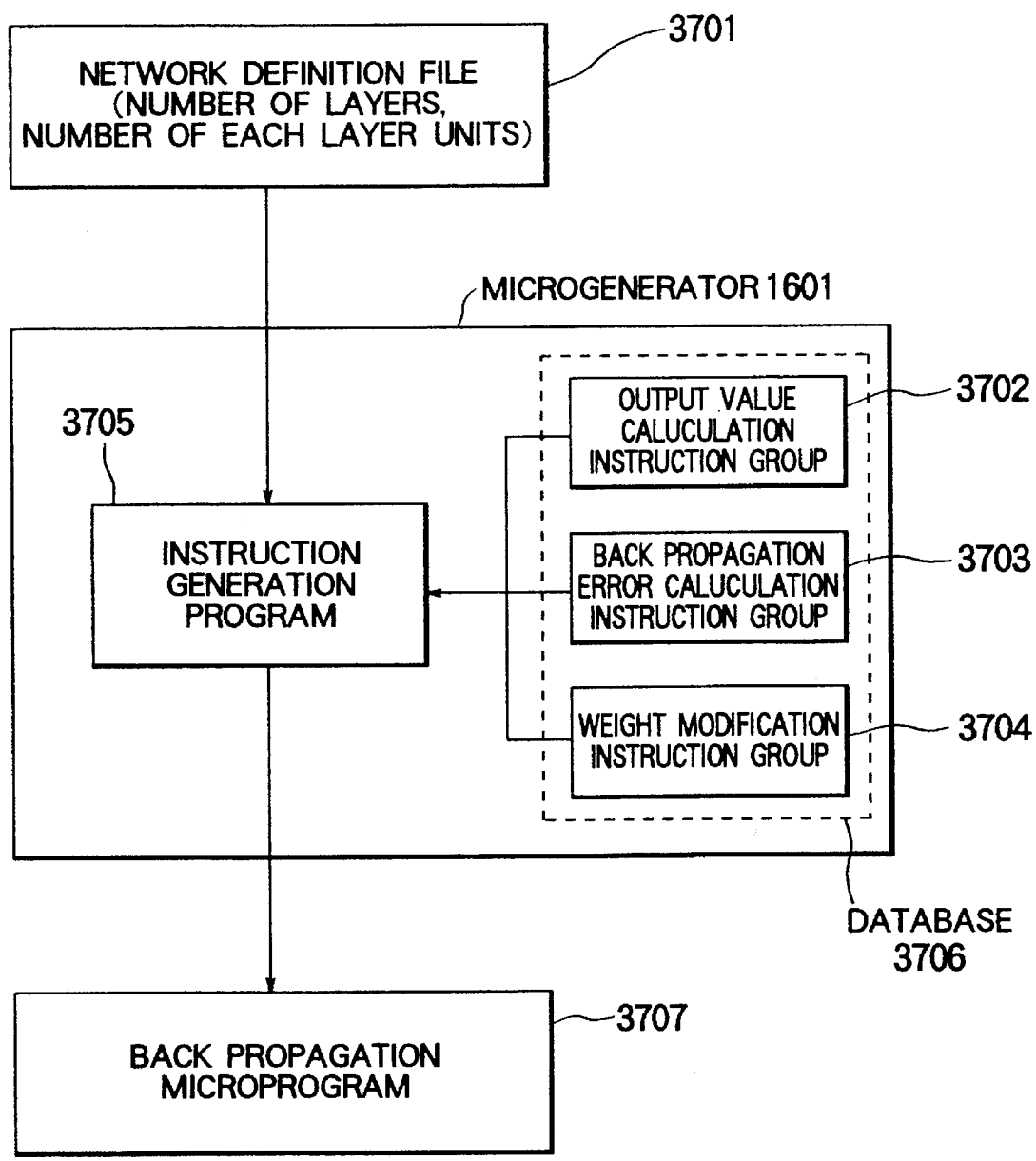
FIG. 37 is a diagram explaining a microgenerator.

Next, the function of the micro-generator will be detailed with reference to FIG. 37. The micro-generator 1601 reads a network definition file 3701 storing information such as the number of neural network layers and the number of neurons of each layer entered by a user. In accordance with the information of the network definition file 3701, an instruction generation program 3701 is activated to combine instructions in a database 3706 storing an output value calculation instruction group 3702, a back propagation error calculation instruction group 3703, and a weight modification instruction group 3704, and generates a back propagation microprogram 3707. A user generates only the network definition file 3701 and can efficiently realize a neural network operation, while allowing the user not to describe a complicated microprogram. In this example, the microgenerator for generating a back propagation microprogram has been described. However, other learning algorithms such as LVQ, Hopfield, SOM (Self Organizing Map), and GA (Genetic Algorithm) may also be used only by changing the contents of the database 3706.

The main functions of the general neuro-computer of this invention are explained in Table 3.

Table 3 (Nos. 1 to 12)

No. 1
Programmable Learning Algorithm Function: Allowing to use a plurality of learning algorithms (Back Propagation, Hopfiled, LVQ) by rewriting a microprogram in the control storage.

No. 2
Virtualization Function: Allowing a user to logically use neurons greater in number than actual neurons because a user is permitted not to consider a limit in the number of physical neurons.

No. 3
Sparse Coupling Function: Allowing the coupling between neurons other than complete type coupling.

No. 4
Grouping Function: Allowing to define and designate groups of a plurality of neurons at the same layer (e.g., intermediate layer) or at different layers (e.g., intermediate and output layers).

No. 5
Non-linear Transformation Function: Allowing to use a sigmoid function as a transformation function between input and output of a neuron.

No. 6
Max (Min) Detection Function: Allowing to detect a maximum (minimum) value (and a neuron having a maximum (minimum) value basing upon the operation result of each neuron.

No. 7
Double Precision Function: Allowing to use an application requiring high precision. The comparison between a normal (single precision) operation and a double precision operation is as follows. Multiplication is 16 bits*16 bits and addition is 32 bits+32 bits, for the normal (single precision) operation. Multiplication is 32 bits *16 bits and addition is 64 bits+64 bits (max), for the double precision operation. However, the performance is about $\frac{1}{50}$ at the worst as compared to the single precision operation.

No. 8
Learning Convergence Judgement Function: Allowing to detect a learning convergence in a neuro-computer system.

No. 9
Weight Dump Function: Allowing to dump weights after or during learning.

No. 10
Initial Value Setting Function: Allowing to set initial values to storages (such as a global memory, a neuro-chip memory, and a register).

No. 11
Interrupt Function: Allowing to intercept the operation of a neuro-computer upon designation by a microinstruction in a control storage or by a user.

No. 12
On-line Test Function: Allowing to detect a failure of a system while a neuro-computer is operating.

In the following, the foregoing description given to a method of realizing each function is summarized.

(1) Programmable Learning Algorithm
A method of using an arithmetic-logic unit and the like in a neuro-chip is microprogrammed for each learning algorithm. As shown in FIG. 2, a microprogram in the control storage is rewritten when necessary, allowing to apply to a plurality of learning algorithms.

(2) Virtualization
One physical neuron is assigned a plurality of (n) logical neurons and time-shared used, thereby realizing virtualization (apparently multiplied-by-n neurons).

Specifically, as shown in FIG. 27, the weights and internal states specific to logical neurons are stored corresponding in amount to n neurons, and the arithmetic-logic unit and the like are shared by n logical neurons. The maximum number of logical neurons assigned to one physical neuron is limited by the capacity of a storage (for storing weights, internal states, and the like) in each physical neuron.

(3) Sparse Coupling

The weight representing a coupling intensity between neurons not necessary to be interconnected is set to "0" to logically disconnect the coupling. For example, the value "0" is stored in CWM 3327 shown in FIG. 3.

(4) Grouping

A group designating register is provided for each neuron. For example, in FIG. 3, part of REG 3323 is used as a group designating register. The group to which a neuron belongs is judged from the contents of the group designating register.

(5) Non-linear Transformation

A function approximate to a non-linear transformation function such as Chebyshev approximation is microprogrammed to perform non-linear transformation. The approximation precision is required to be checked in advance.

Alternatively, a non-linear transformation function table is provided in the control chip 521. At the time of broadcast, the transformation is performed by referring to the non-linear transformation function table.

(6) Maximum Value Detection

Values of all neurons are sequentially broadcast and compared with each other in the control chip to detect the maximum (minimum) value and the neuron having the maximum (minimum) value.

If only the maximum (minimum) value is required, it is possible to detect the maximum (minimum) value by sequentially broadcasting values of all neurons so that at each neuron, its value is compared with the broadcast value and the comparison result is set to a flag (for the details, refer to the description given with respect to FIGS. 32 to 36).

(7) Double Precision

For the single precision calculation, one word memory area is assigned to a multiplicand and a multiplier to calculate a product through one multiplication (16 bits*10 bits). For the double precision calculation, a two-word memory area is assigned to a multiplicand and a multiplier to calculate a product through four multiplications (32 bits*16 bits). Also in the case of addition/subtraction, calculation is performed by one word for the single precision, and by two words for the double precision. A radix check is performed at each multiplication in the case of the double precision. For the calculation (multiplication and addition/subtraction), in FIG. 3 for example, ALU 3321 and MUL 3322 are used.

(8) Learning Convergence Judgement

A learning convergence judgement value is allocated to each neuron, and a convergence judgement result is set to a convergence judgement flag register. The values of convergence flag registers of neurons of neuro-chips and on the neuron boards are hierarchically subjected to AND operations to enter the result as the final learning convergence judgement flag into the control chip.

(9) Weight Dump

After the completion of learning, the contents of the weight memory (e.g., CWM 3327 in FIG. 7) in each neuron are outputted to the global memory 252, and if necessary, upon a user instruction, the contents of a weight memory in the global memory 525 are dumped.

If it is necessary to output weights during the learning for the purpose of generating a history of weight changes, this operation is realized by software (instruction by a microprogram).

(10) Initial Value Setting

The following two methods are supported.

(1) Method 1 (write method using an instruction from the control storage)

Initial values are stored in advance in the global memory 525. In response to an instruction from the control storage, initial values are transferred from the global memory 525 to each neuron. Initial values are transferred in advance from SCSI/CPU working RAM (for example via an internal CPU bus) to the global memory 525 and set to it.

(2) Method 2 (write method using an instruction from the host)

Initial values are transferred directly to each neuron from SCSI/CPU working RAM via, for example, an internal CPU bus. This control is performed by an instruction from the host computer 502.

(11) Interrupt

An interrupt register and a status register are provided in the control chip 521. Stored in the interrupt register is information including the presence/absence of an interrupt, and a branch destination (for storing an interrupt process program) of a microprogram corresponding to the interrupt type. Setting the interrupt register is performed by a microprogram, CPU 523, and a parity error detector circuit. Checking the contents of the interrupt register is designated by a microprogram.

The interrupt types are stored in the status register. CPU 523 judges a normal end, an abnormal end, and an interrupt, basing upon the contents of the status register.

The levels of interrupt include, for example, Pouse (holding micropointer value, saving pipeline information, enabled continuous execution) and Abort (saving pipeline information, forced stop).

(12) On-line Test

A parity check may be used for an on-line test. The objects to be tested are the input data bus 311, output data bus 314, control signal 313, and address signal bus 312 (CPU 523, control storage 524, global memory 525).

Alternatively, a test microinstruction shown in FIGS. 4 and 5 may be used. Next, another embodiment will be described with reference to FIGS. 38 and 39, wherein the neuro-computer of the invention is provided with an additional function of performing a high precision operation.

Figure 38:
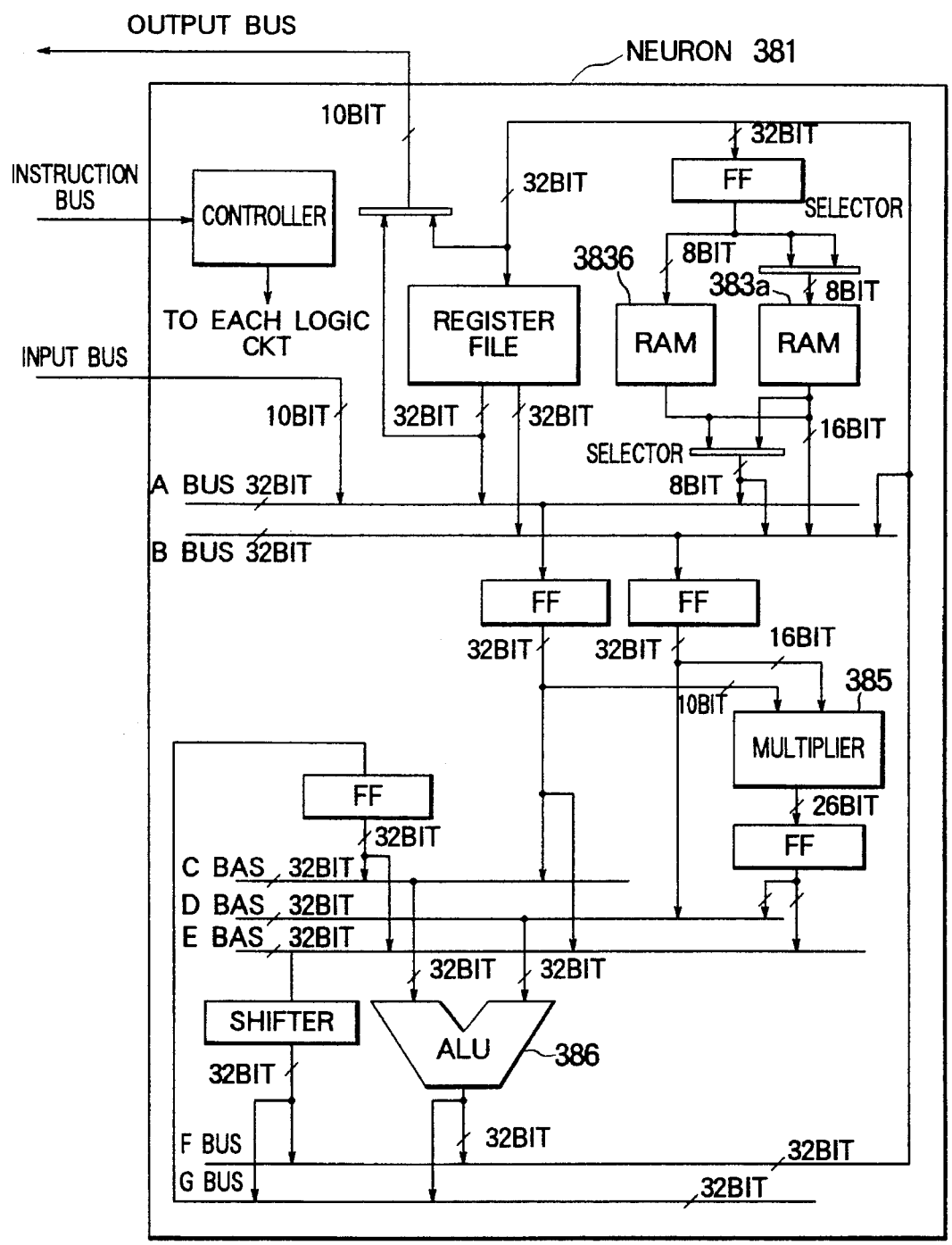
FIG. 38 is a detailed block diagram of the neuron circuit.

FIG. 38 is a detailed block diagram of the neuron shown in FIG. 9, and FIG. 39 is a diagram explaining the process contents of a back propagation operation and the number of bits of a weight. As explained in FIG. 39, in calculating the internal energy $U_i$ during the forward propagation, a product between the output value $O_j$ of a neuron at one layer before and the corresponding weight $W_{ij}$ is cumulatively added for the number j of neurons at one layer before. For this cumulative addition, a multiplier 385 shown in FIG. 37 is used. This multiplier 385 is of 26 bits=16 bits* 10 bits so that a working register and other many processes are required for the multiplication by the numbers of bits greater than 16 bits*10 bits, increasing the operation time greatly and being not practical. Also as explained in FIG. 39, in calculating the back propagation error $\delta j$, a product between a weight $W_{ij}$ and a back propagation error $\delta j$ at one layer after is cumulatively added for the number k of neurons at one layer after. For this cumulative addition, the multiplier 385 shown in FIG. 37 is also used so that a working register and other many processes are required for the multiplication by the numbers of bits greater than 16 bits*10 bits, increasing the operation time greatly and being not practical. However, for the weight $W_{ij}$ modification explained in FIG. 39, a 32-bit ALU 386 shown in FIG. 38 is used so that the operation at 32 bits is possible. From these reasons, the upper 16 bits of a weight are used for the calculation of the internal energy during the forward propagation and the back propagation error, and a weight of 32 bits is used for the weight modification. By using the different number of bits for each calculation, a high precision operation is possible without increasing the operation time considerably.

There occurs the case that as the back propagation learning gradually converges, the back propagation error becomes small, resulting in an improper position of a point of the initial bit format. From this reason, as the learning advances, the point position is dynamically changed so as not to generate an underflow during the learning. In changing the point position of a back propagation error, a plurality of microprograms with a different point position of a back propagation error are prepared in advance and written in the control storage shown in FIG. 1, and as the learning advances, a microprogram is changed while referring to learning information such as the number of learnings or convergence errors.

Next, embodiments using the neuro-computer system of this invention will be described in detail.

Figure 40:
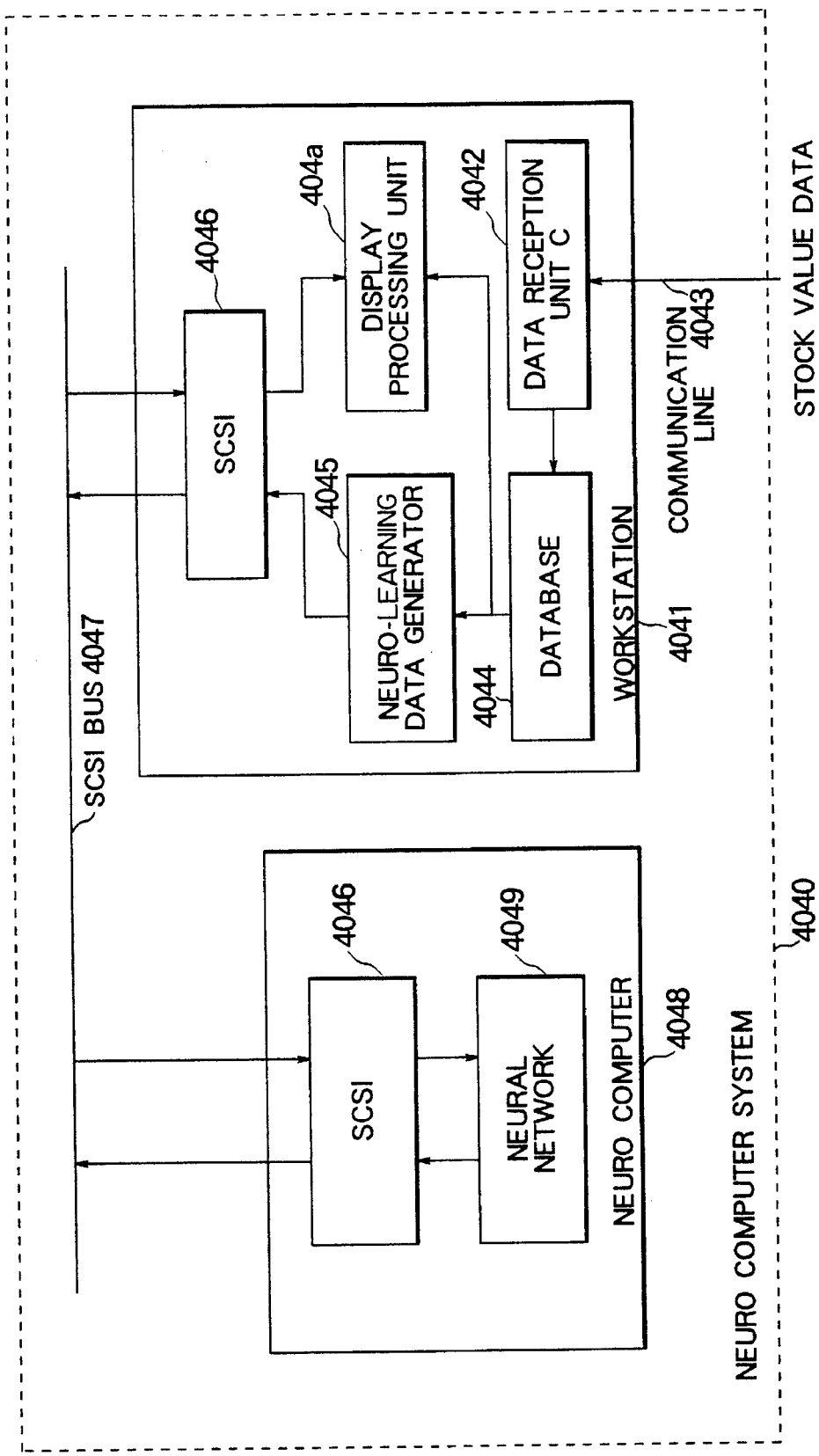
FIG. 40 shows the structure of an embodiment in which the invention is applied to a stock value prediction system.
Figure 41:
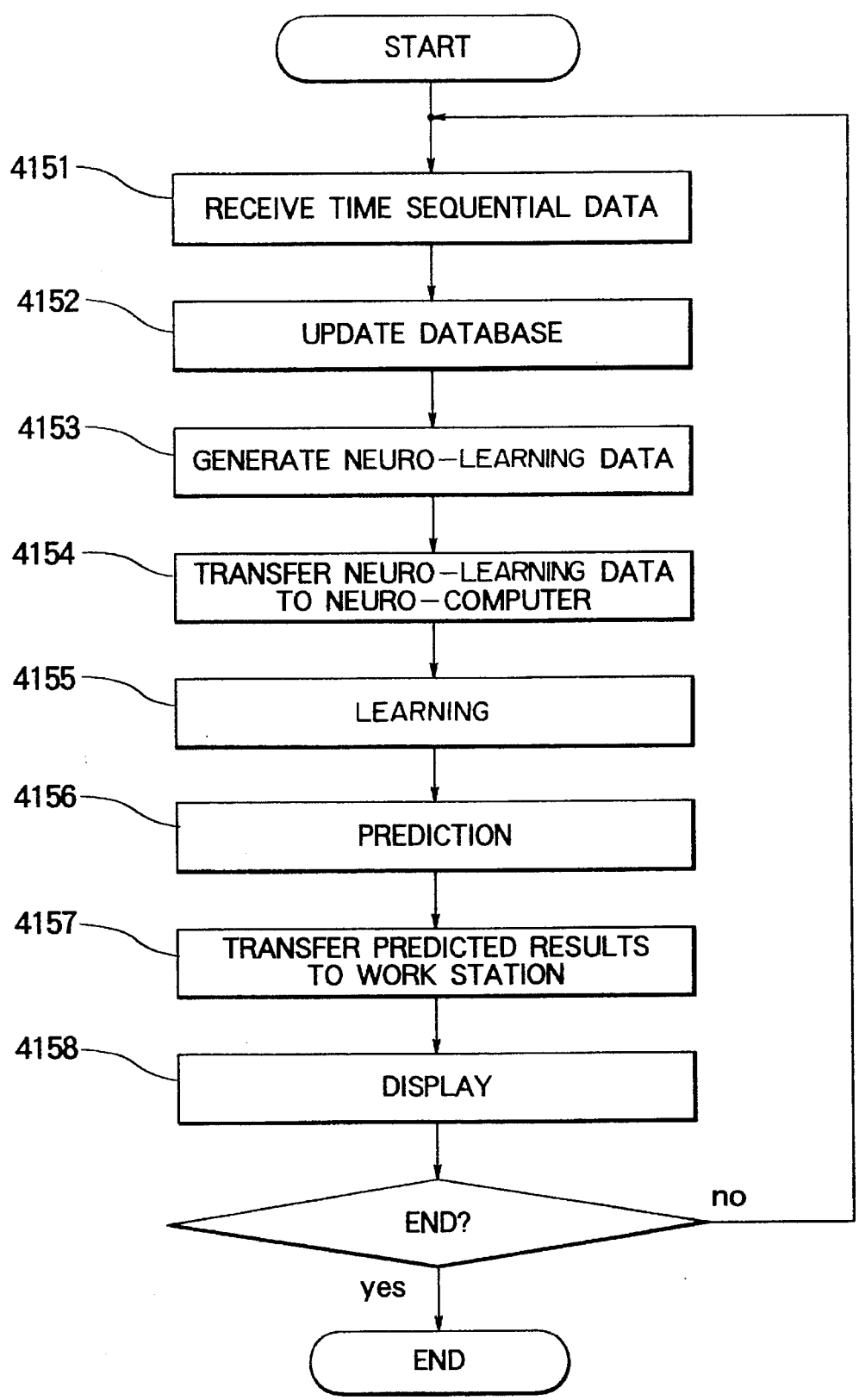
FIG. 41 is a flow chart explaining the operation of the stock value prediction system.
Figure 44:
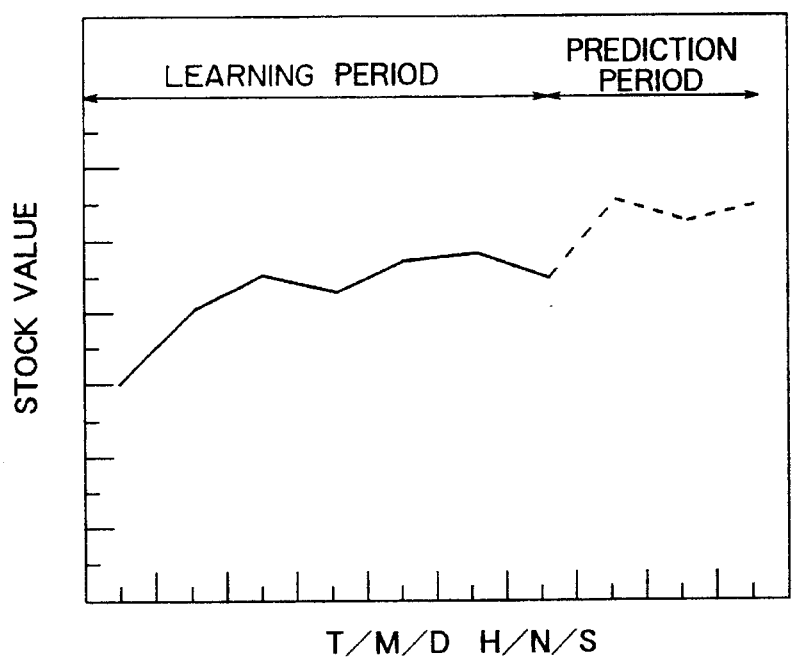
FIG. 44 illustrates an example of an output of predicted results of the stock value prediction system.

An embodiment of the neuro-computer system applied to stock value prediction will be described in detail with reference to a block diagram (FIG. 40) and a flow chart (FIG. 41). A workstation 4041 shown in FIG. 40 receives stock values every several tens seconds from a communication line 4043 via a data reception unit 4042 (flow 4151). Each time data is received, the workstation 4041 updates past several tens stock values stored in a stock value database 4044 (flow 4152). An example of the stock value database is shown in FIG. 42. Using the updated data base 4044, neuro-learning data is generated by a neuro-learning data generator 4045 (flow 4153). FIG. 43 shows an example of the neuro-learning data. Next, the workstation transfers the neurolearning data to a neuro-computer 4048 via a SCSI (Small Computer System Interface) bus 4047 (flow 4154). The neuro-computer 4048 is subjected to learning by using the transferred neuro-learning data and a predetermined learning algorithm, e.g., a back propagation algorithm (flow 4155), to predict future stock values (flow 4156). The workstation 4041 receives the predicted results from the neuro-computer 4048 via the SCSI buys 4047 (flow 4157), and displays the past stock value data and predicted results (flow 4158). An example of a display of the predicted results is shown in FIG. 44. The flows 4151 to 4158 are repeated at several ten seconds until the stock value prediction becomes unnecessary or the stock exchange closes and the stock value data is no more transmitted. A user of the neuro-computer system 4040 makes various decisions while observing the display output screen.

In this embodiment, the neuro-computer system of the invention is applied to the prediction of stock values. Not only stock values but also other time sequential data such as various economic fundamentals may be used for the prediction, characteristic sampling, and recognition.

Figure 45:
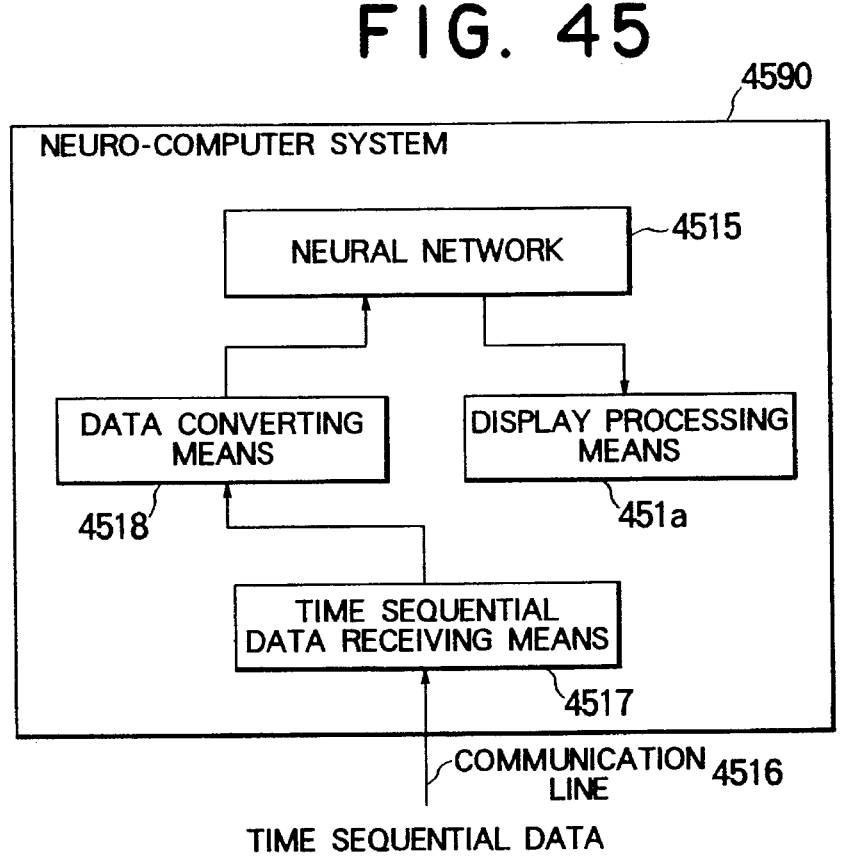
FIG. 45 illustrates another embodiment of the invention.

In the above embodiment, the workstation and the neuro-computer are connected via a SCSI. The invention may be applied to the workstation having a built-in neuro-computer such as shown in FIG. 45. In this case, a neuro-computer system 4590 is constituted by a time sequential data receiving means 4517 for receiving time sequential data sent from a communication line 4516, a data converting means 4518 for converting the time sequential data into neuro-learning information such as learning patterns capable of being learned by a neural network 4515, and a display processing means 451a for processing and displaying the learning results. This structure is also applicable to the time sequential data prediction by using the operation flow shown in FIG. 41 omitting the flows 4154 and 4157.

Figure 46:
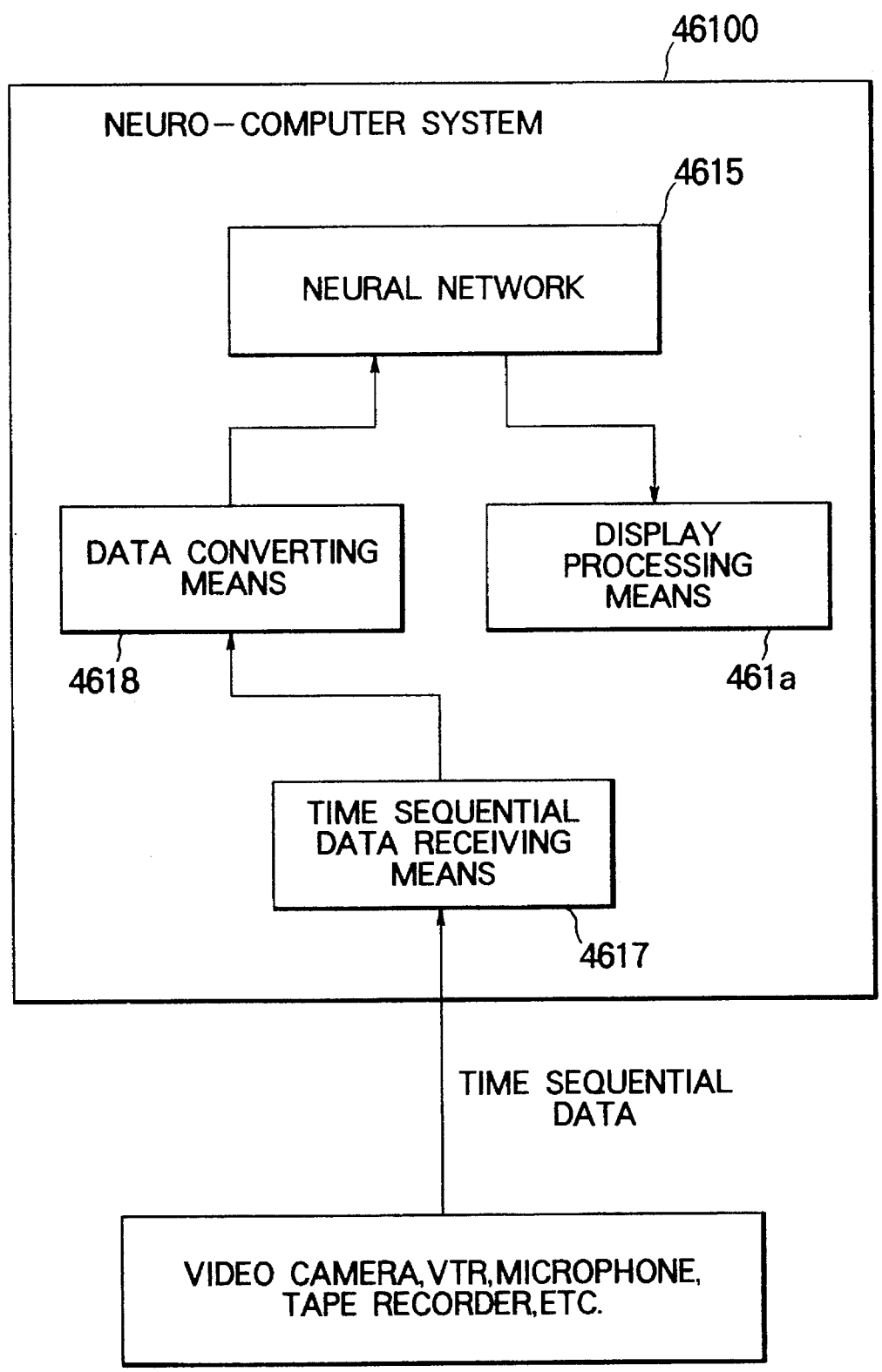
FIG. 46 illustrates a further embodiment of the invention.

The invention is also applicable to automatically processing images and voices as shown in FIG. 46 in which analog or digital data of images and voices are used as time sequential data, and the neural network performs characteristic sampling and recognition to obtain learning results.

Figure 49:
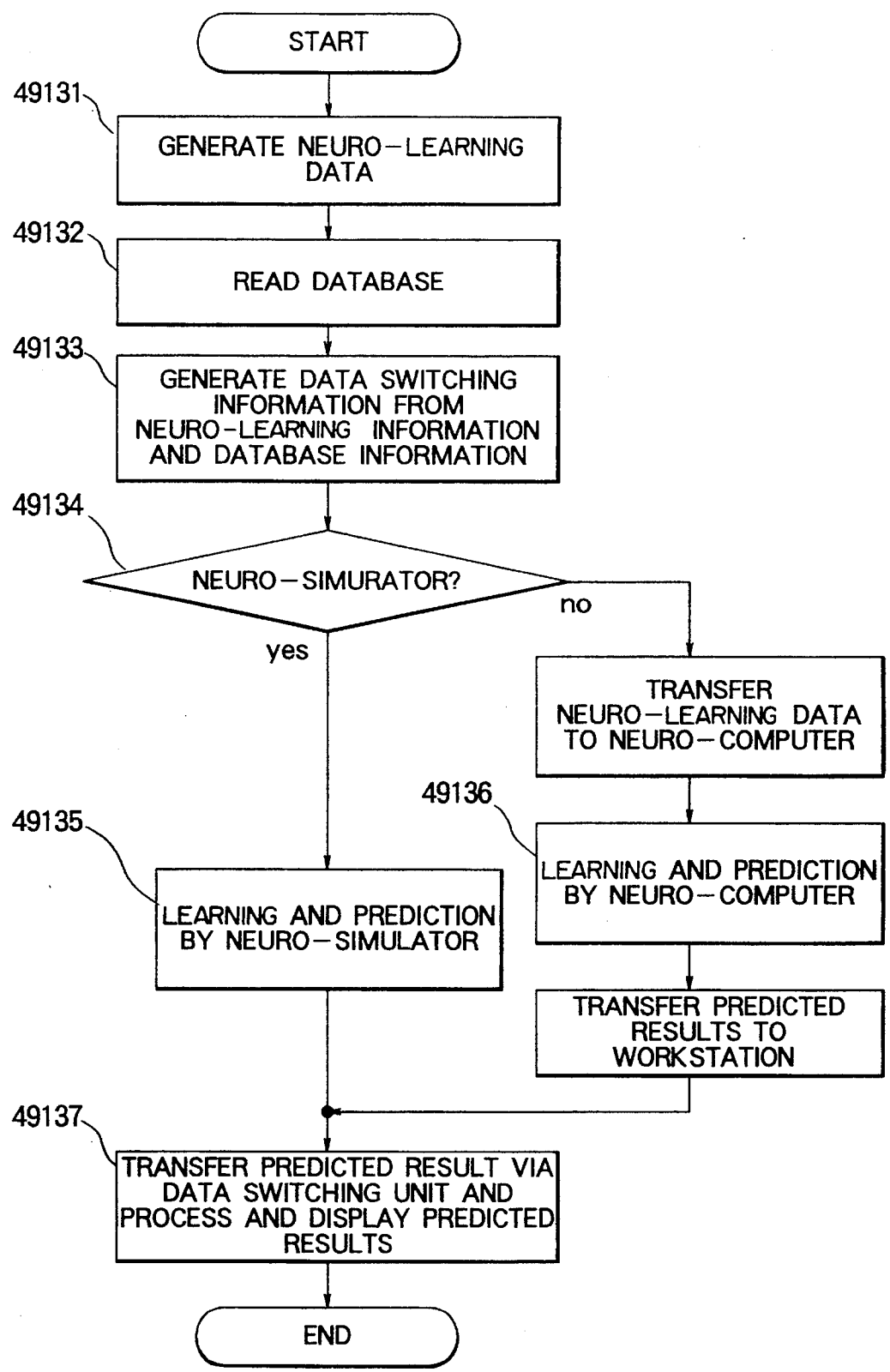
FIG. 49 is a flow chart explaining the operation of the system for automatically switching between a neuro-simulator and a neuro-computer.

Next, an embodiment of the neuro-computer system for performing a back propagation learning operation will be described in detail with reference to a block diagram (FIG. 47) and a flow chart (FIG. 49). This neuro-computer system 471110 is constituted by a workstation 47111 pre-installed with a neuron simulator 47112 for performing a back propagation learning operation, and a neuro-computer 47119 connected via a SCSI bus 47113. The workstation 47111 includes a neuro-learning information generator 47114 for generating neuro-learning information such as learning patterns, desired (teaching) patterns, and learning parameters, a data switching unit 47115 for transferring the neuro-learning information either to the neuron simulator 47112 or to the neuro-computer 47119, and a data switching information generator 47117 for generating data switching information while referring to a database 47116 storing data switching reference data and the like and to the neuro-learning information, and transferring the generated data switching information to the data switching unit 47115. After the neuro-learning information generator 47114 generates neuro-learning information (flow 49131), the data switching unit 47115 refers to the neuro-learning information such as the size (number of neurons) of the neural network and the number of learnings, and the data switching information shown in FIG. 48 stored in the database such as the learning performance, learning precision, maximum allowable accumulated errors, and learning time (flows 49131, 49133), to judge the destination of the neuro-learning information (flow 49134). Obviously, this switching may be forcibly performed by adding switching information (switching flag) to the neuro-learning information. In this case, a data switching program first searches the switching flag in the neuro-learning information. If the switching flag is on, the neuro-learning information is switched in accordance with the switching flag, whereas if it is off, the neuro-learning information is switched in accordance with the neuro-learning information and the data switching information in the database. Thereafter, the learning engine on the neuron-learning information switched side is activated to start the learning (flows 49135, 49136). After the learning, prediction or recognition for example is performed and the results are received by the data switching unit and outputted to a display or the like in a display processing unit (flow 49137). If the data switching information generator 47117 is unable to provide a switching judgement, the neuro-simulator 47112 and neuro-computer 47119 are both activated, and the results obtained earlier are received by the data switching unit 47115. In this case, the identification of the learning engine completed earlier and the neuro-learning information are written in the database 47116. Therefore, when the same neuro-learning information (particularly, the network size and the number of learnings) is again used, the learning engine completed earlier can be automatically selected and used.

Figure 47:
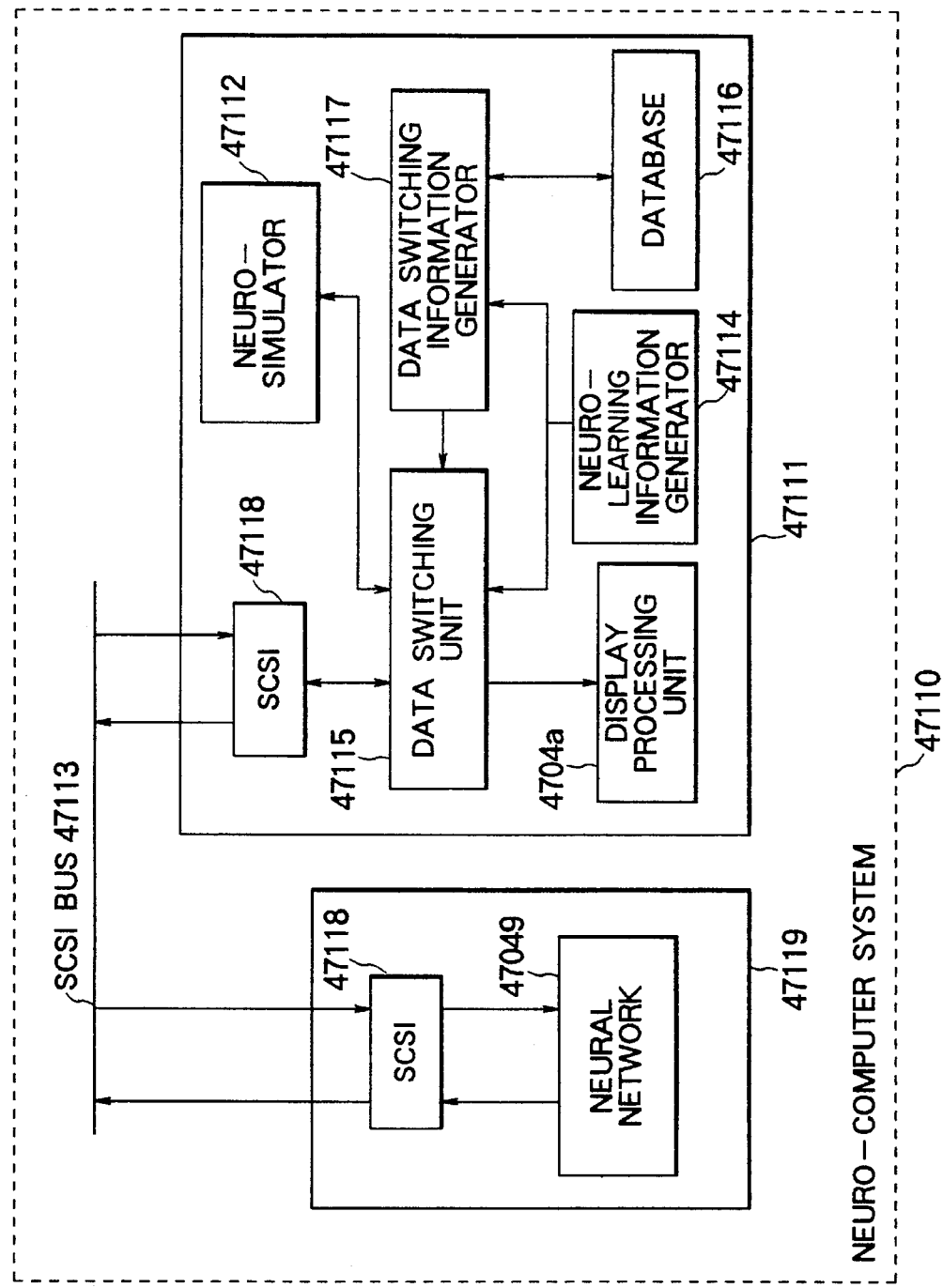
FIG. 47 shows the structure of a system for automatically switching between a neuro-simulator and a neuro-computer.
Figure 50:
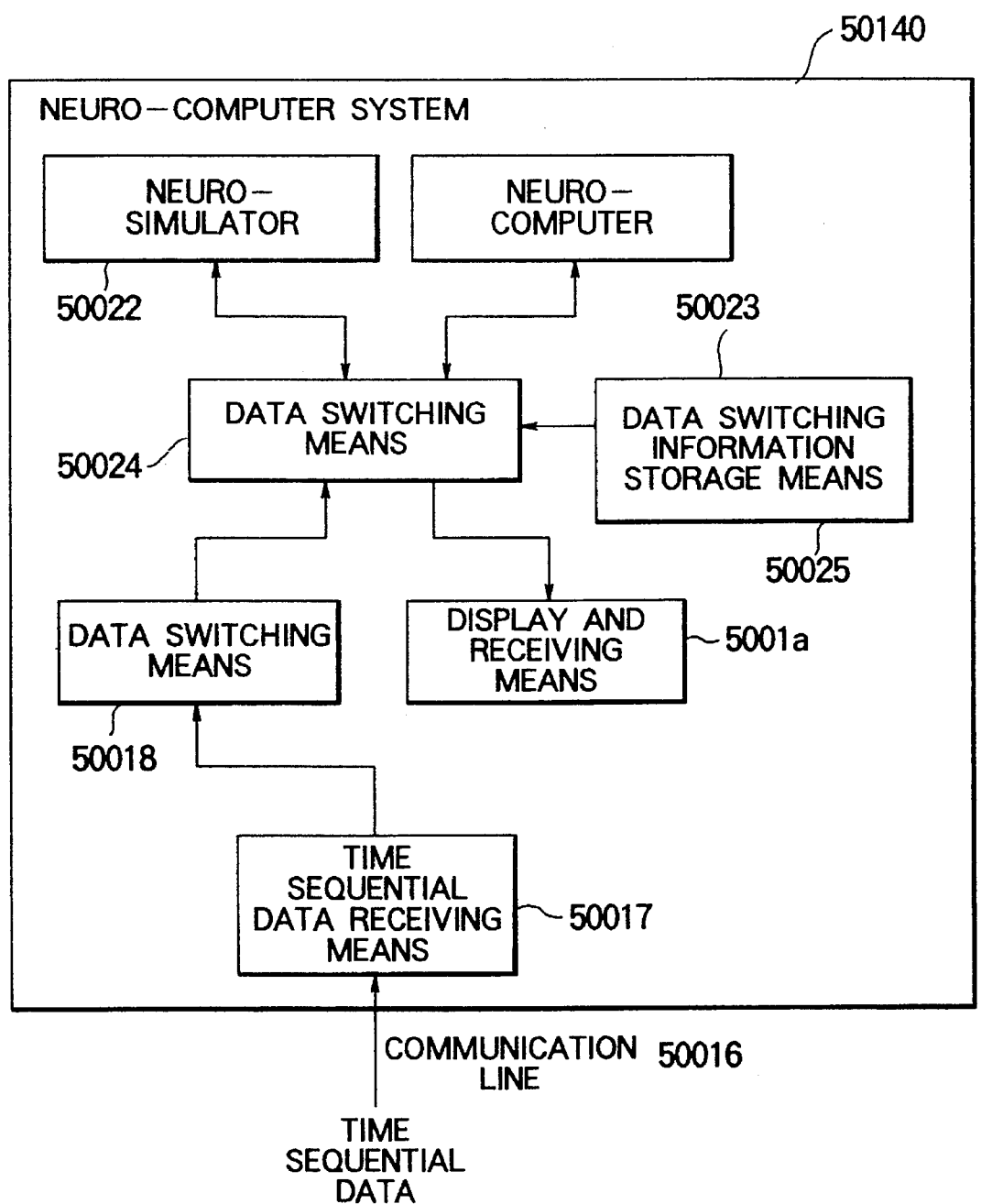
FIG. 50 shows the structure of the system for automatically switching between a neuro-simulator and a neuro-computer applied to a time sequential data prediction system.

Another neuro-computer system 50140 shown in FIG. 50 may be realized which is a combination of the embodiment shown in FIG. 47 and the time sequential data neuro-computer system shown in FIG. 40. The neuro-computer system 50140 shown in FIG. 50 is a combination of a time sequential data neuro-computer system and a neuro-computer system with automatic switching between a neuro-simulator and a neuro-computer. The system 50140 includes a time sequential data receiving means 50017 connected to a communication line 50016, a data transforming means 50018 for transforming the received time sequential data into neuro-learning data, a data switching means 50024 for transferring the neuro-learning information either to a neuro-simulator 50022 or to a neuro-computer 50023 for the execution of a neural network operation, and a display processing means 5001a for processing and displaying the results of the neural network operation. This system 50140 can be used for the neural network learning of time sequential data.

Figure 51:
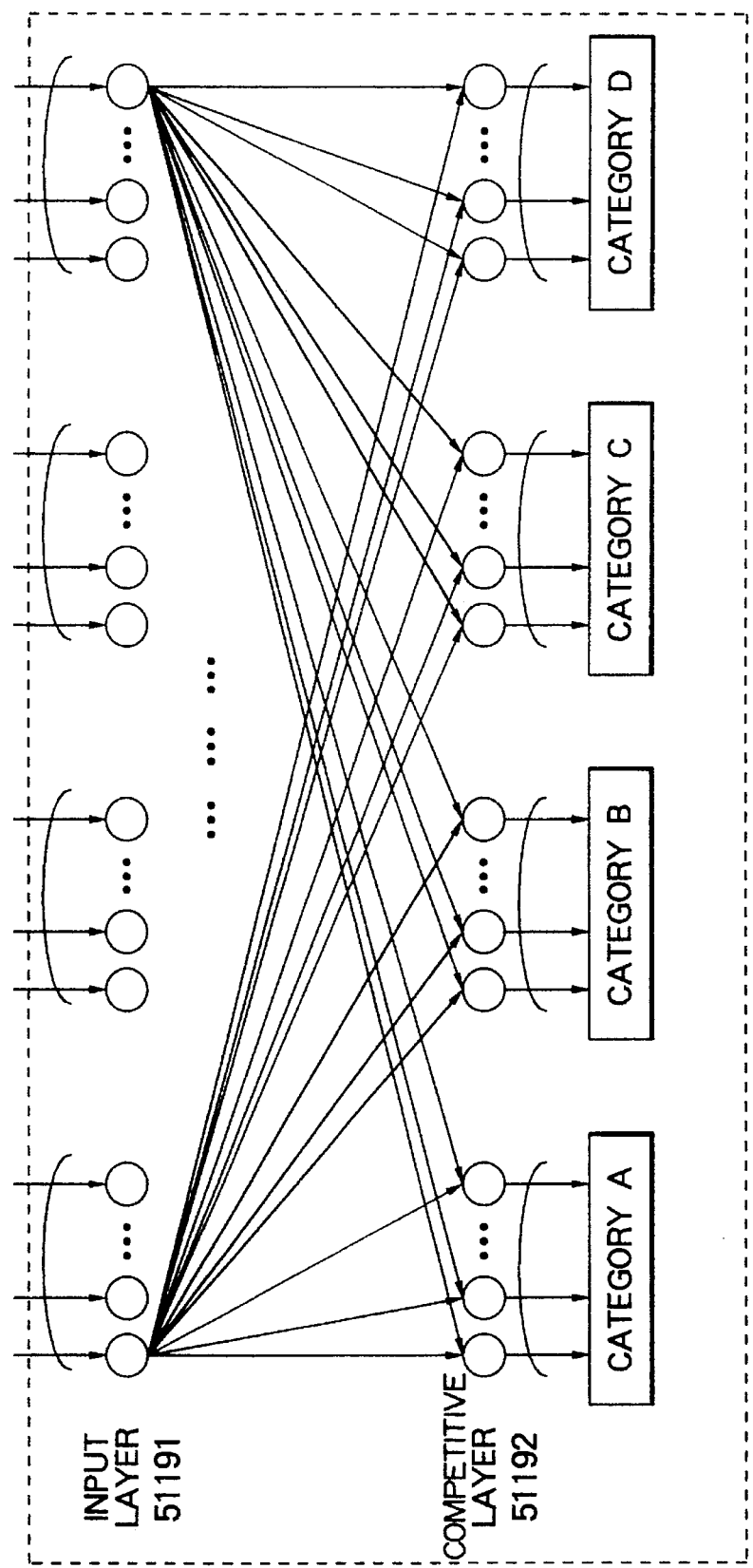
FIG. 51 is a diagram explaining an LVQ network.
Figure 52:
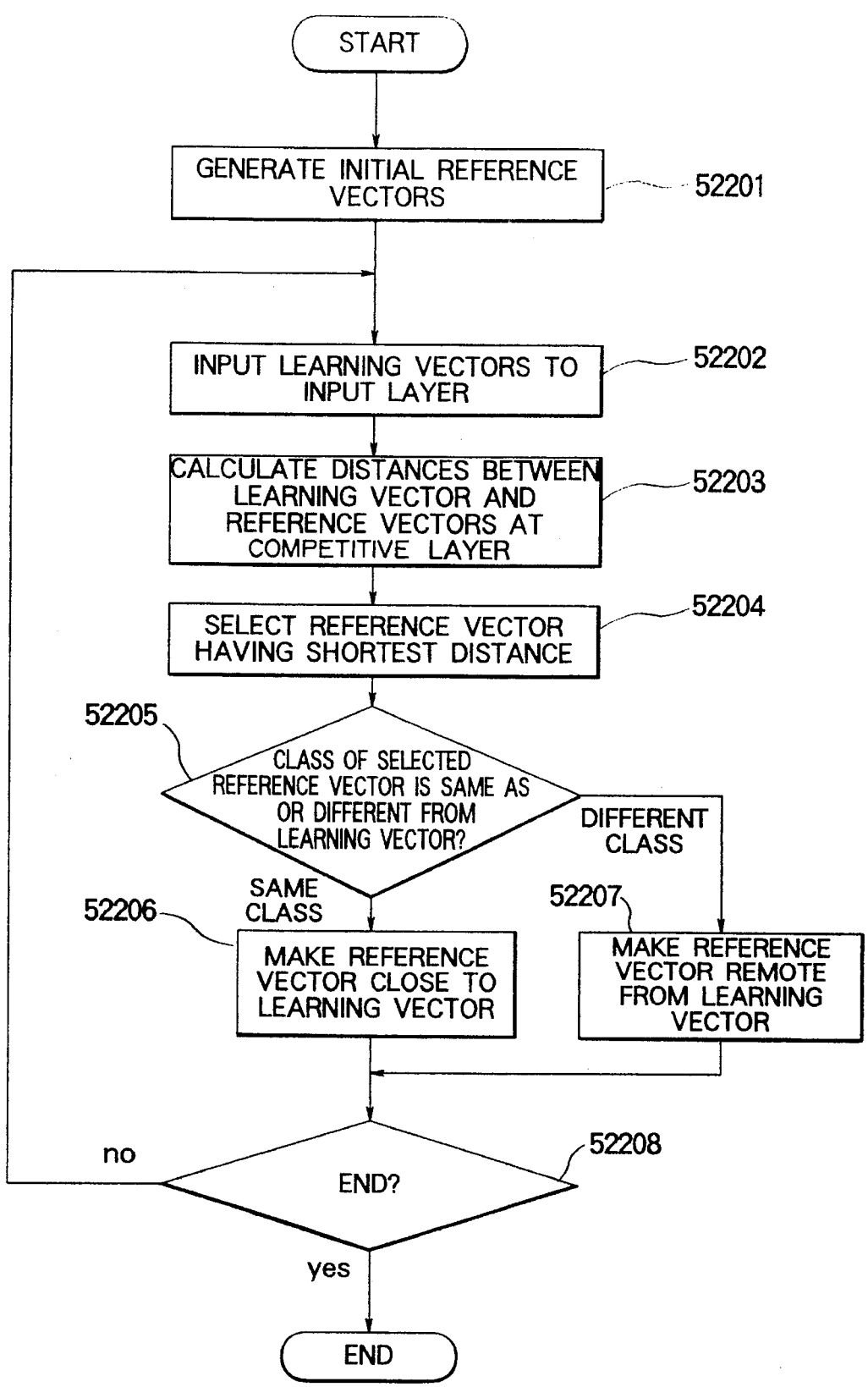
FIG. 52 is a diagram explaining an LVQ learning algorithm.
Figure 53:
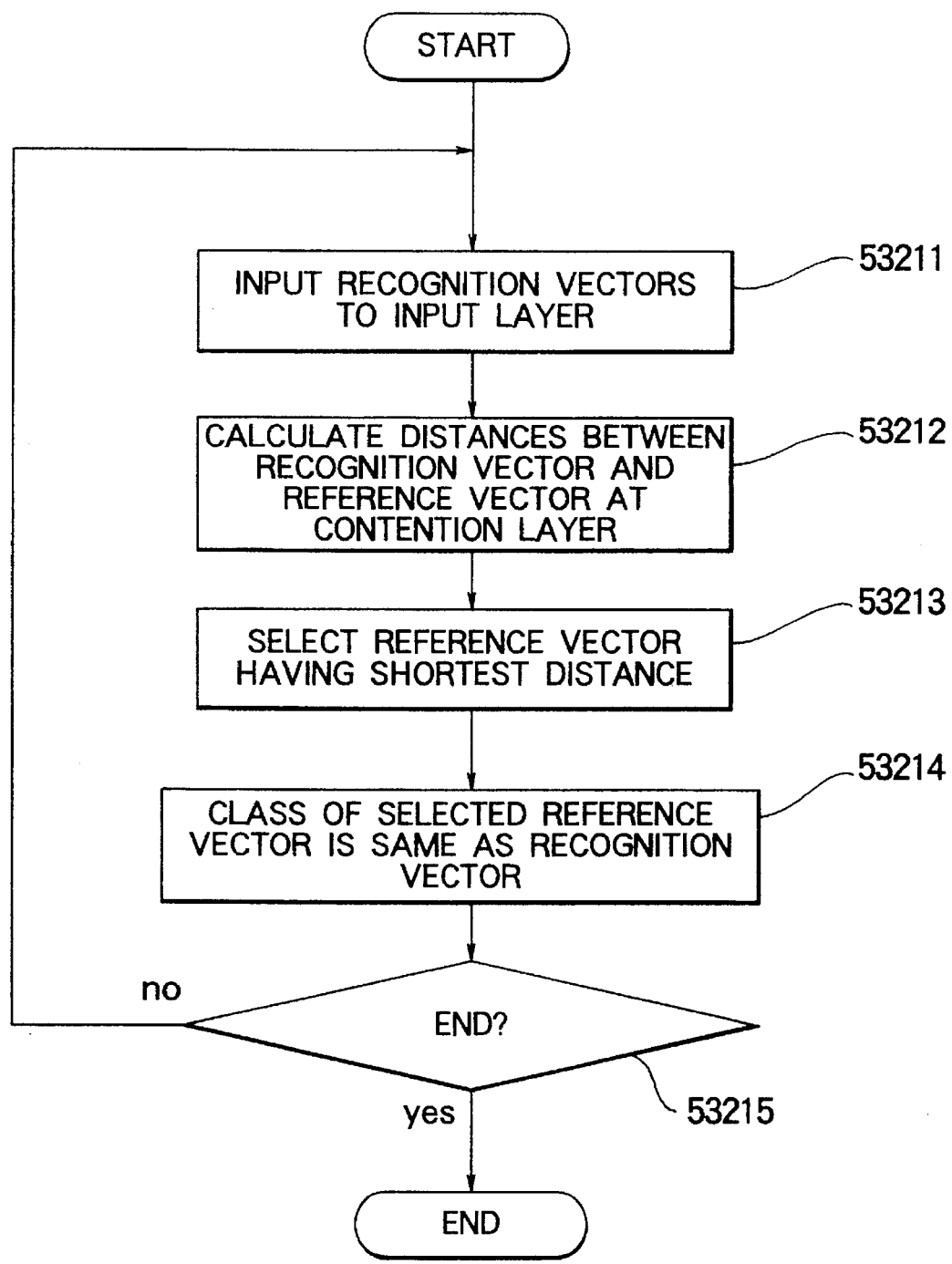
FIG. 53 is a diagram explaining an LVQ recognition algorithm.

Next, the detailed structure and operation flow of a neuro-computer will be described which can execute a neural network learning algorithm other than a back propagation, particularly, an LVQ (Learning Vector Quantization) model and an LVQ+back propagation algorithm, at a high speed, and can efficiently use hardware resources. First, the LVQ network architecture and algorithm will be briefly described. For the details, refer to "The Self-Organizing Map", T. Kohonen, Proc. IEEE, Vol. 78, No. 9, September 1990, pp. 1464–1480. FIG. 51 shows an example of an LVQ network divided into four categories. An LVQ network 51190 is constructed of an input layer 51191 for inputting learning vectors or recognition vectors and a competitive (contention) layer 51192. At the competitive layer 51192, the distances are calculated between the learning vector or recognition vector broadcast from the input layer 51191 and reference vectors, and thereafter a neuron having the shortest distance ignites. The flow for an LVQ algorithm is shown in FIG. 52. First, initial reference vectors are generated in a vector space while allocating as many competitive layer neurons as the number of reference vectors. The element of each reference vector is stored in each neuron weight memory (flow 52201). Next, a learning vector (desired vector) whose category is already known is inputted from the input layer to the competitive layer (flow 52202). Each competitive neuron calculates the distance between the inputted learning vector and its reference vector (flow 52203), and thereafter the neuron having the shortest distance ignites (flow 52204). If the ignited neuron has the same category as the inputted learning vector, the reference vector is made close to the learning vector (flow 52206). Conversely, in the case of a different category, the reference vector is made remote from the learning vector (flow 52207). The flows 52202 to 52208 are repeated until all learning vectors have been used. In this manner, the learning is completed. A recognition flow after the leaning is shown in FIG. 53. Vectors to be recognized are inputted to the input layer (flow 53211) to perform the distance calculation at the competitive layer (flow 53212). A neuron having the shortest distance at the competitive layer fires (flow 53213). The category to which the fired neuron belongs is the category of the vector to be recognized (flow 53214).

Figure 54:
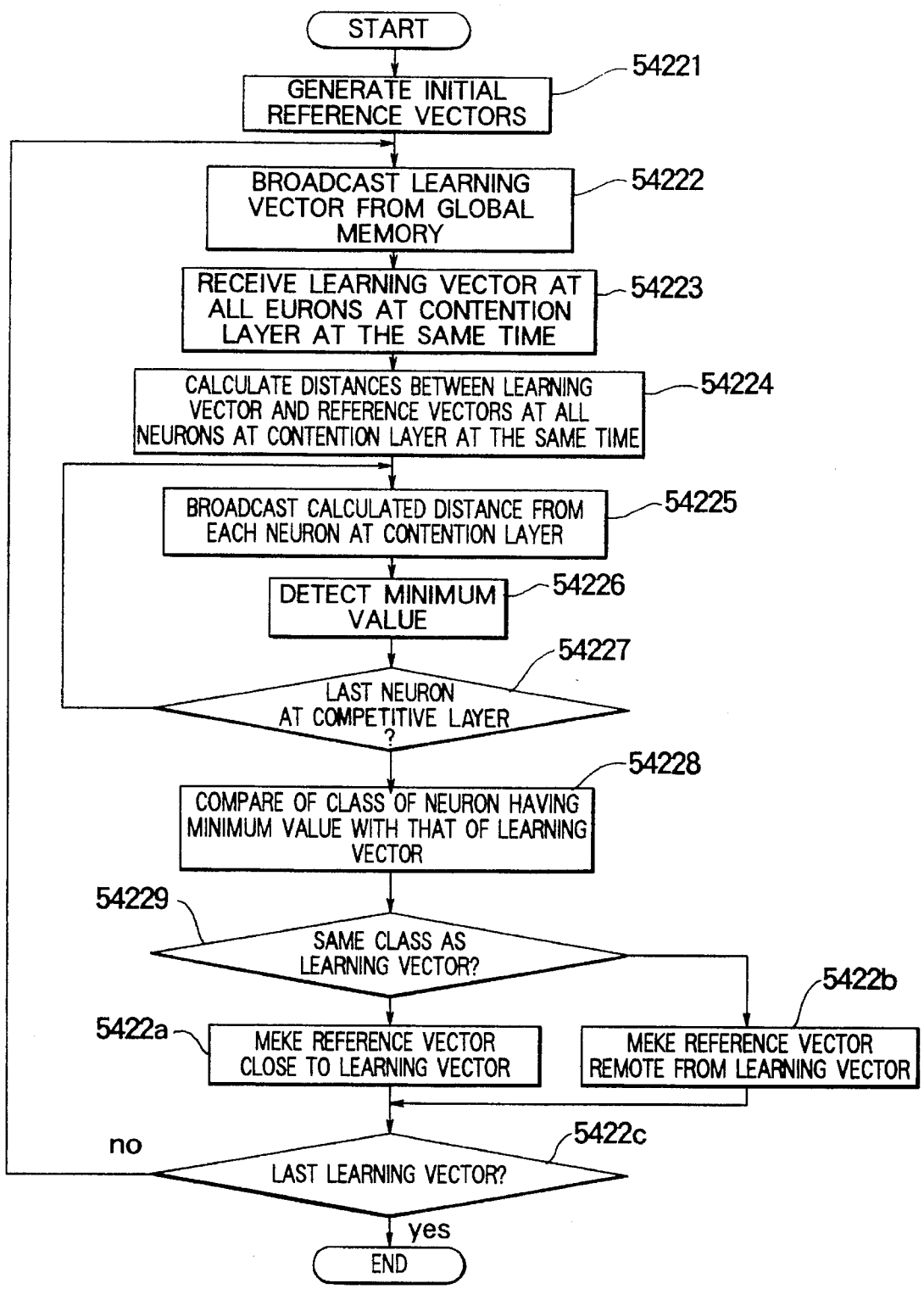
FIG. 54 is a flow chart explaining the operation of realizing an LVQ learning algorithm by a neuro-computer.

FIG. 54 shows a flow for realizing the above algorithm by the neuro-computer of the invention. A global memory is allocated to the input layer, and a neuron circuit group is allocated to the competitive layer. Microprograms for the LVQ algorithm are written in a control storage. Initial reference vectors generated on a workstation are written as initial values into each competitive layer neuron weight memory (flow 54221). Learning vectors are written in the global memory. Upon reception of a neuro-computer execution instruction, a microprogram in the control storage is executed row after row. In accordance with the microprogram instructions, the following operations are performed. Learning vectors are broadcast from the global memory (flow 54222), and received by all neurons at the competitive layer at the same time (flow 54223). The distances between each learning vector and reference vectors are calculated (flow 54224). The calculated distances are broadcast sequentially from the neurons at the competitive layer (flow 54225). The max/min detector circuit shown in FIG. 33 detects the neuron having the minimum value of distance (flow 54226). Next, the class of the learning vector is broadcast from the global memory, and compared with the class of the neuron having the minimum value of distance (flow 54228). In the case of the same class, the reference vector is made close to the learning vector (flow 5422a), and in the case of the different class, the reference vector is made remote from the learning vector (flow 5422b). The flows 54222 to 5422b are repeated as many times as the number of learning vectors, to thereafter terminal the LVQ learning. As described above, by changing the microprogram in the control storage of the neuro-computer of the invention, it becomes possible to execute not only the back propagation learning algorithm but also the LVQ learning algorithm. Furthermore, by using the max/min detector circuit of the neuro-computer, the LVQ learning algorithm can be executed at a high speed.

Figure 55:
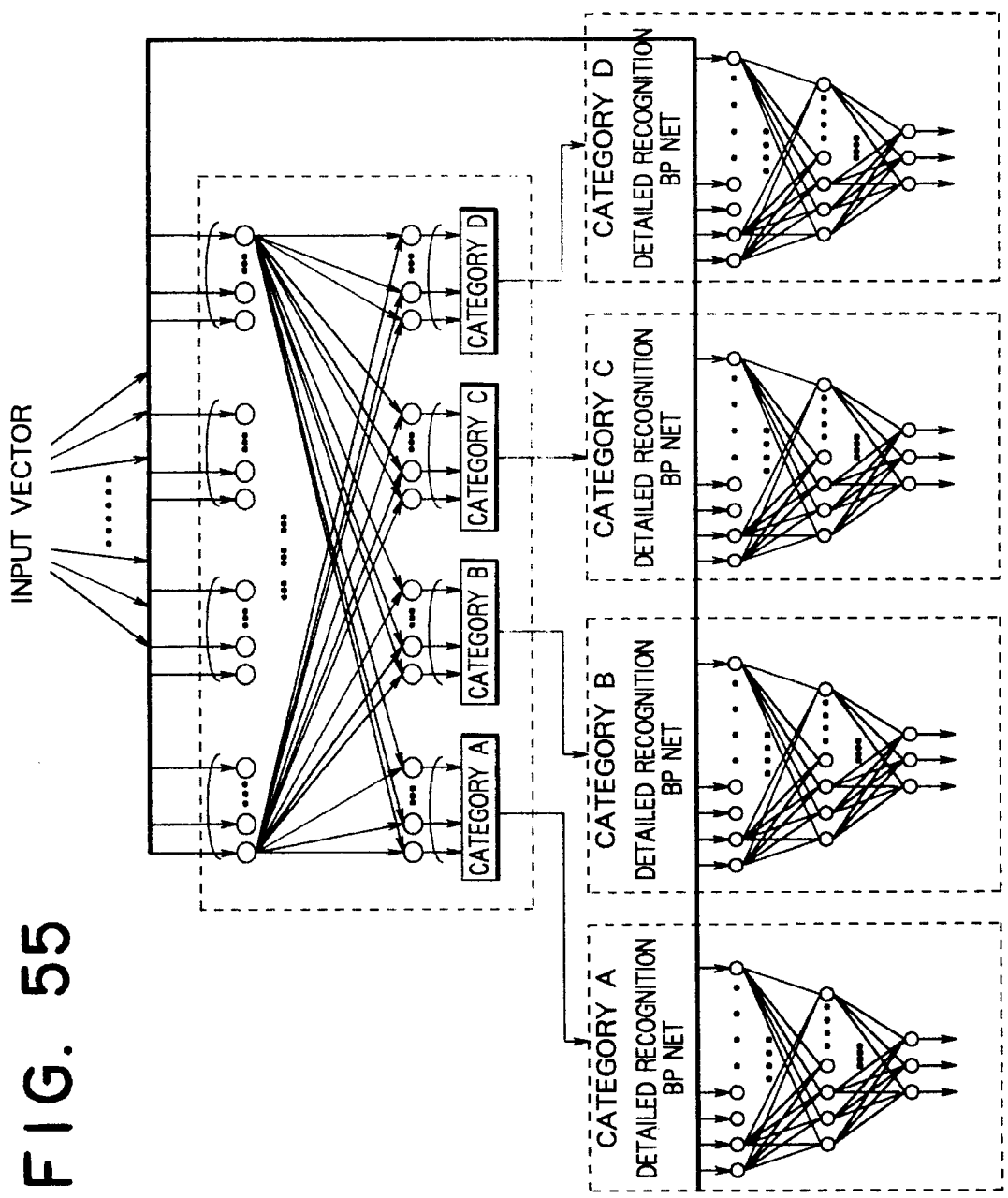
FIG. 55 is a diagram explaining an LVQ+BP network.
Figure 56:
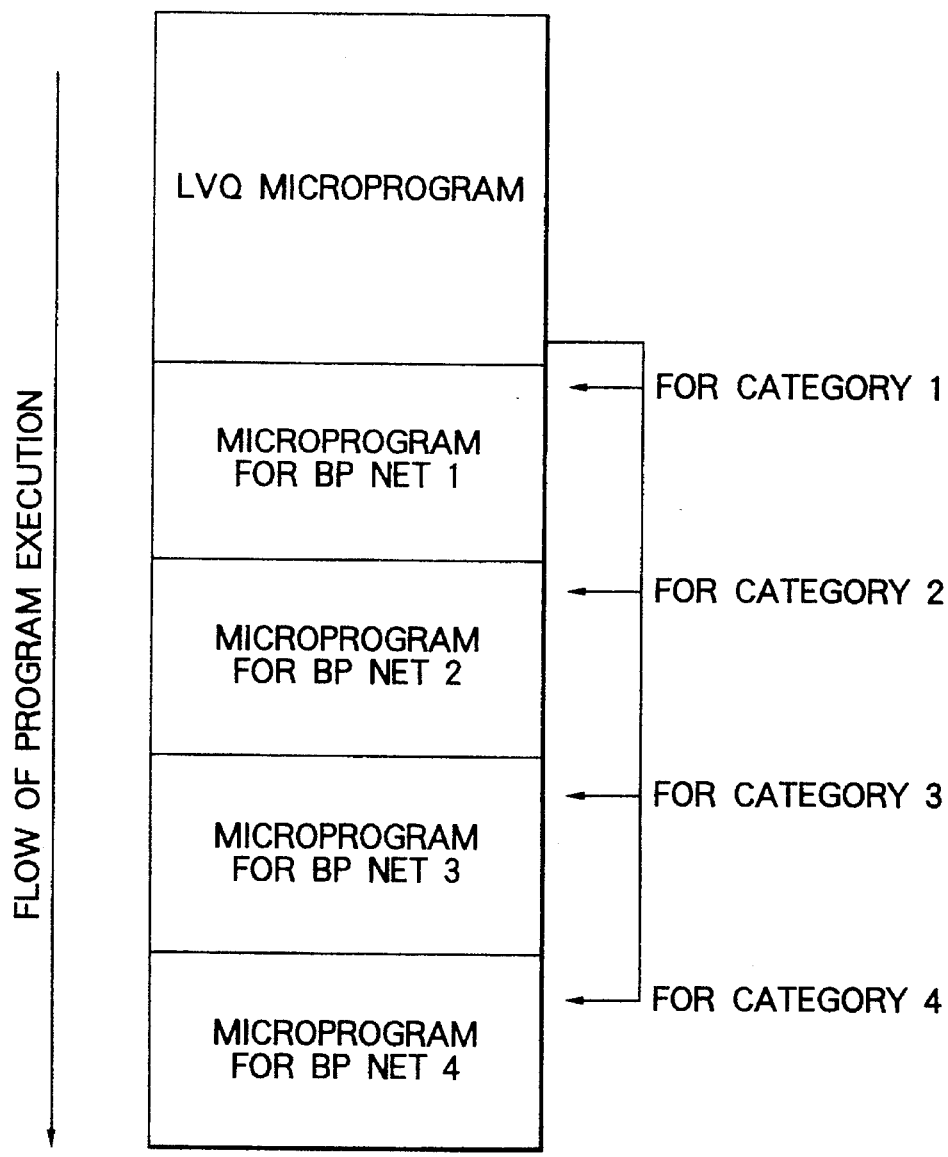
FIG. 56 shows the structure of the control storage realizing an LVQ+BP algorithm.

The present invention is effectively applicable to the learning by an LVQ+BP network architecture shown in FIG. 55. The network shown in FIG. 55 is constituted by one LVQ network 55231 and a plurality of BP networks 55232. The LVQ learning is performed in the manner shown by the flow chart of FIG. 54, and thereafter a BP learning is performed. In order to realize this algorithm, the control storage 5632 is structured as shown in FIG. 56. Specifically, algorithm execution microprograms are sequentially written in the control storage 5632 in the order of executing programs. The programs in the control storage are executed in the order stored in it. In this example, the network is configured to select the BP net by the LVQ algorithm. Therefore, after the LVQ algorithm, the flow jumps to the BP net microprogram in accordance with the category. Thereafter, the selected BP net is operated. Conversely, after the BP algorithm, the LVQ algorithm may be executed in the same manner. In this manner, even if there is a plurality of learning algorithms, they can be executed by only writing microprograms into the control storage of the neuro-computer of the invention.

The neuro-computer of the invention can also operate at a high speed for GA (Genetic Algorithm) which is one type of massive-parallel learning algorithms. Specifically, GA microprograms are written in the control storage and genes for GA are assigned neurons, so that selection and weeding of all genes can be performed at the same time realizing a high speed execution of GA. Obviously, a plurality of genes may be allocated to one neuron which is time-shared used.

As described so far, according to the present invention, it is possible to provide a general neuro-computer and system using it, capable of executing a plurality of learning algorithms, providing an instruction execution speed comparable with a hard wired system, and practically neglecting a time required for rewriting microprograms. Furthermore, since the inside of a neuron and the whole system can be controlled in accordance with the internal operation state of the neuron, it is possible to execute an algorithm which requires a conditional operation or complicated grouping. It is also possible to execute a high precision algorithm while suppressing an increase of learning time as much as possible. It is also possible to realize a neuro-computer system capable of processing time sequential data.

What is claimed is:

1. A neuro-computer comprising:
 a neuron array having a plurality of neurons each including at least the following elements (a) to (l),
  (a) a rewritable memory and a register file, (b) a memory write value holding means for holding data to be written in said rewritable memory, (c) a shifter and an ALU (Arithmetic Logic Unit), (d) a signal selecting means for selecting two values, in accordance with a control signal from a control logic unit, from at least one signal including inputs from said rewritable memory, said register, and an external circuit of said neuron, and outputs from said ALU and said shifter, (e) a select signal holding means for holding said selected two values, (f) a multiplier for multiplying the values held by said select signal holding means, (g) a multiplication result holding means for holding a multiplication result of said multiplier, (h) an operation result holding means for holding an output from said ALU or said shifter, (i) a shifter input selecting means and an ALU input selecting means for selecting inputs to said shifter and said ALU from outputs from said operation result holding means, said select signal holding means, and said multiplication result holding means, (j) a first operation result selecting means for selecting outputs from said shifter and said ALU, and determining an input to said operation result holding means, (k) a second operation result selecting means for selecting the outputs from said shifter and said ALU, and determining an output to said memory write value holding means, said register file, output selecting means for selecting an output to the external circuit of said neuron, and said signal selecting means for selecting said two values, and (l) said output selecting means for selecting an output to the external circuit of said neuron, from the outputs from said shifter, said ALU, said rewritable memory, and said register file;

a control storage unit for storing a microinstruction for controlling said neuron array;

a global memory unit for storing data necessary for information processing at said neuron array; and said control logic unit including a means for controlling said control storage unit, a means for controlling said global memory unit, a neuron array controlling means for controlling said neuron array in accordance with said microinstruction in said control storage unit, and an external bus interface means for accessing data via an external bus.

2. A neuro-computer according to claim 1, wherein said neuron array controlling means of said control logic unit includes a circuit for generating an address of said neuron, a circuit for generating said microinstruction for said neuron, a circuit for generating an input signal to said neuron, and a circuit for processing an output signal from said neuron.

3. A neuro-computer according to claim 2, wherein a plurality of neurons are controlled by the same control signal from said circuit, for generating said microinstruction for said neuron of said control logic unit.

4. A neuro-computer according to claim 3, wherein said neuron includes a condition code register for rewriting or holding the operation condition outputted from said shifter or said ALU in accordance with a control signal from said control logic unit, and data write to said rewritable memory or said register file of said neuron is controlled in accordance with a value selected from said condition code register in response to another control signal from said control logic unit.

5. A neuro-computer according to claim 4, wherein said condition code register holds the operation results of said ALU including, (1) a bit representing a sign, (2) a bit representing whether an operation result is "0", (3) a bit representing a carry-out, and (4) a bit representing an overflow, in accordance with a control signal from said control logic unit.

6. A neuro-computer according to claim 5, wherein said neuron includes a group register for loading the value of said condition code register or an inverted signal of said value in accordance with a control signal from said control logic unit, and data write to said rewritable memory, said register file, or said operation result holding means, respectively in said neuron, is controlled in accordance with the value loaded in said group register.

7. A neuro-computer according to claim 6, wherein said neuron controls the data write to said rewritable memory, said register file, or said operation result holding means, in accordance with an AND (logical product) value between (1) the value in said group register, and (2) the value selected from said condition code register in accordance with a control signal from said control logic unit.

8. A neuro-computer according to claim 4, wherein said neuron includes a neuron request register which is written with an AND or OR value between the value in said condition code register or an inverted signal of a value, and the value already written in said neuron request register, or set to "0" or "1", in accordance with a control signal from said control logic unit, and an AND or OR value signal between the values of said neuron request registers of a plurality of neurons is transferred to said control logic unit to control the entirety of said neuro-computer in accordance with a control signal.

9. A neuro-computer according to claim 8, wherein the whole operation of said neuro-computer is intercepted in accordance with said signal outputted from said neurons.

10. A neuro-computer according to claim 3, wherein said neuron is arranged to truncate lower bits excepting a sign bit of a transferred signal if the number of bits of said signal is to be changed before and after said multiplier.

11. A neuro-computer according to claim 3, wherein said neuron includes signal lower bit truncation means or signal right shift means, and if the bit portion of a negative number to be cut off has "1", the number left untruncated is added with "1".

12. A neuro-computer according to claim 3, wherein a number of pipelines present while data is transferred from said global storage unit to said neuron after said microinstruction is issued from said control logic unit, is set to be equal to the number of pipelines present while data is transferred from said neuron to another neuron after said microinstruction is issued from said control logic unit.

13. A neuro-computer according to claim 12, further comprising flip-flops which coincide in number with said number of pipelines.

14. A neuro-computer according to claim 13, wherein said neuro-computer is arranged such that, if the operation of the neural network is intercepted in response to a command from the external circuit or in response to an internal operation state, the operation is intercepted after data having been left in the pipelines when an interception command was issued is saved, and at the following operation start, the saved data is sequentially outputted for the execution of the operation.

15. A neuro-computer according to claim 14, wherein said neuro-computer is arranged such that, of the data in the pipelines at the time of interception, the data still not transferred to said neuron and a control signal are transferred to said neuron, and the output data from said neuron is saved.

16. A neuro-computer according to claim 14, wherein said neuro-computer is arranged such that, if an interception command is again issued after the start and before all the saved data has been outputted, only the data in the pipelines corresponding to the outputted and saved data is saved.

17. A neuro-computer according to claim 1, wherein said neuron is configured such that said multiplier performs a fixed point multiplication by using a predetermined number of bits, and a desired neural network operation is executed by using a weight value, an output value, and a back propagation error, respectively of a predetermined number of bits, at said shifter and said ALU, said neuron including:

a means for storing a weight value having a number of bits greater than said predetermined number of bits at the time of learning of the weight value of said neural network;

a means for reading and operating a predetermined number of bits of each stored weight value, for calculation of a neuron output value and a back propagation error in a learning; and a means for reading the number of bits greater than said predetermined number of bits, for modification of the weight value.

18. A neuro-computer according to claim 1, wherein said neuron is configured such that said multiplier performs a fixed point multiplication by using a predetermined number of bits, and a desired neural network operation is executed by using a weight value, an output value, and a back propagation error, respectively of a predetermined number of bits, at said shifter and said ALU, said neuron including:

a means for storing a plurality of microinstructions for a learning with back propagation errors having different point positions;

a means for storing a condition of changing said microinstruction for the learning; and a means for selecting another one of a plurality of microinstructions for the learning if said changing condition is satisfied during the course of the learning.

19. A neuro-computer according to claim 1, wherein said neuron is configured such that said multiplier performs a fixed point multiplication by using a predetermined number of bits, and a desired neural network operation is executed by using a weight value, an output value, and a back propagation error, respectively of a predetermined number of bits, at said shifter and said ALU, said neuron including:

a means for storing a condition of changing a point position of a back propagation error during a learning of a weight value;

a means for changing said point position of a back propagation error if said condition of changing is satisfied during the learning; and a means for continuing the learning by using a back propagation error with said changed point position.

20. A neuro-computer according to claim 1, wherein said neuron is configured such that said multiplier performs a fixed point multiplication by using a predetermined number of bits, and a desired neural network operation is executed by using a weight value, an output value, and a back propagation error, respectively of a predetermined number of bits, at said shifter and said ALU, said neuron including:

a means for storing a plurality of microinstructions for a learning with back propagation errors having different point positions;

a means for selecting said microinstructions for the learning from said plurality of programs before the start of the learning; and a means for performing the learning of weight values by using said selected microinstruction.

21. A neuro-computer according to claim 1, wherein said neuron is configured such that said multiplier performs a fixed point multiplication by using a predetermined number of bits, and a desired neural network operation is executed by using a weight value, an output value, and a back propagation error, respectively of a predetermined number of bits, at said shifter and said ALU, said neuron including:

a means for changing a point position of a back propagation error;

a means for selecting one of a plurality of point positions by using said changing means before a start of learning; and a means for performing a learning of weight values by using back propagation errors with said selected point position.

22. A neuro-computer system comprising:

a neuro-computer processing information by using at least one type of a neural network, said neuro-computer including a neuron array comprising at least one neuron, a control storage unit for storing a microinstruction for controlling said neuron array, a global storage unit for storing data necessary for processing information by using said neuron array, a parameter storage unit for storing parameter information including the number of learnings and the number of input patterns, and a control logic unit for controlling said control storage unit, said global storage unit, and said parameter storage unit by using said microinstruction, said parameter information, and data necessary for a neural network operation;

a host computer for controlling at least a start and stop of said neuro-computer and inputting necessary information for the learning and execution of said neuro-computer to said neuro-computer, said necessary information including a learning algorithm, a neural network architecture, a number of learnings, a number of input patterns, an input signal, and a desired signal (an expected value); and a means for interconnecting said neuro-computer and said host computer, wherein said neuron of said neuro-computer includes:

a logic circuit for realizing a neural network operation;

a condition code register for indicating an operation result of said logic circuit;

a group register for holding the value of said condition code register and an inverted value of said value and for controlling the operation and grouping of said neuron;

a neuron request register for holding the value of said condition code register and an inverted value of said value and for supplying said control logic unit with the state of said neuron;

a means for storing, when executing the neural network operation by using a weight value, an output value, and a back propagation error, respectively of a predetermined number of bits, a weight value having a number of bits greater than said predetermined number of bits:

a means for reading and operating a weight value of a predetermined number of bits from said weight value storing means when calculating a neuron output value and a back propagation error during the operation; and a means for reading and operating a weight value having the number of bits greater than said predetermined number of bits when modifying the weight value during the operation, said control logic unit of said neuro-computer comprising:

a means for controlling said control storage means;

a means, having an address translation table for generating a neuron address and a logic circuit for detecting the maximum and minimum values of neuron output values, for controlling said neuron array in accordance with said microinstruction read from said control storage unit;

a means for controlling said global memory unit and said parameter storage unit; and an external bus interface means for accessing data via an external bus, said neuro-computer comprising:

a first pipeline latch provided on a bus of said neuro-computer;

a second pipeline latch for transferring data from said neuron to another neuron after said microinstruction is issued, said second pipeline latch having a number of stages equal to a number of stages of a pipeline latch for transferring data from said global storage unit to said neuron after said microinstruction is issued;

a register for saving data left in said first and second pipeline latches when the neural network operation is intercepted; and a means for sequentially outputting said saved data when executing again said intercepted operation, and said host computer comprising:

a means for generating said microinstruction describing the neural network operation from network definition information including the number of layers of the neural network and the number of neurons at each layer;

a time sequential data receiving means for periodically receiving time sequential data via a communication line;

a data converting means for converting said received time sequential data into a data format capable of being processed by said neuro-computer;

a data transmitting/receiving means for transferring said converted data to said neuro-computer, and receiving data transferred from said neuro-computer; and a display and processing means for processing and displaying the data received by said data transmitting/receiving means.

23. A neuro-computer system according to claim 22, wherein said time sequential data is at least one of economic fundamental data including stock value data, money rate data, exchange data, and price data, and said neuro-computer predicts said time sequential data or optimizes a combination of said time sequential data.

24. A neuro-computer system comprising:

a neuro-simulator for realizing a neural network operation by using software;

a neuro-computer for realizing the neural network operation by using hardware;

a neuro-learning information generating means for generating neuro-learning information necessary for neural network learning;

a data switching information storage means for storing reference information used for a judgement of switching between said software and said hardware; and a data switching means for switching said neuro-learning information in accordance with said reference information.

25. A neuro-computer system according to claim 24, wherein said neuro-computer system is arranged such that, said data switching information storage means stores at least a learning performance, precision, and error, respectively, of said neuro-simulator and said neuro-computer, and an overhead time for learning by said neuro-computer.

26. A neuro-computer system according to claim 25, wherein said neuro-computer is arranged such that, said neuro-computer executes a BP (Back Propagation) algorithm which is one of neural network learning algorithms.

27. A neuro-computer system according to claim 25, wherein said neuro-computer is arranged such that, said neuro-computer executes an LVQ (Learning Vector Quantization) algorithm which is one of neural network learning algorithms.

28. A neuro-computer system according to claim 25, wherein said neuro-computer is arranged such that, said neuro-computer executes said LVQ algorithm which is one of neural network learning algorithms, and by using learning results of said LVQ algorithm, continuously executes said BP algorithm which is one of neural network learning algorithms.

29. A neuro-computer system according to claim 25, wherein said neuro-computer is arranged such that, said neuro-computer executes said BP algorithm which is one of neural network learning algorithms, and by using learning results of said BP algorithm, continuously executes said LVQ algorithm which is one of neural network learning algorithms.

30. A neuro-computer system according to claim 25, wherein said neuro-computer is arranged such that, said neuro-computer executes a GA (Generic Algorithm) which is one of massive parallel learning algorithms.

\* \* \* \* \*